United States Patent
Bruns et al.

(10) Patent No.: US 12,404,410 B2
(45) Date of Patent: Sep. 2, 2025

(54) METHOD FOR GENERATING A SOLUBILIZED TIRE RUBBER BITUMEN COMPOUND

(71) Applicant: ASPHALT SCIENCES LLC, Reno, NV (US)

(72) Inventors: Joseph Randall Bruns, Scurry, TX (US); Hashem Hashemi, Reno, NV (US)

(73) Assignee: Asphalt Sciences LLC, Reno, NV (US)

( * ) Notice: Subject to any disclaimer, the term of this patent is extended or adjusted under 35 U.S.C. 154(b) by 448 days.

(21) Appl. No.: 18/092,268

(22) Filed: Dec. 31, 2022

(65) Prior Publication Data

US 2023/0295434 A1    Sep. 21, 2023

Related U.S. Application Data

(63) Continuation-in-part of application No. 17/959,224, filed on Oct. 3, 2022, and a continuation-in-part of application No. 17/959,238, filed on Oct. 3, 2022, and a continuation-in-part of application No. 17/086,948, filed on Nov. 2, 2020, now Pat. No. 11,459,274, and a continuation-in-part of application No. 16/255,804, filed on Jan. 23, 2019, now Pat. No. 10,843,966, and a continuation-in-part of application No. 15/283,821, filed on Oct. 3, 2016, now Pat. No. 10,214,617.

(60) Provisional application No. 62/661,609, filed on Apr. 23, 2018, provisional application No. 62/236,861, filed on Oct. 3, 2015.

(51) Int. Cl.
C08L 95/00    (2006.01)

(52) U.S. Cl.
CPC ........... *C08L 95/00* (2013.01); *C08L 2555/34* (2013.01)

(58) Field of Classification Search
None
See application file for complete search history.

(56) References Cited

U.S. PATENT DOCUMENTS

| | | | |
|---|---|---|---|
| 4,068,023 A | 1/1978 | Nielsen et al. | |
| 5,270,361 A * | 12/1993 | Duong | .......... C10C 3/026 |
| | | | 524/68 |
| 5,397,818 A | 3/1995 | Flanigan | |
| 5,492,561 A | 2/1996 | Flanigan | |
| 7,074,846 B2 | 7/2006 | Sylvester et al. | |
| 9,540,512 B2 | 1/2017 | Flanigan | |
| 9,803,085 B2 | 10/2017 | Flanigan | |
| 10,214,617 B1 * | 2/2019 | Bruns | ............ C08L 95/00 |
| 10,233,120 B2 * | 3/2019 | Flanigan | ........... C08L 95/005 |
| 2009/0105376 A1 | 4/2009 | Korenstra et al. | |
| 2011/0196074 A1 | 8/2011 | Flanigan | |
| 2014/0261076 A1 | 9/2014 | Quinn et al. | |
| 2017/0267864 A1 | 9/2017 | Flanigan | |

FOREIGN PATENT DOCUMENTS

KR    101239399 B1    3/2013

* cited by examiner

*Primary Examiner* — Christopher M Rodd
(74) *Attorney, Agent, or Firm* — Kerr IP Group, LLC

(57) ABSTRACT

A first method for generating a solubilized tire rubber bitumen compound is described. The first method begins by heating a first bitumen compound and a tire rubber compound to generate a bitumen wetted tire rubber mixture. The method includes adding a second bitumen compound to the bitumen wetted tire rubber mixture to generate a fully wetted tire rubber bitumen mixture. The method then proceeds to generate a devulcanized fully wetted tire rubber bitumen mixture, which is heated with mixing to between 500° F. and 700° F. to generate the solubilized tire rubber bitumen compound. Additionally, a second method for generating a solubilized tire rubber bitumen compound is described. The second method includes heating a first bitumen compound and a tire rubber compound to generate a devulcanized tire rubber bitumen mixture. The devulcanized tire rubber bitumen mixture is heated to generate a bitumen wetted devulcanized tire rubber mixture. Then, a second bitumen compound is added to generate a fully wetted devulcanized tire rubber bitumen mixture, which is heated to between 500° F. and 700° F. to generate the solubilized tire rubber bitumen compound.

20 Claims, 16 Drawing Sheets

METHOD FOR GENERATING A SOLUBILIZED TIRE RUBBER BITUMEN COMPOUND

CROSS REFERENCE

This patent application is a continuation-in-part of utility patent application Ser. No. 17/959,224, filed on Oct. 3, 2022, entitled GENERATING TIRE RUBBER BITUMEN WITH SULFUR;
  this patent application is a continuation-in-part of utility patent application Ser. No. 17/959,238, filed on Oct. 3, 2022, entitled SYSTEM AND METHOD FOR MODIFYING AND ENHANCING TIRE RUBBER BITUMEN;
  this patent application is a continuation-in-part of utility patent application Ser. No. 17/086,948, filed on Nov. 2, 2020, entitled SYSTEM AND METHOD FOR GENERATING TIRE RUBBER ASPHALT (now patent Ser. No. 11/459,274, issued on Oct. 4, 2022);
  this patent application is a continuation-in-part of utility patent application Ser. No. 16/255,804, filed on Jan. 23, 2019, entitled SYSTEM AND METHOD FOR GENERATING TIRE RUBBER ASPHALT (now patent Ser. No. 10/843,966, issued on Nov. 24, 2020), which claims the benefit of provisional patent application 62/661,609 entitled SYSTEM AND METHOD OF DISSOLVING TIRE RUBBER filed on Apr. 23, 2018;
  this patent application is a continuation-in-part of utility patent application Ser. No. 15/283,821, entitled DISSOLVING TIRE RUBBER (now U.S. Pat. No. 10,214,617, issued on Feb. 26, 2019), which claims the benefit of provisional patent application No. 62/236,861, entitled DISSOLVING TIRE RUBBER filed on Oct. 3, 2015; all of which patent applications are incorporated by reference in this patent application.

FIELD

This invention relates to a composition, system, and method for generating a solubilized tire rubber bitumen compound. More specifically, a first method is described that heats a devulcanized fully wetted tire rubber bitumen mixture to between 500° F. and 700° F. to generate the solubilized tire rubber bitumen compound. Additionally, a second method is described that heats a bitumen wetted devulcanized tire rubber mixture to between 500° F. and 700° F. to generate the solubilized tire rubber bitumen compound.

BACKGROUND

Bitumens have been modified with rubber and elastomers to improve the properties of the resulting composition. For example, in Trumbore, U.S. Pat. No. 5,342,866, teaches an elastomeric-bitumen composition with improved low temperature performance and reduced resistance to flow at high temperatures. The Trumbore asphalt incorporates SBS and SIS block copolymers as the elastomeric compounds but does not phase separate and is compatible to production at high temperatures up to 475° F. (246° C.). While Nielsen, U.S. Pat. No. 4,068,023, teaches one of the earliest examples showing the incorporation of reclaimed rubber into asphalt for paving using elevated temperatures up to 450° F. (232° C.) with an admixture of aromatic oils.

Each year the U.S. generates approximately 290 million scrap tires. About 12 million scrap tires are converted into ground tire rubber ("GTR") or crumb rubber for modifying asphalt cements. Asphalt bitumen is a mixture of relatively high molecular weight compounds that do not distill off of petroleum in a refinery and include practically no polymers. In contrast, the major component of tire rubbers are cross-linked polymers. The utilization of scrap tire rubber in asphalt bitumen started in the mid-1960's when GTR was placed in asphalt bitumen surface treatments, such as chip seal applications.

Martin, EP1877493, teaches a modified asphalt binder composition that includes about 40% by weight to about 98.9% by weight asphalt binder material, about 0.5% by weight to about 25% by weight crumb rubber, about 0.5% by weight to about 30% by weight of at least one synthetic polymer, and about 0.05% by weight to about 5% by weight of at least one acid. Martin also teaches a method for making a modified asphalt binder composition that includes providing neat asphalt, heating the neat asphalt to a temperature of between about 120° C. (248° F.) and about 200° C. (392° F.), adding modifying ingredients to the neat asphalt sequentially with mixing for period of between about 5 minutes and about 10 hours each, and agitating the with a low shear mixer or a high shear mixer for an additional period of between about 5 minutes and about 48 hours.

Davis, U.S. Pat. No. 10,457,602, teaches asphalt formulations and methods of preparation suitable for roofing products that incorporate elastomers, post-consumer recycled olefinic polymers, and 10-80 mesh GTR. However, the inclusion of olefinic polymers, and especially polypropylene, disadvantageously decreases the impact resistance performance of asphalt shingle roof coatings. In all the disclosed formulations Davis limits the incorporation of GTR to 20% or less by weight and the incorporation of polymer elastomers to 18% or less by weight. Further, Davis limits the disclosed methods of preparation to mixing temperatures below 425° F. (218° C.).

In terms of environmental concerns, the disposal of scrap tires is a major waste management issue. While these environmental concerns are important, there are various challenges associated with using GTR and other forms of scrap tire rubber.

An initial challenge encountered with the use of GTR or crumb rubber is their respective production. Both crumb rubber and GTR, such as ASTM Standards D5603 and 5644, are commonly prepared by removing steel belts, bead wire, and various incorporated fabric plies from scrap tires. Entire processing facilities are required for removal of steel belts, bead wire and other byproducts incorporated into the scrap tires.

For another example, with respect to hot applied chip seal, the inconsistent dissolution of GTR and other forms of scrap tire rubber in asphalt bitumen can result in blockages to hot asphalt spray systems that apply the GTR/asphalt mixture. With respect to asphalt emulsions, the inconsistent dissolution of tire rubber in asphalt bitumen can interfere with the emulsification of asphalt in water due to the interference of the discrete undissolved rubber particles in the asphalt water inversion process. With respect to asphalt cutback, inconsistent dissolution of tire rubber in asphalt bitumen can result in blockages in cold asphalt bitumen spray systems used to apply the tire rubber solvent cut back asphalt to the road surface when used in gravel chip seals. With respect to tack coats, inconsistent dissolution of tire rubber in asphalt bitumen can interfere with even distribution and blockages in the spray applicator that may ultimately result in inferior pavement systems due to improper layer adhesion. With respect to pavement membranes, inconsistent dissolution of tire rubber in asphalt bitumen can interfere with even distribution and blockages in the spray applicator that may ultimately result in inferior pavement systems due to improper adhesion between the reinforcements and the pavement layers. With respect to pavement joint and caulking fillers, inconsistent dissolution of tire rubber in asphalt bitumen used in caulking formulations can interfere with even distribution and blockages in various applicators that may ultimately result in inferior sealing for pavement joints shortened road longevity. With respect to driveway sealers, inconsistent dissolution of tire rubber in asphalt bitumen used in driveway seal formulations can interfere with even distribution and sealing of the drive surface resulting in reduced protection.

Flanigan, U.S. Pat. No. 5,492,561, teaches incorporating the whole tire rubber into the asphalt medium by simulating a "boiling action" in the asphalt medium which allows the tire rubber to be absorbed into the asphalt medium at about 500° F. Flanigan states that below 485° F.-490° F. provides insufficient blending, while above 510° F. the temperature is too close to the flash point of the liquid. According to Flanigan, a temperature of about 500° F. is the safest temperature to use that is high enough to provide full incorporation of whole tire rubber granules into the asphalt medium but not so high that the process becomes unsafe. The Flanigan process produces a dissolved GTR after extended blending of 5-10 hours at 500° F., which degrades the asphalt blend by initiating an extended oxidation reaction that affects the quality of the asphalt. Additionally, Flanigan only generically considers the addition of elastomeric polymers to the asphalt/GTR blend without providing any instruction as to the type, amount, or in situ chemistry of those elastomeric polymer additives.

Coe, W.O. 2019/028286, teaches methods of substituting interlinks of elastomers in vulcanized end of life ("EOL") tire crumb rubber particles in order to allow the recombination of the EOL tire crumb rubber particles such that individual, complex, heterogeneous, cross linked moieties are re-entangled into a monolithic structure with uniform mechanical properties comparable to those of the rubber matrix prior to granulation. This re-entanglement required the destruction of the weakest existing crosslinks in recycled vulcanized rubber allowed for greatly increased value of the end product, which could be used in the production of a variety of products including new tires. However, re-entanglement arises from depolymerization and repolymerization processes that require a specialized reactor vessel, certain additives that catalyze and/or facilitate the depolymerization and repolymerization reactions, and subjection of the rubber/asphalt slurry to a water-based emulsion.

Rached, U.S. Pat. No. 6,713,540, teaches that Sulfur crosslinking in combination with Styrene-Butadiene rubber ("SBR") and Styrene-Butadiene-Styrene (SBS) block copolymer produce a small to medium improvement in physical properties (particularly softening point and penetration), especially at low temperatures. Crosslinking agents modify the macroscopic properties at low temperatures, making the asphalt more elastic, softer, easier to deform, and recover more readily from applied stress, while at the same time providing better resistance to deformation and recovery at high temperature as well. However, Rached limited the temperature range in which Sulfur, crosslink co-agent, or crosslinking accelerator is added to asphalt to between 250° F. and 320° F., even after heating the asphalt initially up to a maximum temperature of 430° F.

Therefore, there exists a need for a high temperature bitumen production method incorporating tire rubber into asphalt bitumen products yielding dissolved tire rubber bitumen compositions.

SUMMARY

A first method for generating a solubilized tire rubber bitumen compound is described. The first method begins by receiving a first bitumen compound and a tire rubber compound and heating the first bitumen compound and the tire rubber compound to between 275° F. and 325° F. to generate a bitumen wetted tire rubber mixture. The method proceeds by adding a second bitumen compound to the bitumen wetted tire rubber mixture and heating the second bitumen compound and the bitumen wetted tire rubber mixture to between 325° F. and 350° F. to generate a fully wetted tire rubber bitumen mixture. The method proceeds by heating the fully wetted tire rubber bitumen mixture to between 350° F. and 500° F. to generate a devulcanized fully wetted tire rubber bitumen mixture. Then, the devulcanized fully wetted tire rubber bitumen mixture are heated to between 500° F. and 700° F. to generate the solubilized tire rubber bitumen compound.

Additionally, a second method for generating a solubilized tire rubber bitumen compound is described. This second method begins by receiving a first bitumen compound and a tire rubber compound and heating the first bitumen compound and the tire rubber compound to between 350° F. and 500° F. to generate a devulcanized tire rubber bitumen mixture. The method proceeds by heating the devulcanized tire rubber bitumen mixture to between 275° F. and 325° F. to generate a bitumen wetted devulcanized tire rubber mixture. Then, a second bitumen compound is added to the bitumen wetted devulcanized tire rubber mixture, and the second bitumen compound and the bitumen wetted devulcanized tire rubber mixture are heated to between 325° F. and 350° F. to generate a fully wetted devulcanized tire rubber bitumen mixture. The method proceeds by heating the bitumen wetted devulcanized tire rubber mixture to between 500° F. and 700° F. to generate the solubilized tire rubber bitumen compound.

FIGURES

The present invention will be more fully understood by reference to the following drawings which are presented for illustrative, not limiting, purposes.

FIGS. 1A-D shows an illustrative method for dissolving tire rubber in bitumen, known generally as the rapid digestion process ("RDP").

FIGS. 2A-D shows another illustrative method for dissolving tire rubber in bitumen.

FIGS. 3A-D shows yet another illustrative method for dissolving tire rubber in bitumen.

DESCRIPTION

Figure 1A:
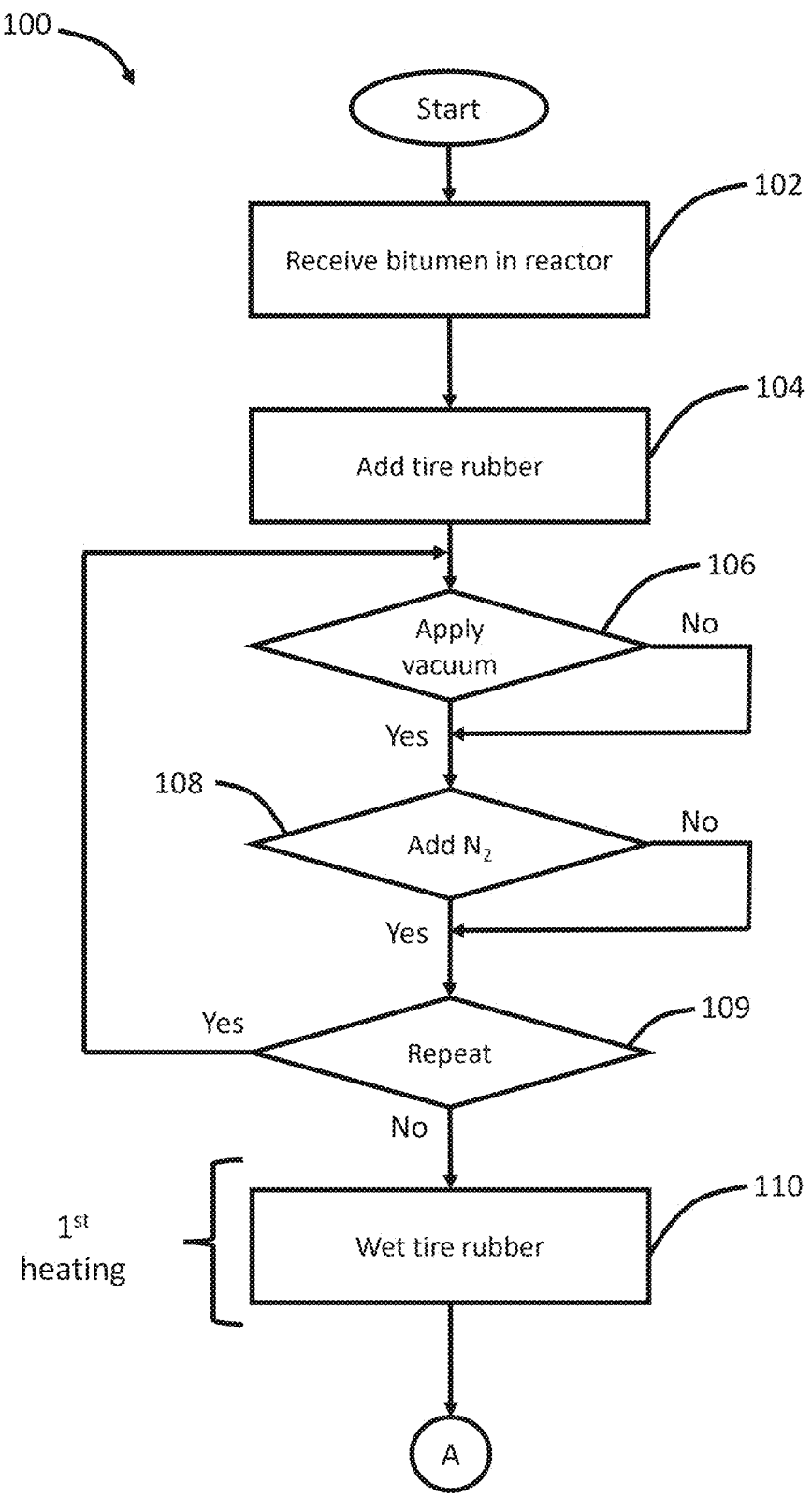
Figure 1B:
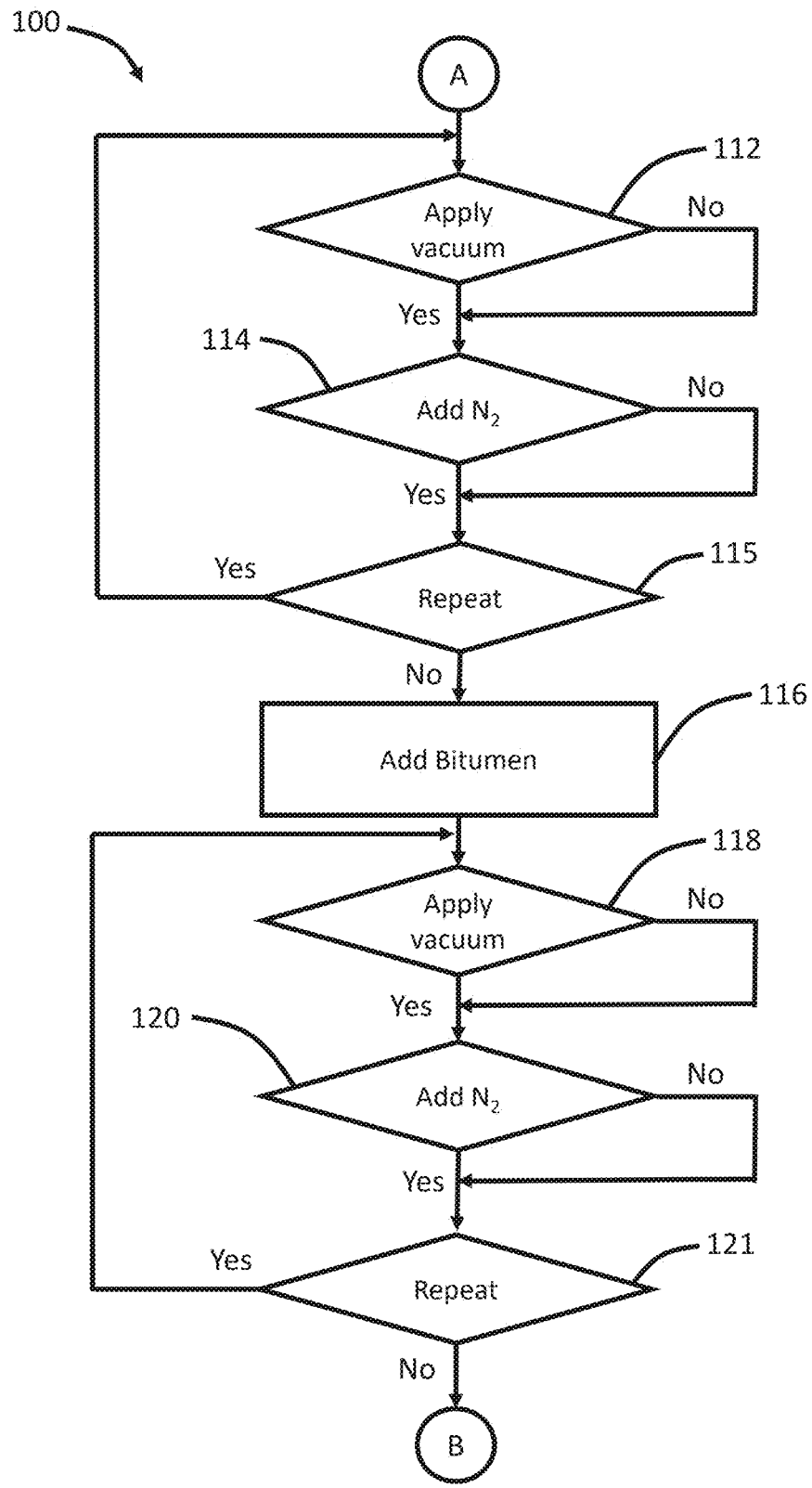
Figure 1C:
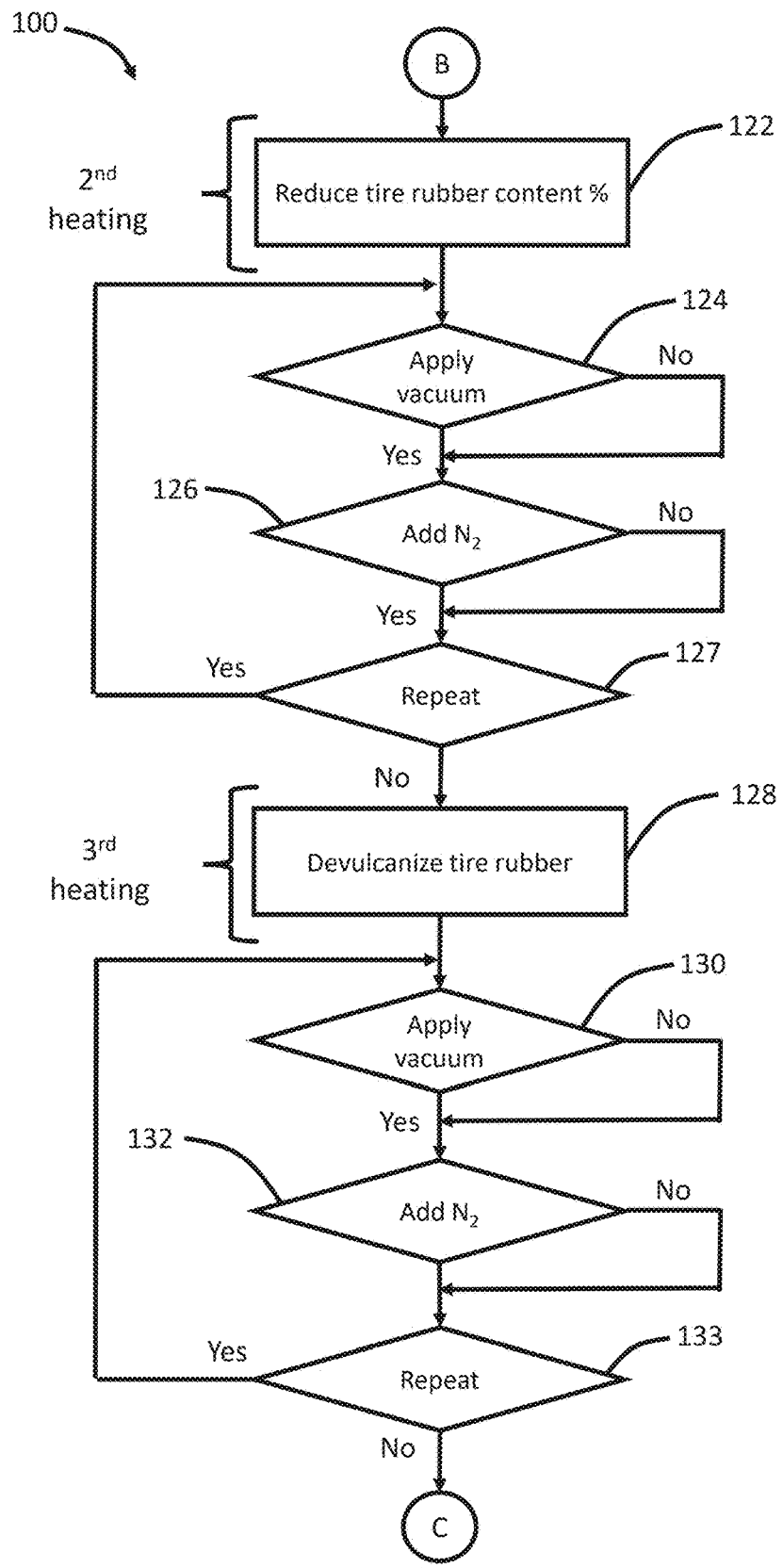
Figure 1D:
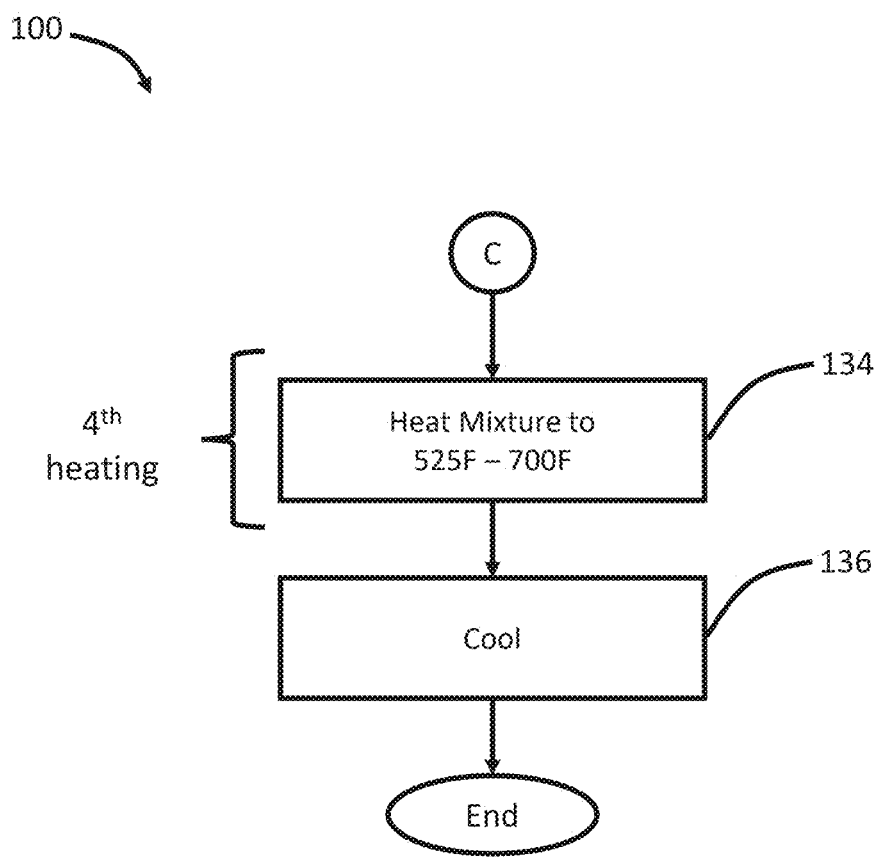
Figure 2A:
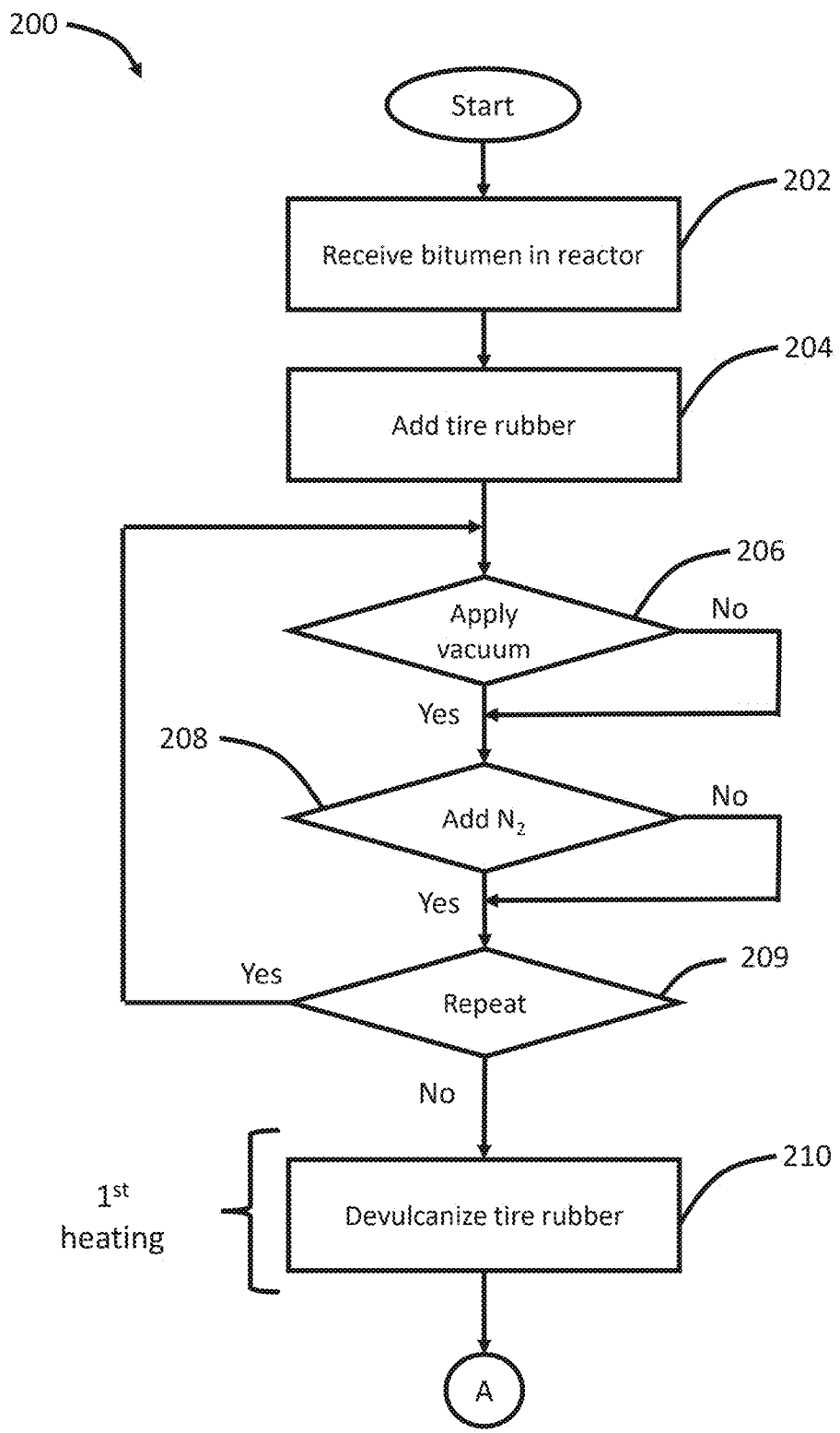
Figure 2B:
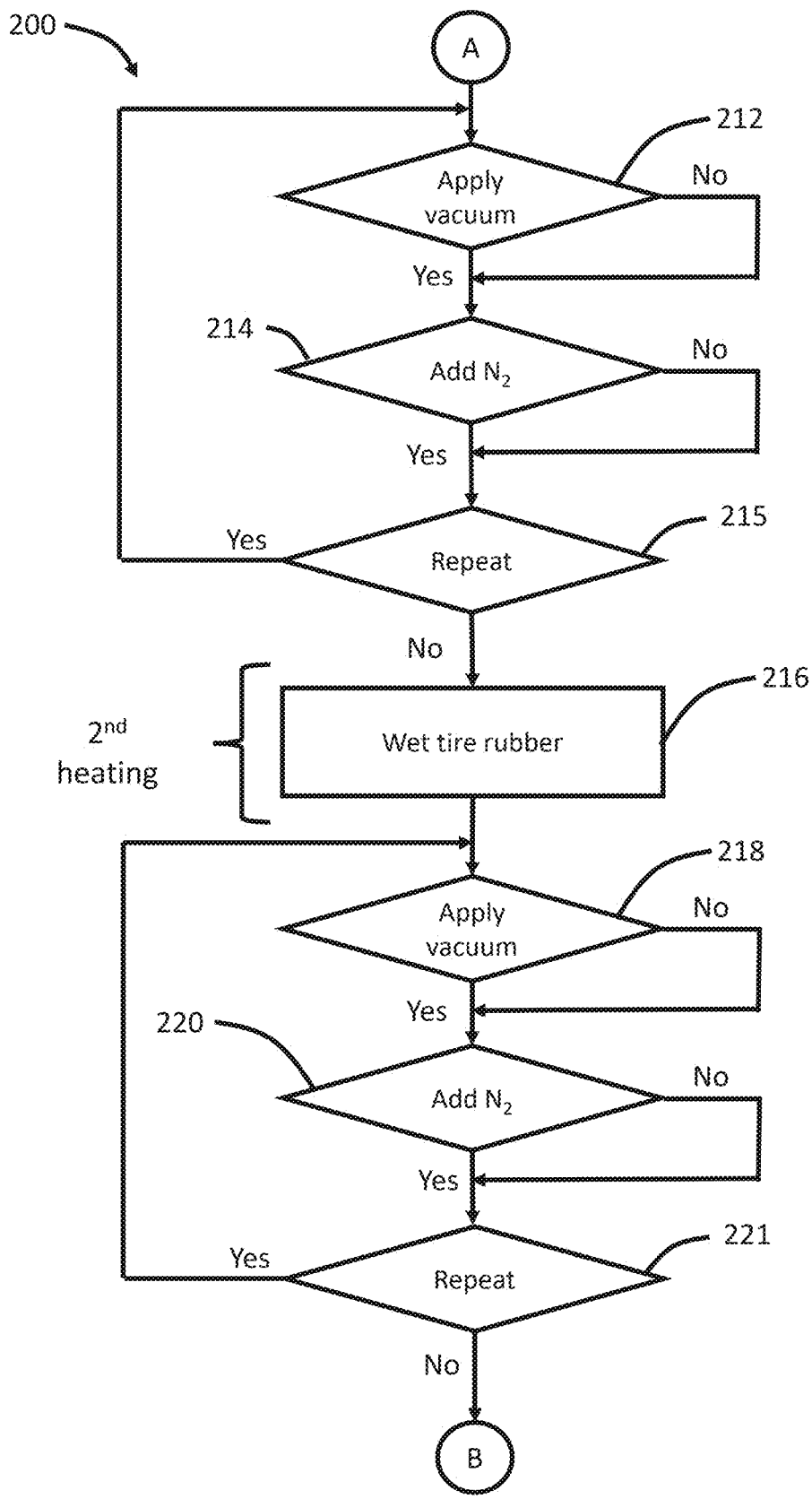
Figure 2C:
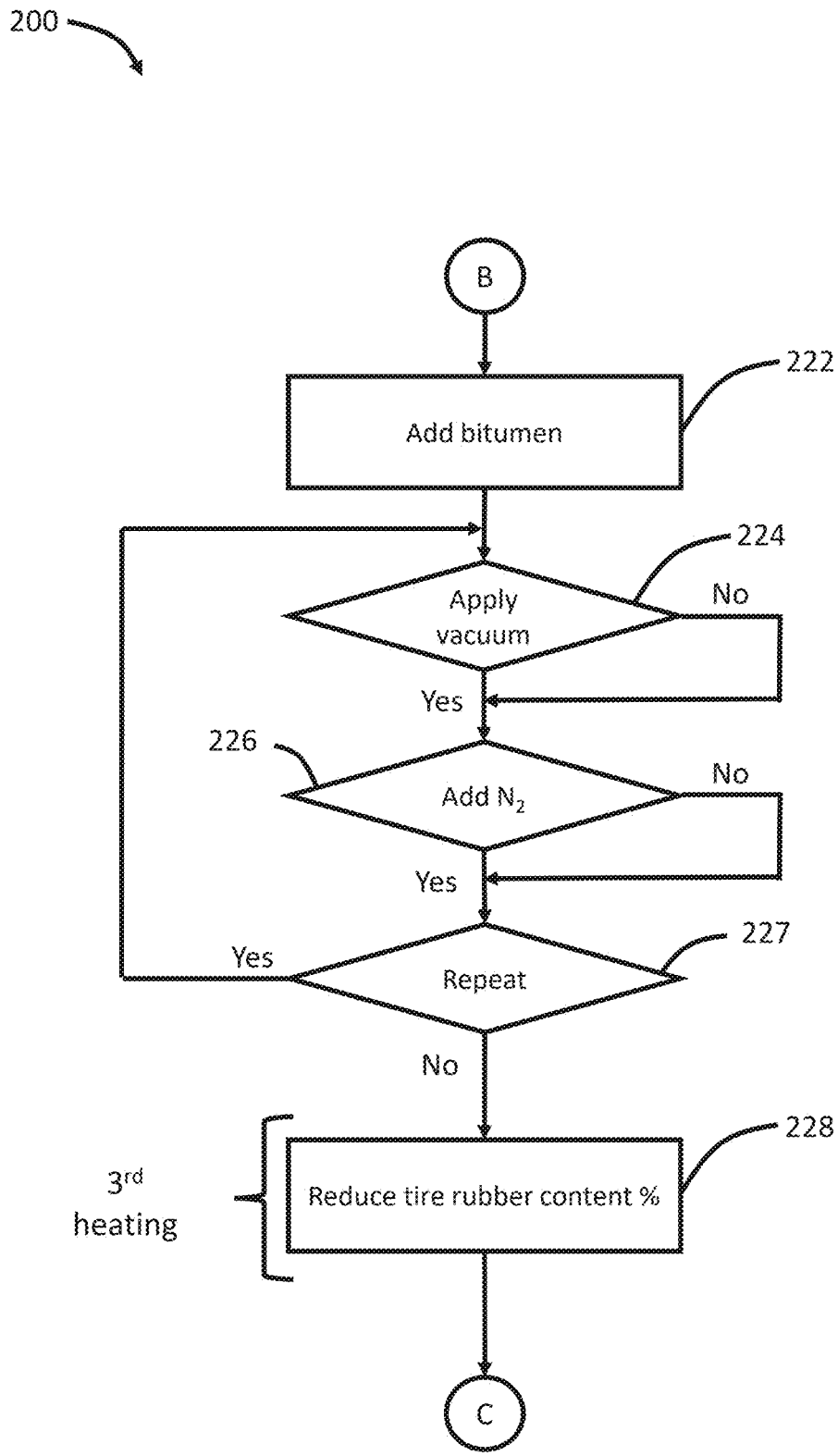
Figure 2D:
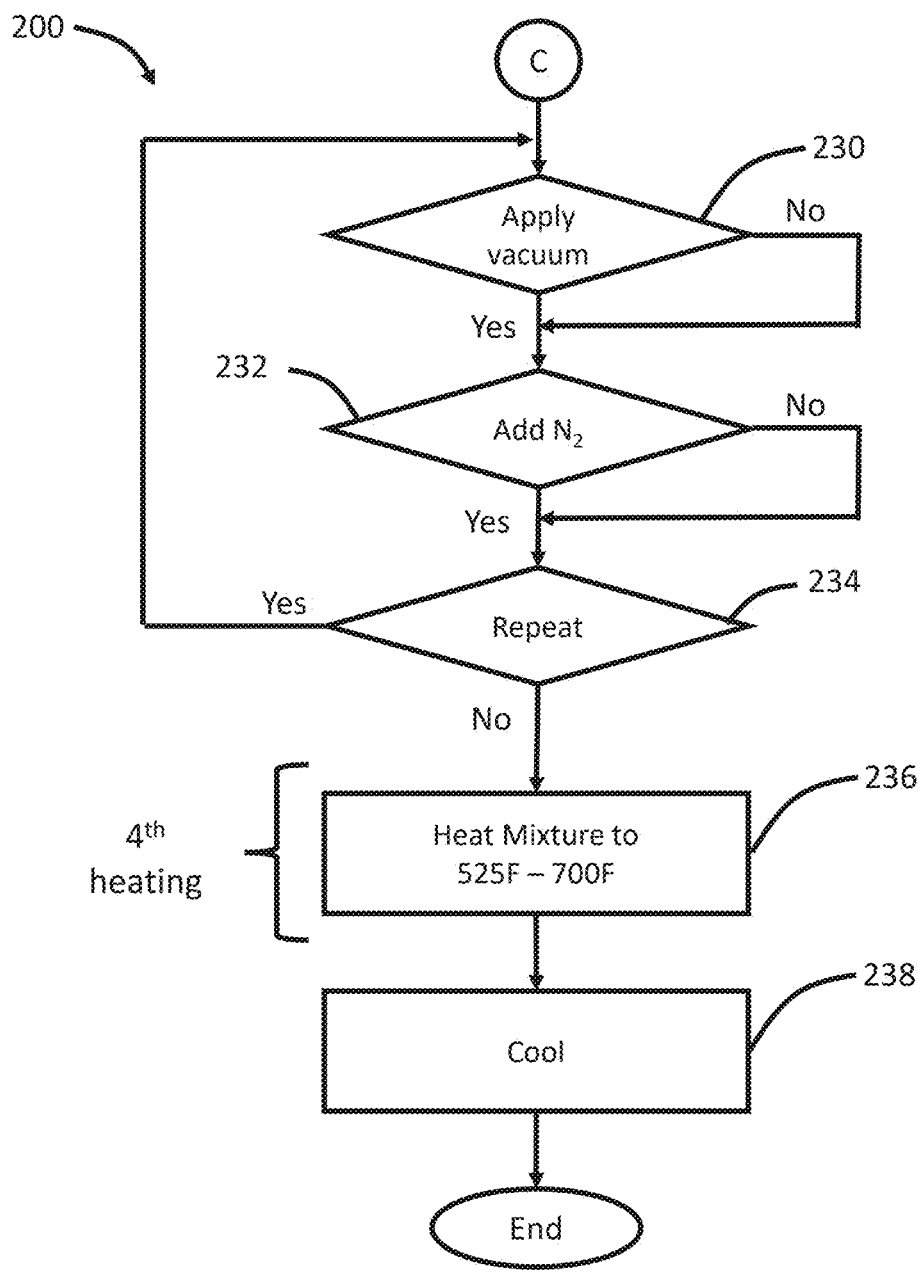
Figure 3A:
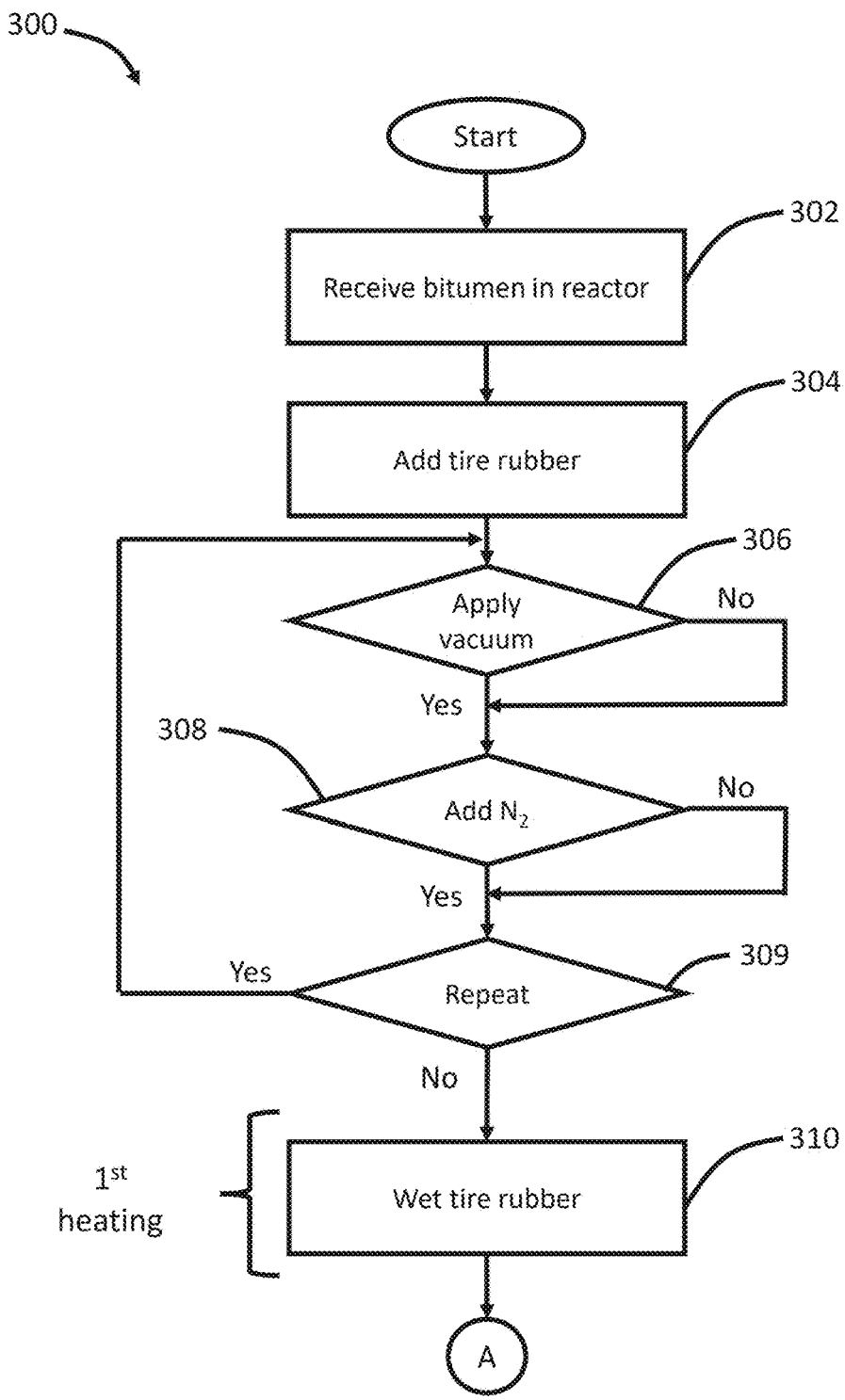
Figure 3B:
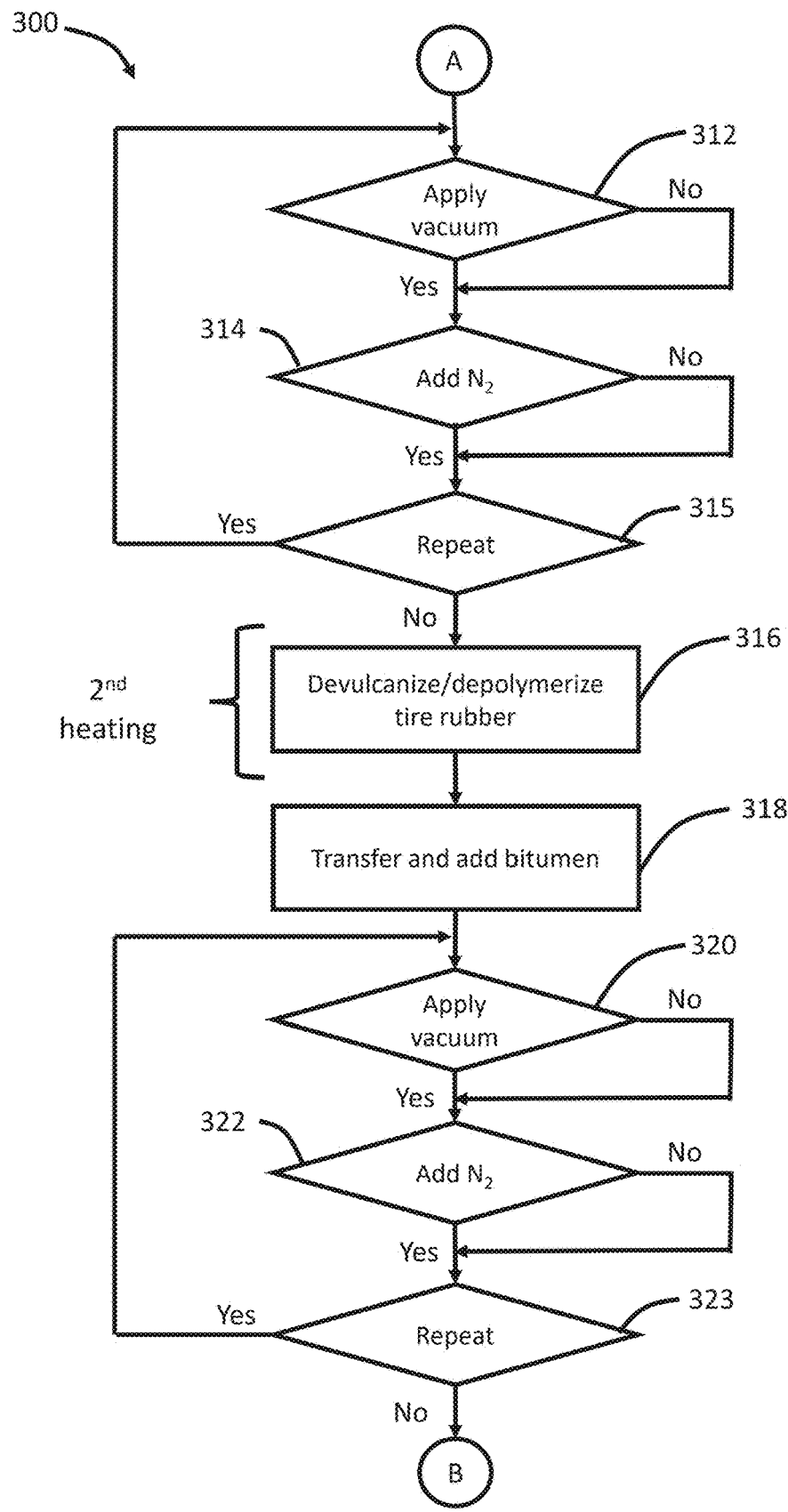
Figure 3C:
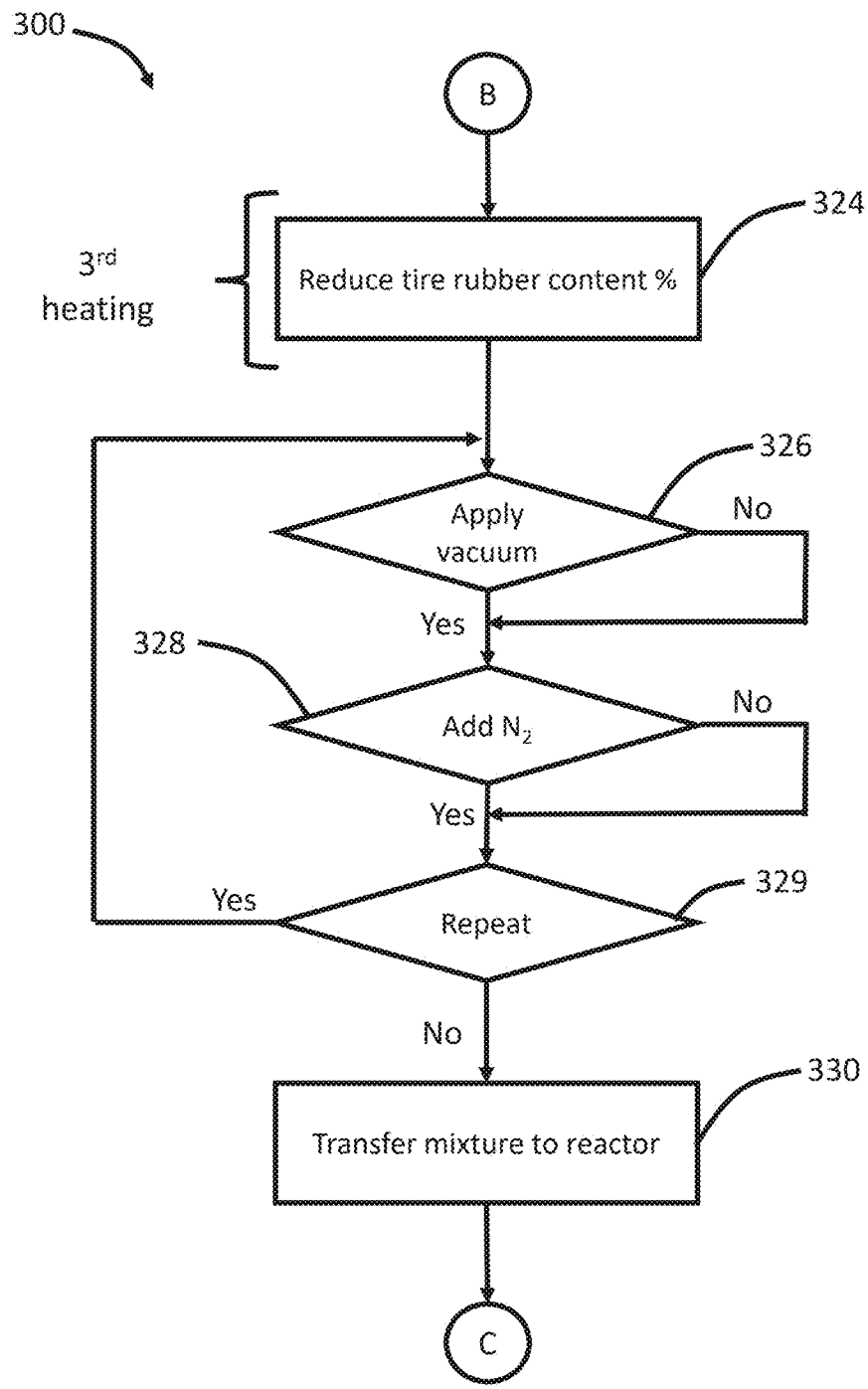
Figure 3D:
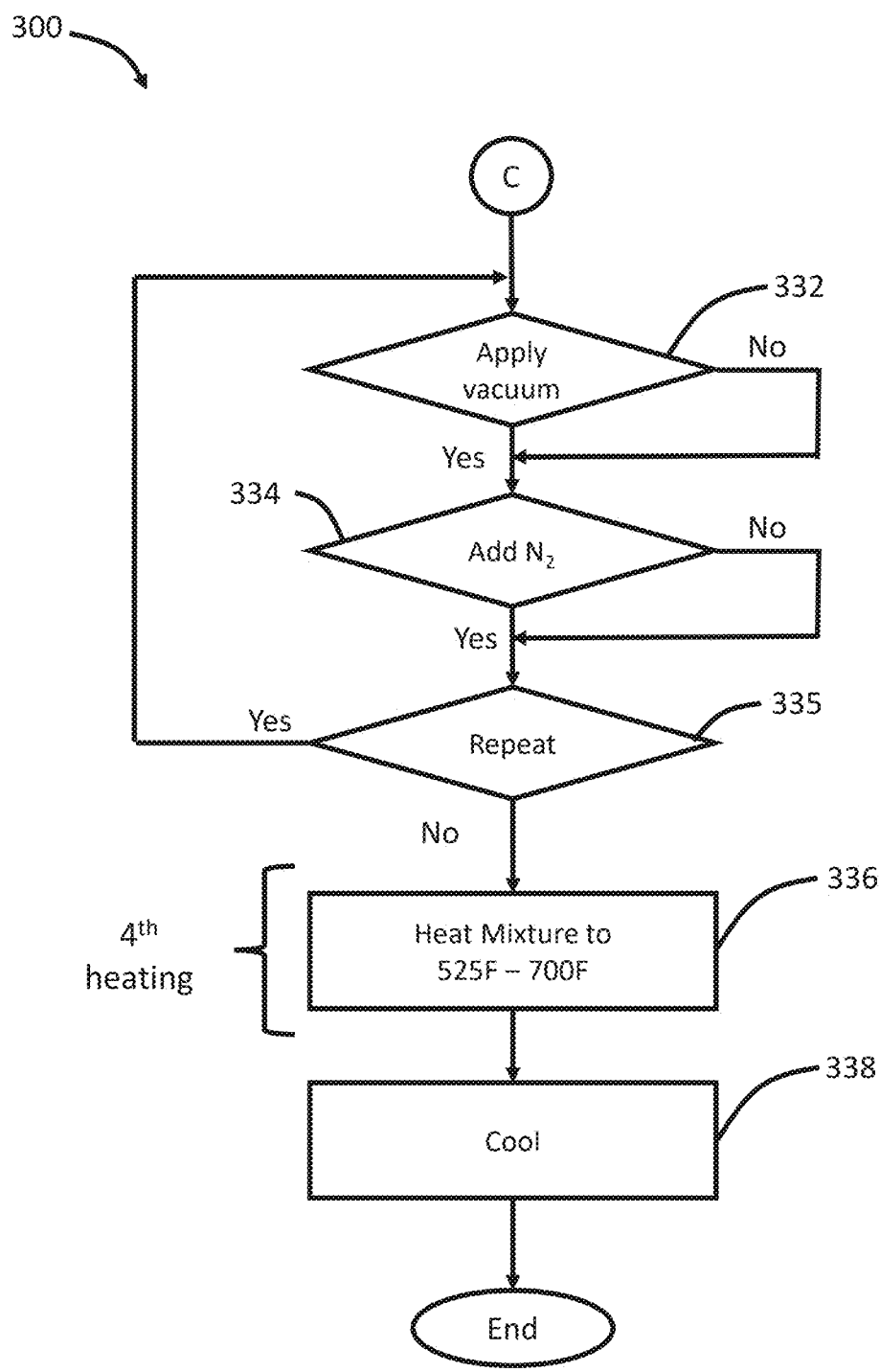

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the methods and compositions described herein may vary as to configuration and as to details. Additionally, the methods may vary as to details, order of the actions, or other variations without departing from the illustrative methods disclosed herein.

The inventors present systems and methods of dissolving tire rubber into bitumen at advantageously high temperatures to generate dissolved tire rubber bitumen compounds having high levels tire rubber content. These systems and methods enable quick and complete dissolution of a variety of types of tire rubber ranging from highly processed ground tire rubber ("GTR") to scrap tire chunks, which may be a mixture of various sized tire rubber scraps or particles, i.e., mixed tire rubber. These methods are known collectively as Rapid Digestion Processes ("RDP") that produce dissolved rubber bitumen compounds comprising up to 70% rubber by weight. These dissolved rubber bitumen compounds may also be termed RDP products.

The inventors hypothesize that the RDP systems and methods presented herein release oils, carbon black, and other organic compounds from the vulcanized rubber, which enhances the maltene fraction of the resulting dissolved tire rubber bitumen compound. These released oils improve the pliability of the bitumen binder. The release of carbon black improves the weathering resistance because the bitumen can retain its dark color. Also, the release of the carbon black results in a deep black bitumen coloration that maintains a high contrast marking surface longer than conventional bitumen binders. However, some of the released oils and organic compounds may disadvantageously lower the flash point and increase the mass loss of the resulting dissolved rubber bitumen compound, requiring further processing to yield a safe and stable material, as further disclosed herein.

Processes such as Flanigan (described above) teach heating to a temperature of 485° F. to 510° F. and requires high shear mixing for 5 to 10 hours to reduce the particle size of the rubber so that a solubility of better than 90% is achieved. However, the Flanigan process fails to improve the material performance because no significant increase in penetration at 77° F. is observed over the original bitumen. The inventors hypothesize that the exposure of the vulcanized rubber at this temperature range fails to completely release the process oils from GTR or scrap tire rubber and, further, due to the extended exposure of the mixture to heat and oxygen, the bitumen is degraded by oxidation and a reduction of the bitumen maltene fraction. Furthermore, the Flanigan process shows an increase in the carbonyls and sulfoxides that have been reported as indicators of accelerated aging. Thus, there are various limitations of Flanigan that are overcome by the systems, methods and compositions presented herein.

Many polymers, such as unmodified tire rubber will slowly depolymerize in the presence of ozone, sun light, and high temperature spots caused by heavy traffic. Thus, the addition of unmodified tire rubber to bitumen can offer a low quality product that is not usually suitable for use as a road paving product. Depolymerization of rubber mixed into bitumen leads to cracks and other weaknesses in the asphalt product that are susceptible to water damage from freeze thaw cycles.

The systems, methods and compositions presented may be applied to asphalt road paving, asphalt bridge coating, hot mix asphalt, warm mix asphalt, cold mix asphalt, hot applied chip seal, applied emulsions, asphalt cutback, tack coats, pavement membranes, fog seal, bond coating, crack fillers, seal coats, thin overlay binders, microsurfacing, pavement joint and caulking fillers and driveway fillers. In some embodiments, the systems, methods and compositions presented may be applied to roofing flux, roofing coatings, polymer modified roofing compounds, peel and stick compounds, waterproofing applications, pipe metal, concrete, and other coatings. The systems and methods presented herein overcome the challenges associated with undissolved rubber or inconsistently dissolved rubber in bitumen, and particularly undissolved scrap tire rubber.

With respect to hot and cold applied chip seal, the systems, methods, and compositions drastically reduce spray blockages during hot chip seal application. Additionally, the uniformity and consistent viscosity results in a more even bitumen application and improved adhesion of the gravel chip seal to the road surface.

With respect to asphalt emulsions, the systems, methods, and compositions presented herein result in a high solubility of the tire rubber, which allows for a uniform dispersion of a consistent viscosity bitumen that is easily emulsified in anionic, cationic, and non-ionic emulsion technologies.

The systems, methods and compositions combine tire rubber and bitumen at a series of temperatures and mixing types to produce an improved bitumen mixture referred to as a dissolved tire rubber bitumen compound. The "tire rubber" used to produce the tire rubber bitumen compound may include, by way of example and not of limitation, GTR, scrap tire rubber, other such tire rubber, and any combination thereof.

Additionally, the systems, methods and compositions presented herein provide a better than 99% dissolution of tire rubber in bitumen that drastically reduces spray blockages. Additionally, the systems, methods and compositions provide uniform and consistent viscosity results, which provides improved adhesion. Furthermore, the dark coloration from the carbon black in the tire rubber results in a uniform black surface with improved weather capabilities. Further still, the oils released from the tire rubber improve the tack and adhesion properties of the resulting tire rubber bitumen compound, providing a stronger bond to surfaces, e.g., a driveway surface.

While depolymerization of the rubber added to the bitumen and/or oil compounds described herein is beneficial, pyrolization is detrimental. When rubber is exposed to too high a temperature for too long the rubber degrades and produces a complicated rubber and bitumen or rubber and oil mixture comprising many highly volatile compounds that may be useful as a fuel but not as a bitumen or oil product and exhibiting a viscosity lower than desired in a workable bitumen/oil product. Further, the resulting fuel product contains significant quantities of sulfur compounds that must be removed. The maximum reported degradation rates for rubber occur above 700° F.

In contrast, process temperatures that are too low does not result in sufficient depolymerization. The inventors hypothesize that below 525° F. very limited depolymerization occurs, and instead rubber is simply devulcanized or de-cross-linked. And to accomplish the requisite level of depolymerization at temperatures below 525° F. would require too long and too expensive a process, such as requiring expensive shear or elevated pressure, for practical industrial process scales.

The systems, methods and compositions presented herein may be applied to asphalt cutback, pavement membranes, tack coats, pavement joint and caulking fillers driveway sealer, roofing flux, roofing coatings, polymer modified roofing compounds, peel and stick compounds, waterproofing applications, pipe metal, concrete, and other coatings. Asphalt tack coats (hot applied, solvent, and emulsion based) are used to improve the adhesion between layers of asphalt pavement.

The systems, methods, and compositions presented herein may be applied to asphalt road paving as a "binder." The term binder is defined more clearly in the compositions section below.

The term "asphalt" is defined by the American Society for Testing and Material (ASTM) as a dark brown to black cementitious material solid or semi solid in consistency, in which the predominating constituents are naturally occurring bitumens or are obtained from refining petroleum. More generally, the present compositions and methods described herein consider asphalt a colloidal system composed primarily of bitumen and aggregate.

The term "bitumen" refers to a generic term that according to the ASTM relates to a mixture of hydrocarbons of natural or pyrogenous origin, or a combination of both, frequently accompanied by their non-metallic derivates, which may be gaseous, liquid, semisolid, or solid and which are completely soluble in carbon disulphide. In commercial practice the term bitumen is used for the semisolid or solid bitumen which includes tars and pitches. Tars and pitches are obtained by destructive heat action on crude oil, coal and other organic materials. For the purposes of this disclosure, bitumen is understood to be composed of asphaltenes and maltenes, in contrast to some industry terminology that identifies asphalt as being composed of asphaltenes and maltenes. The relative amounts of asphaltenes and maltenes in the bitumen determine the physical and chemical behavior of any given asphalt derived therefrom. In some embodiments, the bitumen may be non-petroleum based, such as plant derived bitumen.

The term "asphaltene(s)" refers to the portion of bitumen that is naphtha insoluble, so that in an excess of naphtha the asphaltenes remain insoluble. The asphaltenes may represent up to 50% of bitumen, in which a major portion of total Oxygen, Nitrogen, Sulfur, Nickel and Vanadium are concentrated. Asphaltenes are brown to black amorphous solids. Asphaltenes have carbon/hydrogen ratios of 0.81-1.00 which indicates they are aromatic in nature. Their molecular weight ranges from 500-7000 Daltons ("Da").

The term "maltene" refers to the naphtha soluble portion of bitumen. The maltene fraction is free of asphaltenes and carbenes. The maltene carbon/hydrogen ratio is in the range of 0.6-0.75 which indicates that the molecular structure includes aliphatic chains or saturated rings. The maltene fraction includes resins and oils. The molecular weights are in the range of 500-1500 Da.

The term "resins" refers to cyclic aromatic compounds.

The term "oils" refers to saturated hydrocarbons having appreciable wax content.

The term "carbenes" refers to the highest carbon content fraction of bitumen. Carbenes are insoluble in carbon tetrachloride. Carbenes, if present, occur in trace amounts.

The term "asphalt feedstock" is used interchangeably with the term "bitumen" "asphalt bitumen," "asphalt bitumen feedstock," and/or oil starting materials.

The term "penetration" refers to the depth a standard steel needle with a truncated cone penetrates a properly prepared sample of bitumen. Penetration is related to hardness or consistency of the bitumen or any asphalt derived therefrom. The apparatus which permits the needle holder to move vertically without fraction and measures the depth of penetration to the nearest 0.1 mm is known as penetrometer. The distance that the needle penetrates in units of tenths of a millimeter is the penetration value. The weight of the needle is 50 g and another 50 g weight is placed on the needle, which results in a 100 g weight. The needle is slowly lowered onto a sample until it just makes contact with the surface of the sample. The dial of the penetrometer is adjusted to zero and the needle is released quickly for the specified period of five seconds and the distance penetrated is measured to the tenth of a millimeter.

The term "softening point" refers to a measure of temperature in which a steel ball passes through a ring that includes the bitumen sample and falls a distance of 2.54 cm, when the specimen, ball and bath of water/glycerin are heating at a specified rate. A steel ball, 9.54 mm in diameter, is placed in each ball centering guide.

The term "viscosity" refers to the viscosity determination of bitumen or any asphalt derived therefrom at elevated temperatures using a rotational viscometer as described in ASTM D4402, which is hereby incorporated by reference.

The term "mass loss" refers to the amount of volatile compounds that escape a bitumen or asphalt composition derived therefrom over time. Mass loss is measured as the percent of the initial mass lost, i.e. $m_l = 100 \times (m_i - m_f)/m_i$, where "$m_l$" is the mass loss, "$m_i$" is the initial mass, and "$m_f$" is the mass after a measurement time. This metric is useful for simulating asphalt binder aging, and is standardized under AASHTO T240 and ASTM D2872, which describe a rolling thin film oven procedure for exposing asphalt binders to high temperatures to simulate binder aging.

The term "volatile organic compound" ("VOC") refers to a broad group of non-methane hydrocarbons that encompass organic chemicals having a high vapor pressure at room temperature, i.e., a low boiling point. With respect to bitumen (or asphalt) VOC emission, VOCs are typically petroleum derived and can include, but are not limited to, acetone, ethanol, trimethylbenzene, toluene, butanone, isopropyl alcohol, benzene, dichloromethane, ethylacetate, heptane, ethylbenzene, xylene, benzo pyrene, anthracene, naphthalene, acridines, pyridines, and phenols.

The term "Styrenic Block Copolymer" or "SBC" refers to a large category of thermoplastic elastomers. SBCs possess the mechanical properties of rubbers, and the processing characteristics of thermoplastics. There are two broad classes of SBCs contemplated by this application: saturated and unsaturated. The saturated SBCs have a saturated alkyl backbone linking the styrenic blocks together, while the unsaturated SBCs have an unsaturated or poly-unsaturated backbone linking the styrenic blocks together. There are six major types of SBCs contemplated by this application, Styrene-Butadiene ("SB"), Styrene-Butadiene-Styrene ("SBS") block polymers, Styrene-isoprene-styrene ("SIS") block copolymers, Styrene-Ethylene copolymers ("SEC"), Styrene-Ethylene-Butylene-Styrene ("SEBS"), and hydrogenated styrenic block copolymers ("HSBC"). SB, SBS, and SIS are unsaturated, containing at least one Carbon-Carbon double bond ("C═C"). The HSBCs, SEC, and SEBS are saturated, having a saturated alkyl backbone linking the styrenic blocks together that lacks any C═C bonds, or Carbon-Carbon triple bonds, instead containing only C—C bonds and Carbon-Hydrogen bonds ("C—H"). In some embodiments, the SBS is radial.

The SBCs can be branched, start, radial, linear, diblock, triblock, tetrablock, or multiblock. The branched SBCs have one or more secondary polymer chains linked to a primary backbone at one or more location along the primary backbone. Both star and radial SBCs are subsets of branched SBCs. Star SBCs comprise a central point within the SBC polymer where four polymer chains link together. Radial SBCs comprise a central point within the SBC polymer where more than four polymer chains link together.

In some embodiments, the SBC has the general formulae S—B—S (I), or (S—B)$_n$—X (II), and may contain varying amounts of diblock S—B (III) up to 100%. In these formulae, each S independently is a poly(vinyl aromatic), and each B independently is: (1) a saturated alkyl chain or cycloalkyl block, (2) an unsaturated alkylene or cycloalkylene block, or (3) an unsaturated alkyne or cycloalkyne block, n is an integer equal to or greater than 2, and X is the residue of a coupling agent, where the coupling agent can be any di- or polyfunctional coupling agent known in the art.

An exemplary vinyl aromatic monomer is styrene. In some embodiments, the styrene moiety forming the SBCs are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl, cycloalkyl, alkylene, cycloalkylene, alkyne, or cycloalkyne moiety forming the SBC are substantially pure monomers or can contain minor proportions of structurally related alkyls, cycloalkyls, alkylenes, cycloalkylenes, alkynes, or cycloalkynes.

In one embodiment, the unsaturated SBCs comprise at least two polymer blocks. At least one of those at least two polymer blocks is substantially made of an aromatic vinyl compound and at least one other of the at least two polymer blocks is substantially made of a conjugated diene compound.

In another embodiment, the saturated SBCs comprise three polymer blocks. One of those polymer blocks is substantially made of an aromatic vinyl compound, one other of the polymer blocks is substantially made of a monoene chain compound, and another of the polymer blocks is substantially made of a second monoene chain compound.

The term "neutral gas" refers to non-reactive gases or non-oxygenated gases, such as, but not limited to, argon (Ar), carbon dioxide ($CO_2$), helium (He), neon (Ne), and nitrogen ($N_2$).

First Method for Dissolving Tire Rubber

Referring to FIGS. 1A-D, there is shown an illustrative method 100 for dissolving tire rubber in bitumen, known generally as the rapid digestion process ("RDP"). The RDP method presented herein includes exposing the tire rubber to a series of heating temperatures, including temperatures exceeding 500° F. for periods of 2 hours or less causing the tire rubber to depolymerize, reducing the molecular weight of the natural and synthetic rubbers dissolved into the bitumen.

The method 100 is initiated at block 102 where an appropriate bitumen feedstock is selected, received in a reactor tank, and pre-heated to between 275° F. and 325° F. By way of example and not of limitation, the illustrative bitumen feedstock has a penetration of 135 dmm @ 77° F. In some embodiments, the illustrative bitumen feedstock has a penetration of 23 dmm @ 77° F. In some embodiments, the illustrative bitumen feedstock has a penetration of less than 23 dmm @ 77° F. In some embodiments, the illustrative bitumen feedstock has a penetration of more than 135 dmm @ 77° F. In some embodiments, an oil compound may be substituted for the bitumen feedstock. Note, the method 100 may use only bitumen feedstock, only oil, or a combination of bitumen feedstock and oil. For purposes of this patent, the term "bitumen feedstock" generally refers to the application of bitumen, asphalt feedstock, oil, or the combination of asphalt feedstock and oil.

In some embodiments, the bitumen feedstock is received in a separate wetting tank and transferred to the reactor mixing vessel after the tire rubber has been fully wetted and/or formed a paste with the bitumen feedstock.

In some embodiments, at least some of the bitumen feedstock includes Trinidad Lake Asphalt, which is a thermoplastic material. The Trinidad Lake Asphalt may act as a carrier for the tire rubber into the wetting tank.

At block 104, tire rubber is added to the heated bitumen feedstock and mixed with heating. The tire rubber may be added as scrap tire chunks, rubber pellets 1 cm in diameter or smaller, such as 20 mesh GTR, 80 mesh GTR, or evenly extremely fine ground rubber particles as small as 300 mesh.

In some embodiments, the amount of tire rubber added to the bitumen feedstock comprises 1% or less by weight up to 70% by weight of the resulting mixture of tire rubber and bitumen feedstock. In a narrower illustrative embodiment, 5% to 50% by weight of tire rubber is added to the heated bitumen feedstock. In an even narrower illustrative embodiment, 7% to 30% by weight of tire rubber is added to the heated bitumen feedstock. In one narrow embodiment, 50% to 60% by weight of tire rubber is added to the heated bitumen feedstock. In another narrow embodiment, 55% to 60% by weight of tire rubber is added to the heated bitumen feedstock. In some embodiments utilizing 50% or more tire rubber, the tire rubber is added to bitumen with stirring to obtain even heat distribution.

In some embodiments, this initial mixture of tire rubber and bitumen feedstock is subjected to vacuum at block 106. The vacuum may be applied through an external vacuum pump. In some embodiments, the vacuum is applied through a vacuum pump integrated into the construction of the reactor. In some embodiments, the vacuum is applied through a positive displacement pump. In some embodiments, a determination is made at block 106 not to apply vacuum to the mixing vessel receiving the bitumen feedstock and tire rubber.

In some embodiments, the initial mixture of tire rubber and bitumen feedstock is flooded with $N_2$, a non-oxygenated gas, or any combination thereof at block 108. When the determination is made to flood the mixture with $N_2$, gaseous $N_2$ is released into the reactor. The gaseous $N_2$ may be released into the reactor by flooding a headspace above the mixture, by bubbling the gaseous $N_2$ up through the mixture, or any combination thereof. In other embodiments, a determination is made at block 108 not to flood the mixture with $N_2$.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the initial mixture of tire rubber and bitumen feedstock. In some embodiments, Nitrogen may also be introduced from the bottom of the reactor. In certain embodiments, Nitrogen may be introduced in the headspace and the bottom of the reactor vessel. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

When the determination is made to apply vacuum at block 106 and the determination is made to flood with $N_2$ at block 108, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 109, a determination is made whether to apply one or more cycles of the purge sweep operations described by steps 106 and 108.

Upon addition of the tire rubber to the bitumen feedstock, the two components are mixed with heating to fully wet the tire rubber with bitumen feedstock at block 110. This is termed the first heating step 110. During the first heating step 110, the temperature of the bitumen feedstock is maintained between 275° F. and 325° F. as the temperature of the added tire rubber is raised to match. In some embodiments, the bitumen feedstock and added tire rubber are mixed and/or stirred at low shear by one of a planetary mixer and an anchor agitator to fully wet the tire rubber with bitumen and/or form a paste of tire rubber and bitumen. An illustrative planetary mixer provides low shear mixing at RPMs ranging from <1 RPM up to 200 RPM depending on the size of the mixing vessel and planetary mixer. An illustrative anchor agitator provides low shear mixing at RPMs ranging from <1 RPM up to 200 RPM depending on the size of the mixing vessel and anchor agitator. Low shear mixing is especially appropriate when the bitumen feedstock has a high viscosity not suitable for moderate or high shear mixing, such as, but not limited to, 30,000 cP to 60,000 cP. In embodiments utilizing less viscous bitumen feedstock (i.e., having a viscosity below 30,000 cP), moderate shear mixing may be applied during this first heating step 110 by one of a planetary mixer, an impeller mixer, and a rotor stator. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

During the first heating step 110, the tire rubber and bitumen are heated and mixed for between 5 minutes and 60 minutes to generate a bitumen wetted tire rubber mixture. In narrower embodiments, the tire rubber and bitumen are heated and mixed for between 10 minutes and 20 minutes during the first heating step 110. In some embodiments, the tire rubber is mixed into the bitumen feedstock at temperatures between 290° F. and 315° F. In narrower embodiments, the tire rubber is mixed into the bitumen feedstock at temperatures between 300° F. and 310° F. In one embodiment, the tire rubber is mixed into the bitumen feedstock at a temperature of 305° F. In some embodiments, the tire rubber and bitumen are mixed with heating at least until 90% or more of the added tire rubber is fully wetted by the bitumen. In some embodiments, the tire rubber and bitumen are mixed and heated until all added tire rubber is fully wetted by the bitumen. This first heating step 110 generates a bitumen wetted tire rubber mixture of tire rubber pellets or particles uniformly dispersed in and wetted by the bitumen feedstock.

In embodiments utilizing a separate wetting vessel, the uniform mixture generated by the first heating step 110 can be pumped at between 275° F. and 325° F. into the reactor vessel without the tire rubber particles clumping together.

After generating the bitumen wetted tire rubber mixture, the mixture may be vacuumed at block 112. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum to the mixture after the first heating step 110.

Regardless of whether or not vacuum was applied at block 112, gaseous $N_2$ may be flooded or pumped into the reactor at block 114, such as into the headspace over the bitumen wetted tire rubber mixture. The application of $N_2$ may be made cyclically with vacuum as part of a purge and sweep protocol. In some embodiments, a determination is made to not flood or flush the reactor and bitumen wetted tire rubber mixture with $N_2$. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the bitumen wetted tire rubber mixture. Removal of oxygen prevents oxidation at temperatures approaching or even exceeding the lowest flash point of the mixture components, and prevents autoignition at processing temperatures up to 700° F.

When the determination is made to apply vacuum at block 112 and the determination is made to flood with $N_2$ at block 114, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 115, a determination is made whether to apply one or more cycles of the purge sweep operations described by steps 112 and 114.

At the block 116, the method proceeds with the addition of bitumen feedstock to the bitumen wetted tire rubber mixture to reduce the percent tire rubber content of the bitumen wetted tire rubber mixture. In some embodiments, the added bitumen may be the same as the bitumen feedstock received in block 102. In some embodiments, the added bitumen may be a different bitumen than the feedstock received in block 102. In some embodiments, the bitumen added is heated to the same temperature and/or temperature range as the bitumen wetted tire rubber mixture. In some embodiments, the bitumen added is not heated. In some embodiments, the addition of bitumen to the reactor vessel requires exposing the bitumen wetted tire rubber mixture to atmosphere.

After adding the bitumen to the bitumen wetted tire rubber mixture in block 116, the mixture may be vacuumed at block 118. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum to the mixture after adding bitumen in block 116.

In some embodiments, the bitumen wetted tire rubber mixture and additional bitumen feedstock is flooded with $N_2$, a non-oxygenated gas, or any combination thereof at block 120. When the determination is made to flood the mixture with $N_2$, gaseous $N_2$ is released into the reactor. In some embodiments, a determination is made to not flood or flush the reactor, the added bitumen, the bitumen wetted tire rubber mixture, or any combination thereof with $N_2$. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the added bitumen, the bitumen wetted tire rubber mixture, and any combination thereof. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 118, gaseous $N_2$ may be flooded or pumped into the vessel at block 120, such as into the headspace over the newly added bitumen and the bitumen wetted tire rubber mixture. The application of $N_2$ may be made cyclically with vacuum as part of a purge and sweep protocol. In some embodiments, a determination is made to not flood or flush the vessel with $N_2$. In some embodiments, some oxidation is necessary and thus some air or oxygen enters or is allowed to enter the reactor environment.

When the determination is made to apply vacuum at block 118 and the determination is made to flood with $N_2$ at block 120, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 121, a determination is made whether to apply one or more cycles of the purge sweep operations described by steps 118 and 120.

The method then proceeds to block 122 where the added bitumen and bitumen wetted tire rubber mixture are mixed and heated to fully incorporate the added bitumen into the bitumen wetted tire rubber mixture and thereby reduce the tire rubber content percent of the resulting fully wetted tire rubber bitumen mixture. This is termed the second heating step 122. In some embodiments, the mixture of the added bitumen and bitumen wetted tire rubber mixture are heated to between 325° F. and 350° F. In some embodiments, the added bitumen is heated prior to its addition. In some embodiments, the added bitumen is heated to between 325° F. and 350° F. prior to its addition. In some embodiments, the added bitumen is heated to a temperature within 10° F. of the temperature of the bitumen wetted tire rubber mixture to which it is added. In some embodiments, the added bitumen is heated to the same temperature as the bitumen wetted tire rubber mixture.

In some embodiments, the resulting fully wetted tire rubber bitumen mixture has a tire rubber content of 1% or less by weight up to 65% by weight. In some embodiments, the resulting fully wetted tire rubber bitumen mixture has a tire rubber content of 5% by weight up to 60% by weight. In some embodiments, the resulting fully wetted tire rubber bitumen mixture has a tire rubber content of 10% by weight up to 50% by weight.

In some embodiments, the added bitumen, bitumen wetted tire rubber mixture, fully wetted tire rubber bitumen mixture, and any combination thereof are mixed and/or stirred at low shear by one of a planetary mixer and an anchor agitator to decrease the viscosity of the mixture, decrease the percent content of tire rubber in the mixture, and reduce the size of the tire rubber particles in the mixture. An illustrative planetary mixer provides low shear mixing at RPMs ranging from <1 RPM up to 200 RPM depending on the size of the mixing vessel and planetary mixer. An illustrative anchor agitator provides low shear mixing at RPMs ranging from <1 RPM up to 200 RPM depending on the size of the mixing vessel and anchor agitator. Low shear mixing is especially appropriate when any of the added bitumen, bitumen wetted tire rubber mixture, fully wetted tire rubber bitumen mixture, and any combination thereof has a high viscosity not suitable for moderate or high shear mixing. In embodiments utilizing less viscous bitumen feedstock, moderate shear mixing may be applied during this second heating step 122 by one of a planetary mixer, an impeller mixer, or a rotor stator. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

In some embodiments, the second heating step 122 reduces the range of sizes of the tire rubber particles, so that the remaining tire rubber particles are more homogenously sized.

In some embodiments, the tire rubber content of the fully wetted tire rubber bitumen mixture is reduced by 10%, such as from 70% tire rubber content in the bitumen wetted tire rubber mixture down to 60% in the fully wetted tire rubber bitumen mixture; from 60% tire rubber content in the bitumen wetted tire rubber mixture down to 50% in the fully wetted tire rubber bitumen mixture; and from 50% tire rubber content in the bitumen wetted tire rubber mixture down to 40% in the fully wetted tire rubber bitumen mixture. In some embodiments, the tire rubber content of the fully wetted tire rubber bitumen mixture is reduced by 20%, such as from 60% tire rubber content in the bitumen wetted tire rubber mixture down to 40% in the fully wetted tire rubber bitumen mixture; from 50% tire rubber content in the bitumen wetted tire rubber mixture down to 30% in the fully wetted tire rubber bitumen mixture; and from 40% tire rubber content in the bitumen wetted tire rubber mixture down to 20% in the fully wetted tire rubber bitumen mixture.

Inventors hypothesize that by increasing the temperature of the bitumen wetted tire rubber mixture and reducing its percent content of tire rubber by adding more bitumen, process oils are released from the tire rubber and the viscosity decreases (possibly creating a flow within the reactor).

After generating the fully wetted tire rubber bitumen mixture in block 122, the mixture may be vacuumed at block 124. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum after generating the fully wetted tire rubber bitumen mixture in block 122.

In some embodiments, the fully wetted tire rubber bitumen mixture is flooded with $N_2$, a non-oxygenated gas, or any combination thereof at block 126. When the determination is made to flood the mixture with $N_2$, gaseous $N_2$ is released into the reactor. In some embodiments, a determination is made to not flood or flush the reactor and mixture with $N_2$. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the added bitumen, the bitumen wetted tire rubber mixture, and any combination thereof. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 124, gaseous $N_2$ may be flooded or pumped into the reactor at block 126, such as into the headspace over the fully wetted tire rubber bitumen mixture. The application of $N_2$ may be made cyclically with vacuum as part of a purge and sweep protocol. In some embodiments, a determination is made to not flood or flush the reactor with $N_2$. In some embodiments, some oxidation is necessary and thus some air or oxygen enters or is allowed to enter the reactor environment.

When the determination is made to apply vacuum at block 124 and the determination is made to flood with $N_2$ at block 126, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 127, a determination is made whether to apply one or more cycles of the purge sweep operations described by steps 124 and 126.

The method then proceeds to block 128 where the fully wetted tire rubber bitumen mixture is mixed and heated to devulcanize the tire rubber in the fully wetted tire rubber bitumen mixture, severing the sulfur-sulfur cross-links of any vulcanized rubber in the tire rubber particles. This is termed the third heating step 128 and generates a devulcanized fully wetted tire rubber bitumen mixture. In some embodiments, the temperature is raised to between 350° F. and 500° F. In narrower embodiments, the temperature is raised to between 375° F. and 400° F.

In some embodiments, the fully wetted tire rubber bitumen mixture is heated and mixed for between 20 minutes and 120 minutes to generate the devulcanized fully wetted tire rubber bitumen mixture. In narrower embodiments, the fully wetted tire rubber bitumen mixture is heated and mixed for between 30 minutes and 60 minutes to generate the devulcanized fully wetted tire rubber bitumen mixture.

In some embodiments, the fully wetted tire rubber bitumen mixture is heated and mixed with moderate shear by one of a planetary mixer, an impeller mixer, or a rotor stator to generate the devulcanized fully wetted tire rubber bitumen mixture. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

In some embodiments, the fully wetted tire rubber bitumen mixture is heated and mixed with high shear by one of a planetary mixer, an impeller mixer, and a rotor stator to generate the devulcanized fully wetted tire rubber bitumen mixture. An illustrative planetary mixer provides high shear mixing at RPMs ranging from 300 RPM up to 3000 RPM depending on the size of the mixing vessel and planetary mixer. An illustrative impeller mixer provides high shear mixing at RPMs ranging from 350 RPM up to 4500 RPM depending on the size of the mixing vessel and impeller mixer. An illustrative rotor stator provides high shear mixing at RPMs ranging from 350 RPM up to 4500 RPM depending on the size of the mixing vessel and rotor stator.

In some embodiments, the fully wetted tire rubber bitumen mixture is heated and mixed with a combination of moderate shear and high shear to generate the devulcanized fully wetted tire rubber bitumen mixture. In these embodiments, the fully wetted tire rubber bitumen mixture is mixed with moderate shear initially, which mixing intensity is increased to high shear mixing by increasing the RPMs of the agitator, either gradually, or after an initial period of mixing the comprises 10% of the mixing time, 25% of the mixing time, 50% of the mixing time, 75% of the mixing time, or 90% of the mixing time. In these embodiments, the fully wetted tire rubber bitumen mixture is mixed with moderate shear initially, which mixing intensity is increased gradually and consistently from the RPMs associated with moderate shear mixing to the RPMs associated with high shear mixing. An illustrative planetary mixer provides moderate shear mixing at RPMs ranging from 50 RPM up to 1000 RPM and high shear mixing at RPMs ranging from 300 RPM to 3000 RPM, depending on the size of the mixing vessel and planetary mixer. An illustrative impeller mixer provides moderate shear mixing at RPMs ranging from 200

RPM up to 3500 RPM and high shear mixing at RPMs ranging from 350 RPM up to 4500 RPM, depending on the size of the mixing vessel and impeller mixer. An illustrative rotor stator provides moderate shear mixing at RPMs ranging from 200 RPM up to 3500 RPM and high shear mixing at RPMs ranging from 350 RPM up to 4500 RPM, depending on the size of the mixing vessel and rotor stator.

During this third heating step 128, the size of the tire rubber particles dispersed in the devulcanized fully wetted tire rubber bitumen mixture is further reduced to 20 mesh or smaller. In some embodiments, the size of the tire rubber particles is further reduced to 325 mesh or smaller. In some embodiments, the size of the tire rubber particles is further reduced to 40 microns or smaller.

Inventors hypothesize that this third heating step 128 causes the tire rubber particles to become soft and pliable as at least one of the natural rubbers, the synthetic rubbers, and all rubber polymers contained in the tire rubber are devulcanized.

After generating the devulcanized fully wetted tire rubber bitumen mixture in block 128, the mixture may be vacuumed at block 130. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum after generating the devulcanized fully wetted tire rubber bitumen mixture in block 128.

In some embodiments, the devulcanized fully wetted tire rubber bitumen mixture is flooded with $N_2$, a non-oxygenated gas, or any combination thereof at block 132. When the determination is made to flood the mixture with $N_2$, gaseous $N_2$ is released into the reactor. In other embodiments, a determination is made at block 132 not to flood the mixture with $N_2$.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the fully wetted tire rubber bitumen mixture, the devulcanized fully wetted tire rubber bitumen mixture, and any combination thereof. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 130, gaseous $N_2$ may be flooded or pumped into the reactor at block 132, such as into the headspace over the devulcanized fully wetted tire rubber bitumen mixture. The application of $N_2$ may be made cyclically with vacuum as part of a purge and sweep protocol. In some embodiments, a determination is made to not flood or flush the reactor with $N_2$. In some embodiments, some oxidation is necessary and thus some air or oxygen enters or is allowed to enter the reactor environment.

When the determination is made to apply vacuum at block 130 and the determination is made to flood with $N_2$ at block 132, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 133, a determination is made whether to apply one or more cycles of the purge sweep operations described by steps 130 and 132.

At block 134, the devulcanized fully wetted tire rubber bitumen mixture undergoes a fourth heating step, in which the devulcanized fully wetted tire rubber bitumen mixture is heated to between 500° F.-700° F. in the illustrative reactor vessel. In some narrower embodiments, the devulcanized fully wetted tire rubber bitumen mixture is heated to 525° F.-700° F. during the fourth heating step 134. In some narrower embodiments, the devulcanized fully wetted tire rubber bitumen mixture is heated to 650° F.-700° F. during the fourth heating step 134. In some narrower embodiments, the devulcanized fully wetted tire rubber bitumen mixture is heated to 599° F.-630° F. during the fourth heating step 134. In some narrower embodiments, the devulcanized fully wetted tire rubber bitumen mixture is heated to 630° F.-640° F. during the fourth heating step 134. In some narrower embodiments, the devulcanized fully wetted tire rubber bitumen mixture is heated to 600° F.-605° F. during the fourth heating step 134.

The devulcanized fully wetted tire rubber bitumen mixture is subjected to this further heating where it is mixed at the prescribed temperature range of 500° F.-700° F. for between 10 minutes to 120 minutes to generate a solubilized tire rubber bitumen product, also termed the rapid digestion process ("RDP") product.

In some narrower embodiments, the devulcanized fully wetted tire rubber bitumen mixture is mixed and heated for between 15 minutes to 90 minutes. In some narrower embodiments, the devulcanized fully wetted tire rubber bitumen mixture is mixed and heated for between 45 minutes to 75 minutes. In some narrower embodiments, the devulcanized fully wetted tire rubber bitumen mixture is mixed and heated for between 55 minutes to 65 minutes.

In some embodiments, the devulcanized fully wetted tire rubber bitumen mixture is heated during the fourth heating step 134 with high shear mixing by one of a planetary mixer, an impeller mixer, and a rotor stator to generate the solubilized tire rubber bitumen product. An illustrative planetary mixer provides high shear mixing at RPMs ranging from 300 RPM up to 3000 RPM depending on the size of the mixing vessel and planetary mixer. An illustrative impeller mixer provides high shear mixing at RPMs ranging from 350 RPM up to 4500 RPM depending on the size of the mixing vessel and impeller mixer. An illustrative rotor stator provides high shear mixing at RPMs ranging from 350 RPM up to 4500 RPM depending on the size of the mixing vessel and rotor stator. In some embodiments, the type of mixing applied to the devulcanized fully wetted tire rubber bitumen mixture during step 134 transitions from moderate shear mixing to high shear mixing. In these embodiments, the fully wetted tire rubber bitumen mixture is mixed with moderate shear initially, which mixing intensity is increased to high shear mixing by increasing the RPMs of the agitator, either gradually, or after an initial period of mixing the comprises 10% of the mixing time, 25% of the mixing time, 50% of the mixing time, 75% of the mixing time, or 90% of the mixing time. In these embodiments, the fully wetted tire rubber bitumen mixture is mixed with moderate shear initially, which mixing intensity is increased gradually and consistently from the RPMs associated with moderate shear mixing to the RPMs associated with high shear mixing. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

Inventors hypothesize that this fourth high temperature rapid digestion heating step 134 reduces the molecular weight of the natural and synthetic rubbers comprising the tire rubber dissolved in the devulcanized fully wetted tire rubber bitumen mixture and the resulting RDP product by depolymerizing those natural and synthetic rubber components.

After generating the solubilized tire rubber bitumen product by fully dissolving the tire rubber into the bitumen at increasing temperatures, this RDP product may be cooled to 400° F. or lower for transfer and/or storage at block 136. Cooling may be performed by quenching the RDP product with an addition of more bitumen at a lower temperature, which cools the RDP compound to 500° F. or less. In some embodiments, the amount of bitumen used to quench the RDP compound does not significantly reduce the tire rubber content of the RDP product. In some embodiments, the amount of bitumen used to quench the RDP compound decreases the percent tire rubber content of the RDP compound. In some embodiments, the amount of bitumen used to quench the RDP compound decreases the percent tire rubber content of the RDP compound 10%, such as from 50% down to 40%. In some embodiments, the amount of bitumen used to quench the RDP compound decreases the percent tire rubber content of the RDP compound 20%, such as from 50% down to 30%.

In some embodiments, the RDP compound generated is cooled to 50° F. below the Cleveland Open Cup ("COC") flash point of the solubilized tire rubber bitumen compound. In some embodiments, water may be used to cool down the RDP compound and/or modified versions thereof to 500° F. or less. In some embodiments, the dissolved tire rubber bitumen mixture is cooled by a heat exchanger. In some embodiments, the cooled dissolved tire rubber bitumen compound is transferred to a storage vessel or processing vessel. The storage or processing vessel may be metal, and particularly of a stainless steel construction. The storage vessel may be open to atmosphere or enclosed, and while such enclosure need not be air tight, it may be a chamber sealed from external atmosphere.

The illustrative solubilized tire rubber bitumen mixture or RDP compound shows a substantial increase in penetration. Further, the homogeneous RDP compound generated by method 100 can be poured through a 100 mesh sieve. Additionally, the RDP rubber and bitumen compound may be solubilized in D-Limonene with better than 99.0% passing through No. 54 Whatman filter paper.

The solubility of the solubilized tire rubber bitumen compound was tested by dissolving 3 grams of the compound in a 125 ml of a solution composed of at least 90% D-Limonene CAS 5989-27-5. The solution was warmed gently on a hot plate with stirring for between 5 to 7 minutes—at which point the solid solubilized tire rubber bitumen compound sample is visibly dissolved in the D-Limonene. The solution was allowed to return to ambient temperature (about 15 minutes) and vacuum filtered using a No. 54 Whatman filter paper and Buchner funnel.

To validate that the tire rubber has been solubilized into the bitumen, the D-Limonene Solubility test as described in ASTM D2042 is utilized. The solubility test indicates that after a cold solvent wash, less than 0.6% residue remains, thus showing that the tire rubber has been substantially solubilized.

There is no significant difference or change in softening point of the bitumen feedstock after the tire rubber is added and RDP product generated. However, a substantial increase in penetration depth is observed after the tire rubber is digested during the heating processes of method 100. This increase in penetration depth is likely due to the release of compounding oils from the tire rubber into the bitumen, with little or no significant oxidation of the bitumen because of a Nitrogen purge on the mixing vessel.

$G^*/\sin \delta$ @ 52° C., (Pa S) is a rheological measure representing the measure of road binder stiffness by aging in a Rolling Thin Film Oven (RTFO) for 86 minutes at 140° C., which simulates aging in a paving hot mix plant. Typically, an unaged binder has a value of "1" before RTFO aging, and this value increases to "2.2" following RTFO aging.

Interestingly, the RDP compound has a RTFO aging value is "1.3." The inventors' postulate that the oils from the tire rubber that are extracted during the heating processes of method 100 reduce the effects of aging. This unexpected result substantially improves the aging of the resulting RDP compound.

Mass loss is an important challenge to overcome for dissolved tire rubber bitumen compounds, as the tire rubbers comprise a greater concentration of low boiling point compounds than bitumen generally. As such, the more tire rubber that is added to bitumen during the method 100 to produce the RDP product, the greater the mass loss of those resulting compounds. Importantly, a key indicator of binder aging is the loss of smaller molecules (such as, but not limited to, VOCs) that increase a bitumen compound's viscosity. As the amount of mass loss increases, asphalt binders age and become less viscous. Additionally, since mass loss is attributed to the loss of smaller molecules, the flashpoint of compounds with high mass loss is much lower than compounds with low mass loss. Most applicable regulatory agencies require asphalt paving compounds to have mass loss of 1% or less as determined by the RTFO test described in AASHTO T240 and ASTM D2872. Thus, solubilized tire rubber bitumen compounds having greater than 1% mass loss may not be commercially useful for any paving applications due to regulatory concerns.

The RDP compounds produced from the method 100 show no appreciable mass loss. Inventors hypothesize that this attribute of the RDP compounds arises from the series of heating steps 110, 122, 128, and 134, which incorporate the low boiling point molecules into the matrix of the solubilized tire rubber bitumen compound. The inventors further hypothesize that the heated tire rubber releases process oils from the tire rubber into the maltene fraction of the bitumen or asphalt feedstock, which improves both the oxidation resistance and ductility properties. Additionally, the inventors hypothesize that the bitumen is actually rejuvenated by the increase of the maltene to asphaltene fraction as observed when processing bitumen with vulcanized rubber, i.e., the solubilized tire rubber bitumen compounds produced by this method 100. The resulting RDP compound experiences a significant increase of measured penetration depth at 77° F. over the original bitumen feedstock while minimizing the oxidation and aging reactions associated with exposure of bitumen to high temperatures.

The inventors also hypothesize that the Sulfur-Carbon ("S—C") bonds are easier to break than the Carbon-Carbon ("C—C") bonds. In other words, the heating processes described herein "devulcanize" the rubber by removing the cross-linking caused by the S—C bonds between the polymer chains having C—C bonds. The result is the more soluble polymers, i.e., oils with C—C bonds, are dissolved in the mixing vessel. In some embodiments, this dissolution of soluble polymers occurs prior to increasing the temperature in the reaction vessel to 500° F.-700° F.

This hypothesis is supported by the finding that the addition and dissolution of tire rubber reduces the flash point of the bitumen starting material. For example, an original bitumen flux COC flash point was 687° F. After incorporation of 20% tire rubber at 600° F. for 30 minutes, the COC flash point of the resulting RDP compound dropped to 608° F. This drop in flash point is caused by more soluble oils being released from the tire rubber. The process oils used to manufacture tires have flash points ranging from 400° F.-500° F., thus the flash point would be reduced when the oils are released from their fixated state in the tire rubber.

Furthermore, similar to the recent use of saponification agents, such as stearamides and phosphates, in bitumen, saponification agents can be added to the resulting solubilized tire rubber bitumen compound to adjust the properties of softening point and penetration depth while allowing good viscosity control as needed. The solubilized tire rubber bitumen compound may also be combined with saturated fabrics such as fiberglass, polyester, rayon, nylon, or combinations thereof in various applications, such as paving, roofing, mining liners, and waterproofing. Further still the solubilized tire rubber bitumen compound may be used in drilling fluid applications to improve the viscosity curve of bitumen, thereby expanding the range of formulation options available to a drill fluid chemist.

Further still, the use of GTR and other vulcanized rubber containing carbon black enhances the black color of the RDP tire rubber bitumen compound. This enhancement, in addition to the improved weathering commonly associated with carbon black, allows the paving produced with RDP compounds to yield a long lasting high contrast surface for traffic marking that greatly improves both day and night time visibility. Additionally, in roofing applications, the carbon black stabilizes the roof coating, improving weathering resistance, and provides a deep black uniform surface for enhanced appearance of various blended and single color granule applications.

Second Method for Dissolving Tire Rubber

Referring to FIGS. 2A-D, there is shown an illustrative method 200 for dissolving tire rubber in bitumen. The RDP method presented herein includes exposing the tire rubber to a series of heating temperatures, including temperatures exceeding 500° F. for periods of 2 hours or less causing the tire rubber to depolymerize, reducing the molecular weight of the natural and synthetic rubbers dissolved into the bitumen.

The method 200 is initiated at block 202 where a bitumen feedstock is received in a reactor tank and pre-heated to between 275° F. and 325° F. By way of example and not of limitation, the illustrative bitumen feedstock has a penetration of 135 dmm @ 77° F. In some embodiments, the illustrative bitumen feedstock has a penetration of 23 dmm @ 77° F. In some embodiments, the illustrative bitumen feedstock has a penetration of less than 23 dmm @ 77° F. In some embodiments, the illustrative bitumen feedstock has a penetration of more than 135 dmm @ 77° F. In some embodiments, an oil compound may be substituted for the bitumen feedstock. The method 200 may use only bitumen feedstock, only oil, or a combination of bitumen feedstock and oil.

In some embodiments, the bitumen feedstock is received in a separate wetting tank and transferred to the reactor mixing vessel after the tire rubber has been fully wetted and/or formed a paste with the bitumen feedstock during step 216, described below.

In some embodiments, at least some of the bitumen feedstock includes Trinidad Lake Asphalt, which is a thermoplastic material. The Trinidad Lake Asphalt may act as a carrier for the tire rubber into the wetting tank.

At block 204, tire rubber is added to the heated bitumen feedstock and mixed with heating. The tire rubber may be added as scrap tire chunks, rubber pellets 1 cm in diameter or smaller, such as 20 mesh GTR, 80 mesh GTR, or evenly extremely fine ground rubber particles as small as 300 mesh.

In some embodiments, the amount of tire rubber added to the bitumen feedstock comprises 1% or less by weight up to 70% by weight of the resulting mixture of tire rubber and bitumen feedstock. In a narrower illustrative embodiment, 5% to 50% by weight of tire rubber is added to the heated bitumen feedstock. In an even narrower illustrative embodiment, 7% to 30% by weight of tire rubber is added to the heated bitumen feedstock. In one narrow embodiment, 50% to 60% by weight of tire rubber is added to the heated bitumen feedstock. In another narrow embodiment, 55% to 60% by weight of tire rubber is added to the heated bitumen feedstock. In some embodiments utilizing 50% or more tire rubber, the tire rubber is added to bitumen with stirring to obtain even heat distribution.

In some embodiments, this initial mixture of tire rubber and bitumen feedstock is subjected to vacuum at block 206. The vacuum may be applied through an external vacuum pump. In some embodiments, the vacuum is applied through a vacuum pump integrated into the construction of the reactor. In some embodiments, the vacuum is applied through a positive displacement pump. In some embodiments, a determination is made at block 206 not to apply vacuum to the mixing vessel receiving the bitumen feedstock and tire rubber.

In some embodiments, the initial mixture of tire rubber and bitumen feedstock is flooded with $N_2$, a non-oxygenated gas, or any combination thereof at block 208. When the determination is made to flood the mixture with $N_2$, gaseous $N_2$ is released into the reactor. The gaseous $N_2$ may be release into the reactor by flooding a headspace above the mixture, by bubbling the gaseous $N_2$ up through the mixture, or any combination thereof. In some embodiments, a determination is made at block 208 not to flood the mixture with $N_2$.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e., mixing vessel, to provide a low pressure sweep in the headspace of the mixing vessel to remove the air present and prevent oxygen entrapment in the initial mixture of tire rubber and bitumen feedstock. In some embodiments, Nitrogen may also be introduced from the bottom of the reactor. In certain embodiments, Nitrogen may be introduced in the headspace and the bottom of the reactor vessel. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

When the determination is made to apply vacuum at block 206 and the determination is made to flood with $N_2$ at block 208, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 209, a determination is made whether to apply one or more cycles of the purge sweep operations described by steps 206 and 208.

Upon addition of the tire rubber to the bitumen feedstock, the two components are mixed with heating to devulcanize the tire rubber at block 210. This is termed the first heating step 210 and devulcanizes the tire rubber added to the bitumen feedstock by severing the sulfur-sulfur cross-links of any vulcanized rubber in the tire rubber particles. This first heating step 210 generates a devulcanized tire rubber and bitumen mixture. In some embodiments, the temperature is raised to between 350° F. and 500° F. In narrower embodiments, the temperature is raised to between 375° F. and 400° F.

In some embodiments, the tire rubber and bitumen are heated and mixed for between 20 minutes and 120 minutes to generate a mixture of devulcanized tire rubber and bitumen. In narrower embodiments, the tire rubber and bitumen are heated and mixed for between 30 minutes and 60 minutes to generate a mixture of devulcanized tire rubber and bitumen.

In some embodiments, the tire rubber and bitumen are mixed with moderate shear by one of a planetary mixer, an impeller mixer, or a rotor stator to generate the devulcanized tire rubber and bitumen mixture. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator. In some embodiments, devulcanized tire rubber and bitumen are mixed with low shear by one of a planetary mixer and an anchor agitator to generate the devulcanized tire rubber and bitumen mixture. An illustrative planetary mixer provides low shear mixing at RPMs ranging from <1 RPM up to 200 RPM depending on the size of the mixing vessel and planetary mixer. An illustrative anchor agitator provides low shear mixing at RPMs ranging from <1 RPM up to 200 RPM depending on the size of the mixing vessel and anchor agitator.

During this first heating step 210, the size of the tire rubber particles dispersed in the bitumen is reduced to 20 mesh or smaller. In some embodiments, the size of the tire rubber particles is reduced to 325 mesh or smaller. In some embodiments, the size of the tire rubber particles is reduced to 40 microns or smaller.

Inventors hypothesize that this first heating step 210 causes the tire rubber particles to become soft and pliable as at least one of the natural rubbers, the synthetic rubbers, and all rubber polymers contained in the tire rubber are devulcanized.

After generating the devulcanized tire rubber bitumen mixture in block 210, the mixture may be vacuumed at block 212. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum after generating the devulcanized tire rubber bitumen mixture in block 210.

In some embodiments, the devulcanized tire rubber bitumen mixture is flooded with $N_2$, a non-oxygenated gas, or any combination thereof at block 214. When the determination is made to flood the mixture with $N_2$, gaseous $N_2$ is released into the reactor. In other embodiments, a determination is made at block 214 not to flood the mixture with $N_2$.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the devulcanized tire rubber bitumen mixture, and any combination thereof. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 212, gaseous $N_2$ may be flooded or pumped into the reactor at block 214, such as into the headspace over the devulcanized tire rubber bitumen mixture. The application of $N_2$ may be made cyclically with vacuum as part of a purge and sweep protocol. In some embodiments, a determination is made to not flood or flush the reactor with $N_2$. In some embodiments, some oxidation is necessary and thus some air or oxygen enters or is allowed to enter the reactor environment.

When the determination is made to apply vacuum at block 212 and the determination is made to flood with $N_2$ at block 214, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 215, a determination is made whether to apply one or more cycles of the purge sweep operations described by steps 212 and 214.

After devulcanizing the tire rubber, the tire rubber and bitumen components are mixed with heating to fully wet the tire rubber with the bitumen feedstock at block 216. This is termed the second heating step 216. During the second heating step 216, the temperature of the devulcanized tire rubber bitumen mixture is maintained between 275° F. and 325° F. In some embodiments, the devulcanized tire rubber bitumen mixture is mixed and/or stirred at low shear by one of a planetary mixer and an anchor agitator to fully wet the tire rubber with bitumen and/or form a paste of tire rubber and bitumen. An illustrative planetary mixer provides low shear mixing at RPMs ranging from <1 RPM up to 200 RPM depending on the size of the mixing vessel and planetary mixer. An illustrative anchor agitator provides low shear mixing at RPMs ranging from <1 RPM up to 200 RPM depending on the size of the mixing vessel and anchor agitator. Low shear mixing is especially appropriate when the bitumen feedstock has a high viscosity not suitable for moderate or high shear mixing, such as, but not limited to, 30,000 cP to 60,000 cP. In embodiments utilizing less viscous bitumen feedstock, moderate shear mixing may be applied during this second heating step 216 by one of a planetary mixer, an impeller mixer, or a rotor stator. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

During the second heating step 216, the devulcanized tire rubber and bitumen are heated and mixed for between 5 minutes and 60 minutes to generate a bitumen wetted devulcanized tire rubber mixture. In narrower embodiments, the devulcanized tire rubber and bitumen are heated and mixed for between 10 minutes and 20 minutes during the second heating step 216. In some embodiments, the devulcanized tire rubber is mixed into the bitumen feedstock at temperatures between 290° F. and 315° F. In narrower embodiments, the devulcanized tire rubber is mixed into the bitumen feedstock at temperatures between 300° F. and 310° F. In one embodiment, the devulcanized tire rubber is mixed into the bitumen feedstock at a temperature of 305° F. In some embodiments, the devulcanized tire rubber and bitumen are mixed with heating at least until 90% or more of the devulcanized tire rubber is fully wetted by the bitumen. In some embodiments, the devulcanized tire rubber and bitumen are mixed and heated until all the devulcanized tire rubber is fully wetted by the bitumen. This second heating step 216 generates a bitumen wetted devulcanized tire rubber mixture of devulcanized tire rubber pellets or particles uniformly dispersed in and wetted by the bitumen feedstock.

In embodiments utilizing a separate wetting vessel, the uniform mixture generated by the second heating step 216 can be pumped at between 275° F. and 325° F. into the reactor vessel without the tire rubber particles clumping together.

After generating the bitumen wetted devulcanized tire rubber mixture, the mixture may be vacuumed at block 218. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum to the mixture after the second heating step 216.

In some embodiments, the fully wetted devulcanized tire rubber bitumen mixture is flooded with $N_2$, a non-oxygenated gas, or any combination thereof at block 220. When the determination is made to flood the mixture with $N_2$, gaseous $N_2$ is released into the reactor. In some embodiments, a determination is made to not flood or flush the reactor and mixture with $N_2$. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e., mixing vessel, to provide a low pressure sweep in the headspace of the mixing vessel to remove the air present and prevent oxygen entrapment in the bitumen wetted devulcanized tire rubber mixture. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 218, gaseous $N_2$ may be flooded or pumped into the reactor at block 220, such as into the headspace over the bitumen wetted devulcanized tire rubber mixture. The application of $N_2$ may be made cyclically with vacuum as part of a purge and sweep protocol. In some embodiments, a determination is made to not flood or flush the reactor and bitumen wetted devulcanized tire rubber mixture with $N_2$. In some embodiments, some oxidation is necessary and thus some air or oxygen enters or is allowed to enter the reactor environment.

When the determination is made to apply vacuum at block 218 and the determination is made to flood with $N_2$ at block 220, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 221, a determination is made whether to apply one or more cycles of the purge sweep operations described by steps 218 and 220.

At the block 222, the method 200 proceeds with the addition of bitumen feedstock to the bitumen wetted devulcanized tire rubber mixture to reduce the percent tire rubber content of the bitumen wetted devulcanized tire rubber mixture. In some embodiments, the added bitumen may be the same as the bitumen feedstock received in block 202. In some embodiments, the added bitumen may be a different bitumen than the feedstock received in block 202. In some embodiments, the bitumen added is heated to the same temperature and/or temperature range as the bitumen wetted devulcanized tire rubber mixture. In some embodiments, the bitumen added is not heated. In some embodiments, the addition of bitumen to the reactor vessel requires exposing the bitumen wetted devulcanized tire rubber mixture to atmosphere.

After adding the bitumen to the bitumen wetted devulcanized tire rubber mixture in block 222, the mixture may be vacuumed at block 224. The vacuum may be applied continuously or cyclically. The determination of whether to apply vacuum may be made regardless of whether vacuum and/or $N_2$ was applied earlier, either continuously or cyclically. In some embodiments, a determination is made not to apply vacuum to the mixture after adding bitumen in block 222.

In some embodiments, the mixture of bitumen wetted devulcanized tire rubber is flooded with $N_2$, a non-oxygenated gas, or any combination thereof at block 226. When the determination is made to flood the mixture with $N_2$, gaseous $N_2$ is released into the reactor. In other embodiments, a determination is made at block 226 not to flood the mixture with $N_2$. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the added bitumen, the bitumen wetted tire rubber mixture, and any combination thereof. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 224, gaseous $N_2$ may be flooded or pumped into the reactor at block 226, such as into the headspace over the newly added bitumen and the bitumen wetted devulcanized tire rubber mixture. The application of $N_2$ may be made cyclically with vacuum as part of a purge and sweep protocol. In some embodiments, a determination is made to not flood or flush the reactor with $N_2$. In some embodiments, some oxidation is necessary and thus some air or oxygen enters or is allowed to enter the reactor environment.

When the determination is made to apply vacuum at block 224 and the determination is made to flood with $N_2$ at block 226, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 227, a determination is made whether to apply one or more cycles of the purge sweep operations described by steps 224 and 226.

The method then proceeds to block 228 where the added bitumen and bitumen wetted devulcanized tire rubber mixture are mixed and heated to fully incorporate the added bitumen into the bitumen wetted devulcanized tire rubber mixture and thereby reduce the tire rubber content percent of the resulting fully wetted devulcanized tire rubber bitumen mixture. This is termed the third heating step 228. In some embodiments, the mixture of the added bitumen and bitumen wetted devulcanized tire rubber mixture are heated to between 325° F. and 350° F. In some embodiments, the added bitumen is heated prior to its addition. In some embodiments, the added bitumen is heated to between 325° F. and 350° F. prior to its addition. In some embodiments, the added bitumen is heated to a temperature within 10° F. of the temperature of the bitumen wetted devulcanized tire rubber mixture to which it is added. In some embodiments, the added bitumen is heated to the same temperature as the bitumen wetted devulcanized tire rubber mixture.

In some embodiments, the resulting fully wetted devulcanized tire rubber bitumen mixture has a tire rubber content of 1% or less by weight up to 65% by weight. In some embodiments, the resulting fully wetted devulcanized tire rubber bitumen mixture has a tire rubber content of 5% by weight up to 60% by weight. In some embodiments, the resulting fully wetted devulcanized tire rubber bitumen mixture has a tire rubber content of 10% by weight up to 50% by weight.

In some embodiments, the added bitumen, bitumen wetted devulcanized tire rubber mixture, fully wetted devulcanized tire rubber bitumen mixture, and any combination thereof are mixed and/or stirred at low shear by one of a planetary mixer and an anchor agitator to decrease the viscosity of the mixture, decrease the percent content of tire rubber in the mixture, and reduce the size of the tire rubber particles in the mixture. An illustrative planetary mixer provides low shear mixing at RPMs ranging from <1 RPM up to 200 RPM depending on the size of the mixing vessel and planetary mixer. An illustrative anchor agitator provides low shear mixing at RPMs ranging from <1 RPM up to 200 RPM depending on the size of the mixing vessel and anchor agitator. Low shear mixing is especially appropriate when any of the added bitumen, bitumen wetted devulcanized tire rubber mixture, fully wetted devulcanized tire rubber bitumen mixture, and any combination thereof has a high viscosity not suitable for moderate or high shear mixing. In embodiments utilizing less viscous bitumen feedstock, moderate shear mixing may be applied during this third heating step 228 by one of a planetary mixer, an impeller mixer, or a rotor stator. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

In some embodiments, the third heating step 228 reduces the range of sizes of the tire rubber particles, so that the remaining tire rubber particles are more homogenously sized.

In some embodiments, the tire rubber content of the fully wetted devulcanized tire rubber bitumen mixture is reduced by 10%, such as from 70% tire rubber content in the bitumen wetted tire rubber mixture down to 60% in the fully wetted devulcanized tire rubber bitumen mixture; from 60% tire rubber content in the bitumen wetted devulcanized tire rubber mixture down to 50% in the fully wetted devulcanized tire rubber bitumen mixture; and from 50% tire rubber content in the bitumen wetted devulcanized tire rubber mixture down to 40% in the fully wetted devulcanized tire rubber bitumen mixture. In some embodiments, the tire rubber content of the fully wetted devulcanized tire rubber bitumen mixture is reduced by 20%, such as from 60% tire rubber content in the bitumen wetted devulcanized tire rubber mixture down to 40% in the fully wetted devulcanized tire rubber bitumen mixture; from 50% tire rubber content in the bitumen wetted devulcanized tire rubber mixture down to 30% in the fully wetted devulcanized tire rubber bitumen mixture; and from 40% tire rubber content in the bitumen wetted devulcanized tire rubber mixture down to 20% in the fully wetted devulcanized tire rubber bitumen mixture.

Inventors hypothesize that by increasing the temperature of the bitumen wetted devulcanized tire rubber mixture and reducing its percent content of tire rubber by adding more bitumen, process oils are released from the tire rubber and the viscosity decreases (possibly creating a flow within the reactor).

After generating the fully wetted devulcanized tire rubber bitumen mixture in block 228, the mixture may be vacuumed at block 230. The vacuum may be applied continuously or cyclically. The determination of whether to apply vacuum may be made regardless of whether vacuum and/or $N_2$ was applied earlier. In some embodiments, a determination is made not to apply vacuum after generating the fully wetted devulcanized tire rubber bitumen mixture in block 228.

In some embodiments, the fully wetted devulcanized tire rubber bitumen mixture is flooded with $N_2$, a non-oxygenated gas, or any combination thereof at block 232. When the determination is made to flood the mixture with $N_2$, gaseous $N_2$ is released into the reactor. In some embodiments, a determination is made to not flood or flush the reactor and mixture with $N_2$. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the fully wetted devulcanized tire rubber bitumen mixture. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 230, gaseous $N_2$ may be flooded or pumped into the reactor at block 232, such as into the headspace over the fully wetted devulcanized tire rubber bitumen mixture. The application of $N_2$ may be made cyclically with vacuum as part of a purge and sweep protocol. In some embodiments, a determination is made to not flood or flush the reactor with $N_2$. In some embodiments, some oxidation is necessary and thus some air or oxygen enters or is allowed to enter the reactor environment.

When the determination is made to apply vacuum at block 230 and the determination is made to flood with $N_2$ at block 232, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 234, a determination is made whether to apply one or more cycles of the purge sweep operations described by steps 230 and 232.

At block 236, the fully wetted devulcanized tire rubber bitumen mixture undergoes a fourth heating step, in which the fully wetted devulcanized tire rubber bitumen mixture is heated to between 500° F.-700° F. in the illustrative reactor vessel. In some narrower embodiments, the fully wetted devulcanized tire rubber bitumen mixture is heated to 525° F.-700° F. during the fourth heating step 236. In some narrower embodiments, the fully wetted devulcanized tire rubber bitumen mixture is heated to 650° F.-700° F. during the fourth heating step 236. In some narrower embodiments, the fully wetted devulcanized tire rubber bitumen mixture is heated to 599° F.-630° F. during the fourth heating step 236. In some narrower embodiments, the fully wetted devulcanized tire rubber bitumen mixture is heated to 630° F.-640° F. during the fourth heating step 236. In some narrower embodiments, the fully wetted devulcanized tire rubber bitumen mixture is heated to 600° F.-605° F. during the fourth heating step 236.

The fully wetted devulcanized tire rubber bitumen mixture is subjected to this further heating where it is mixed at the prescribed temperature range of 500° F.-700° F. for between 10 minutes to 120 minutes to generate a solubilized tire rubber bitumen product, also termed the rapid digestion process ("RDP") product.

In some narrower embodiments, the fully wetted devulcanized tire rubber bitumen mixture is mixed and heated for between 15 minutes to 90 minutes. In some narrower embodiments, the fully wetted devulcanized tire rubber bitumen mixture is mixed and heated for between 45 minutes to 75 minutes. In some narrower embodiments, the fully wetted devulcanized tire rubber bitumen mixture is mixed and heated for between 55 minutes to 65 minutes.

In some embodiments, the fully wetted devulcanized tire rubber bitumen mixture is heated during the fourth heating step 236 with high shear mixing by one of a planetary mixer, an impeller mixer, and a rotor stator to generate the solubilized tire rubber bitumen product. An illustrative planetary mixer provides high shear mixing at RPMs ranging from 300 RPM up to 3000 RPM depending on the size of the mixing vessel and planetary mixer. An illustrative impeller mixer provides high shear mixing at RPMs ranging from 350 RPM up to 4500 RPM depending on the size of the mixing vessel and impeller mixer. An illustrative rotor stator provides high shear mixing at RPMs ranging from 350 RPM up to 4500 RPM depending on the size of the mixing vessel and rotor stator.

In some embodiments, the type of mixing applied to the fully wetted devulcanized tire rubber bitumen mixture during step 236 transitions from moderate shear mixing to high shear mixing. In these embodiments, the fully wetted tire rubber bitumen mixture is mixed with moderate shear initially, which mixing intensity is increased to high shear mixing by increasing the RPMs of the agitator, either gradually, or after an initial period of mixing the comprises 10% of the mixing time, 25% of the mixing time, 50% of the mixing time, 75% of the mixing time, or 90% of the mixing time. In these embodiments, the fully wetted tire rubber bitumen mixture is mixed with moderate shear initially, which mixing intensity is increased gradually and consistently from the RPMs associated with moderate shear mixing to the RPMs associated with high shear mixing. An illustrative planetary mixer provides moderate shear mixing at RPMs ranging from 50 RPM up to 1000 RPM and high shear mixing at RPMs ranging from 300 RPM up to 3000 RPM depending on the size of the mixing vessel and planetary mixer. An illustrative impeller mixer provides moderate shear mixing at RPMs ranging from 200 RPM up to 3500 RPM and high shear mixing at RPMs ranging from 350 RPM up to 4500 RPM depending on the size of the mixing vessel and impeller mixer. An illustrative rotor stator provides moderate shear mixing at RPMs ranging from 200 RPM up to 3500 RPM and high shear mixing at RPMs ranging from 350 RPM up to 4500 RPM depending on the size of the mixing vessel and rotor stator.

Inventors hypothesize that this fourth high temperature rapid digestion heating step 236 reduces the molecular weight of the natural and synthetic rubbers comprising the tire rubber dissolved in the fully wetted devulcanized tire rubber bitumen mixture and the resulting RDP product by depolymerizing those natural and synthetic rubber components.

After generating the solubilized tire rubber bitumen product by fully dissolving the tire rubber into the bitumen at increasing temperatures, this RDP product may be cooled to 400° F. or lower for transfer and/or storage at block 238. Cooling may be performed by quenching the RDP product with an addition of more bitumen at a lower temperature, which cools the RDP compound to 500° F. or less. In some embodiments, the amount of bitumen used to quench the RDP compound does not significantly reduce the tire rubber content of the RDP product. In some embodiments, the amount of bitumen used to quench the RDP compound decreases the percent tire rubber content of the RDP compound. In some embodiments, the amount of bitumen used to quench the RDP compound decreases the percent tire rubber content of the RDP compound 10%, such as from 50% down to 40%. In some embodiments, the amount of bitumen used to quench the RDP compound decreases the percent tire rubber content of the RDP compound 20%, such as from 50% down to 30%.

In some embodiments, the RDP compound generated is cooled to 50° F. below the Cleveland Open Cup ("COC") flash point of the solubilized tire rubber bitumen compound. In some embodiments, water may be used to cool down the RDP compound and/or modified versions thereof to 500° F. or less. In some embodiments, the dissolved tire rubber bitumen mixture is cooled by a heat exchanger. In some embodiments, the cooled solubilized tire rubber bitumen compound is transferred to a storage vessel or processing vessel. The storage or processing vessel may be metal, and particularly of a stainless steel construction. The storage vessel may be open to atmosphere or enclosed, and while such enclosure need not be air tight, it may be a chamber sealed from external atmosphere.

The illustrative solubilized tire rubber bitumen mixture or RDP compound shows a substantial increase in penetration. Further, the homogeneous RDP compound generated by method 200 can be poured through a 100 mesh sieve. Additionally, the RDP rubber and bitumen compound may be solubilized in D-Limonene with better than 99.0% passing through No. 54 Whatman filter paper.

The solubility of the solubilized tire rubber bitumen compound was tested by dissolving 3 grams of the compound in a 125 ml of a solution composed of at least 90% D-Limonene CAS 5989-27-5. The solution was warmed gently on a hot plate with stirring for between 5 to 7 minutes—at which point the solid solubilized tire rubber bitumen compound sample is visibly dissolved in the D-Limonene. The solution was allowed to return to ambient temperature (about 15 minutes) and vacuum filtered using a No. 54 Whatman filter paper and Buchner funnel.

To validate that the tire rubber has been solubilized into the bitumen, the D-Limonene Solubility test as described in ASTM D2042 is utilized. The solubility test indicates that after a cold solvent wash, less than 0.6% residue remains, thus showing that the tire rubber has been substantially solubilized.

There is no significant difference or change in softening point of the bitumen feedstock after the tire rubber is added and RDP product generated. However, a substantial increase in penetration depth is observed after the tire rubber is digested during the heating processes of method 200. This increase in penetration depth is likely due to the release of compounding oils from the tire rubber into the bitumen, with little or no significant oxidation of the bitumen because of a Nitrogen purge on the mixing vessel.

Interestingly, the RDP compound has a RTFO aging value is "1.3." The inventors' postulate that the oils from the tire rubber that are extracted during the heating processes of method 200 reduce the effects of aging. This unexpected result substantially improves the aging of the resulting RDP compound.

The RDP compounds produced from the method 200 show no appreciable mass loss. Inventors hypothesize that this attribute of the RDP compounds arises from the series of heating steps 210, 216, 228, and 236, which incorporate the low boiling point molecules into the matrix of the solubilized tire rubber bitumen compound. The inventors further hypothesize that the heated tire rubber releases process oils from the tire rubber into the maltene fraction of the bitumen or asphalt feedstock, which improves both the oxidation resistance and ductility properties. Additionally, the inventors hypothesize that the bitumen is actually rejuvenated by the increase of the maltene to asphaltene fraction as observed when processing bitumen with vulcanized rubber, i.e., the solubilized tire rubber bitumen compounds produced by this method 200. The resulting RDP compound experiences a significant increase of measured penetration depth at 77° F. over the original bitumen feedstock while minimizing the oxidation and aging reactions associated with exposure of bitumen to high temperatures.

Similar to the recent use of saponification agents, such as stearamides and phosphates, in bitumen, saponification agents can be added to the resulting solubilized tire rubber bitumen compound to adjust the properties of softening point and penetration depth while allowing good viscosity control as needed. The solubilized tire rubber bitumen compound may also be combined with saturated fabrics such as fiberglass, polyester, rayon, nylon, or combinations thereof in various applications, such as paving, roofing, mining liners, and waterproofing. Further still the solubilized tire rubber bitumen compound may be used in drilling fluid applications to improve the viscosity curve of bitumen, thereby expanding the range of formulation options available to a drill fluid chemist.

Further still, the use of GTR and other vulcanized rubber containing carbon black enhances the black color of the RDP tire rubber bitumen compound. This enhancement, in addition to the improved weathering commonly associated with carbon black, allows the paving produced with RDP compounds to yield a long lasting high contrast surface for traffic marking that greatly improves both day and night time visibility. Additionally, in roofing applications, the carbon black stabilizes the roof coating, improving weathering resistance, and provides a deep black uniform surface for enhanced appearance of various blended and single color granule applications.

Third Method for Dissolving Tire Rubber

Referring to FIGS. 3A-D, there is shown an illustrative method 300 for dissolving tire rubber in bitumen. The RDP method presented herein includes exposing the tire rubber to a series of heating temperatures, including temperatures exceeding 500° F. for periods of 2 hours or less causing the tire rubber to depolymerize, reducing the molecular weight of the natural and synthetic rubbers dissolved into the bitumen.

The method 300 is initiated at block 302 where a bitumen feedstock is received in a reactor tank and pre-heated to between 375° F. and 425° F. In some embodiments, the bitumen feedstock is received in a pre-heated state and maintained at the temperature received, such as between 375° F. and 425° F. In narrower embodiments, the bitumen feedstock is received in the reactor tank and pre-heated to between 390° F. and 410° F. In still narrower embodiments, the bitumen feedstock is received in the reactor tank and pre-heated to 400° F. By way of example and not of limitation, the illustrative bitumen feedstock has a penetration of 135 dmm @ 77° F. In some embodiments, the illustrative bitumen feedstock has a penetration of 23 dmm @ 77° F. In some embodiments, the illustrative bitumen feedstock has a penetration of less than 23 dmm @ 77° F. In some embodiments, the illustrative bitumen feedstock has a penetration of more than 135 dmm @ 77° F.

Regardless of whether of the bitumen feedstock is received in a heated state or pre-heated in the reactor, the bitumen feedstock is cooled to between 275° F. and 350° F. in the reactor during this step 302. In narrower embodiments, the bitumen feedstock is cooled to between 305° F. and 330° F. in the reactor. In a still narrower embodiment, the bitumen feedstock is cooled to 325° F. In some embodiments, the bitumen feedstock is simply allowed to cool by ceasing the application of heating. In some embodiments, the bitumen feedstock is actively cooled by a cooling system. In some embodiments, the cooling system may utilize water to cool down the bitumen feedstock. In some embodiments, the bitumen feedstock is cooled by a heat exchanger.

In some embodiments, the received bitumen feedstock is mixed with low shear during the heating and/or cooling of step 302. In some embodiments, the received bitumen feedstock is mixed with low shear by a planetary mixer during the heating and/or cooling of step 302. An illustrative planetary mixer provides low shear mixing at RPMs ranging from <1 RPM up to 200 RPM depending on the size of the mixing vessel and planetary mixer. In some embodiments, the received bitumen feedstock is mixed with low shear by an anchor agitator during the heating and/or cooling of step 302. An illustrative anchor agitator provides low shear mixing at RPMs ranging from <1 RPM up to 200 RPM depending on the size of the mixing vessel and anchor agitator. In some embodiments, the received bitumen feedstock is mixed with moderate shear by a planetary mixer during the heating and/or cooling of step 302. An illustrative planetary mixer provides moderate shear mixing at RPMs ranging from 50 RPM up to 1000 RPM depending on the size of the mixing vessel and planetary mixer. In some embodiments, the received bitumen feedstock is mixed with moderate shear by an impeller mixer during the heating and/or cooling of step 302. An illustrative impeller mixer provides moderate shear mixing at RPMs ranging from 200 RPM up to 3500 RPM depending on the size of the mixing vessel and impeller mixer. In some embodiments, the received bitumen feedstock is mixed with moderate shear by a rotor stator during the heating and/or cooling of step 302. An illustrative rotor stator provides moderate shear mixing at RPMs ranging from 200 RPM up to 3500 RPM depending on the size of the mixing vessel and rotor stator.

In an alternative embodiment, an oil compound may be substituted for the bitumen feedstock. Note, the method 300 may use only bitumen feedstock, only oil, or a combination of bitumen feedstock and oil.

In some embodiments, the bitumen feedstock is received in a separate wetting tank and transferred to a let down vessel or the reactor mixing vessel after the tire rubber has been fully wetted and/or formed a paste with the bitumen feedstock, termed the bitumen wetted tire rubber mixture.

At block 304, tire rubber is added to the heated bitumen feedstock and mixed at low shear with heating. In some embodiments, the added tire rubber and heated bitumen feedstock are mixed at moderate shear with heating. In some embodiments, the added tire rubber and heated bitumen feedstock are mixed with low shear by a planetary mixer during heating. An illustrative planetary mixer provides low shear mixing at RPMs ranging from <1 RPM up to 200 RPM depending on the size of the mixing vessel and planetary mixer. In some embodiments, the added tire rubber and heated bitumen feedstock are mixed with moderate shear by a planetary mixer during heating. An illustrative planetary mixer provides moderate shear mixing at RPMs ranging from 50 RPM up to 1000 RPM depending on the size of the mixing vessel and planetary mixer. In some embodiments, the added tire rubber and heated bitumen feedstock are mixed with low shear by an anchor agitator during heating. An illustrative anchor agitator provides low shear mixing at RPMs ranging from <1 RPM up to 200 RPM depending on the size of the mixing vessel and anchor agitator. In some embodiments, the added tire rubber and heated bitumen feedstock are mixed with moderate shear by an impeller mixer during heating. An illustrative impeller mixer provides moderate shear mixing at RPMs ranging from 200 RPM up to 3500 RPM depending on the size of the mixing vessel and impeller mixer. In some embodiments, the added tire rubber and heated bitumen feedstock are mixed with moderate shear by a rotor stator. An illustrative rotor stator provides moderate shear mixing at RPMs ranging from 200 RPM up to 3500 RPM depending on the size of the mixing vessel and rotor stator. The tire rubber may be added as scrap tire chunks, rubber pellets 1 cm in diameter or smaller, such as 20 mesh GTR, 80 mesh GTR, or evenly extremely fine ground rubber particles as small as 300 mesh.

In some embodiments, the amount of tire rubber added to the bitumen feedstock comprises 1% or less by weight up to 70% by weight of the resulting mixture of tire rubber and bitumen feedstock. In a narrower illustrative embodiment, 5% to 50% by weight of tire rubber is added to the heated bitumen feedstock. In an even narrower illustrative embodiment, 7% to 30% by weight of tire rubber is added to the heated bitumen feedstock. In one narrow embodiment, 50% to 60% by weight of tire rubber is added to the heated bitumen feedstock. In another narrow embodiment, 55% to 60% by weight of tire rubber is added to the heated bitumen feedstock. In some embodiments utilizing 50% or more tire rubber, the tire rubber is added to bitumen with stirring to obtain even heat distribution.

In some embodiments, this initial mixture of tire rubber and bitumen feedstock is subjected to vacuum at block 306. In some embodiments, a determination is made at block 306 not to apply vacuum to the mixing vessel.

In some embodiments, the initial mixture of tire rubber and bitumen feedstock is flooded with $N_2$, a non-oxygenated gas, or any combination thereof at block 308. When the determination is made to flood the mixture with $N_2$, gaseous $N_2$ is released into the reactor. The gaseous $N_2$ may be release into the reactor by flooding a headspace above the mixture, by bubbling the gaseous N₂ up through the mixture, or any combination thereof. In other embodiments, a determination is made at block 108 not to flood the mixture with N₂.

In some embodiments, no vacuuming of the headspace may be performed, and instead the headspace may simply be flooded with non-oxygenated gas to displace oxygen from the headspace. In some embodiments, Nitrogen (N₂) is added to the top of the reactor, i.e. mixing vessel, to provide a low pressure sweep in the headspace of the mixing vessel to remove the air present and prevent oxygen entrapment in the initial mixture of tire rubber and bitumen feedstock. In some embodiments, Nitrogen may also be introduced from the bottom of the reactor. In certain embodiments, Nitrogen may be introduced in the headspace and the bottom of the reactor vessel. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

When the determination is made to apply vacuum at block 306 and the determination is made to flood with N₂ at block 308, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with N₂ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 309, a determination is made whether to apply one or more cycles of the purge sweep operations described by steps 306 and 308.

Upon addition of the tire rubber to the bitumen feedstock, the two components are mixed with heating to fully wet the tire rubber with bitumen feedstock at block 310. This is termed the first heating step 310. During the first heating step 310, the temperature of the bitumen feedstock is maintained between 275° F. and 350° F. as the temperature of the added tire rubber is raised to match. In some embodiments, the bitumen feedstock and added tire rubber are mixed and/or stirred at low shear to fully wet the tire rubber with bitumen and/or form a paste of tire rubber and bitumen. In some embodiments, the bitumen feedstock and added tire rubber are mixed at low shear by a planetary mixer. An illustrative planetary mixer provides low shear mixing at RPMs ranging from <1 RPM up to 200 RPM depending on the size of the mixing vessel and planetary mixer. In some embodiments, the bitumen feedstock and added tire rubber are mixed at low shear by an anchor agitator. An illustrative anchor agitator provides low shear mixing at RPMs ranging from <1 RPM up to 200 RPM depending on the size of the mixing vessel and anchor agitator. Low shear mixing is especially appropriate when the bitumen feedstock has a high viscosity not suitable for moderate or high shear mixing, such as, but not limited to, 30,000 cP to 60,000 cP. In embodiments utilizing less viscous bitumen feedstock, moderate shear mixing may be applied during this first heating step 310. In moderate shear embodiments, the moderate shear is provided by one of a planetary mixer, an impeller mixer, or a rotor stator. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

During the first heating step 310, the tire rubber and bitumen are heated and mixed for between 5 minutes and 60 minutes to generate a bitumen wetted tire rubber mixture. In narrower embodiments, the tire rubber and bitumen are heated and mixed for between 10 minutes and 20 minutes during the first heating step 310. In some embodiments, the tire rubber is mixed into the bitumen feedstock at temperatures between 290° F. and 335° F. In narrower embodiments, the tire rubber is mixed into the bitumen feedstock at temperatures between 305° F. and 330° F. In one embodiment, the tire rubber is mixed into the bitumen feedstock at a temperature of 325° F. In some embodiments, the tire rubber and bitumen are mixed with heating at least until 90% or more of the added tire rubber is fully wetted by the bitumen. In some embodiments, the tire rubber and bitumen are mixed and heated until all added tire rubber is fully wetted by the bitumen. This first heating step 310 generates a bitumen wetted tire rubber mixture of tire rubber pellets or particles uniformly dispersed in and wetted by the bitumen feedstock.

In embodiments utilizing a separate wetting vessel, the uniform mixture generated by the first heating step 310 can be pumped at between 275° F. and 350° F. into the reactor vessel without the tire rubber particles clumping together.

After generating the bitumen wetted tire rubber mixture, the mixture may be vacuumed at block 312. The vacuum may be applied continuously or cyclically. The determination of whether to apply vacuum may be made regardless of whether vacuum and/or N₂ was applied earlier. In some embodiments, a determination is made not to apply vacuum to the mixture after the first heating step 310.

Regardless of whether or not vacuum was applied at block 312, gaseous N₂ may be flooded or pumped into the reactor at block 314, such as into the headspace over the bitumen wetted tire rubber mixture. The application of N₂ may be made cyclically with vacuum as part of a purge and sweep protocol. In some embodiments, a determination is made to not flood or flush the reactor and bitumen wetted tire rubber mixture with N₂. In some embodiments, some oxidation is necessary and thus some air or oxygen enters or is allowed to enter the reactor environment.

In some embodiments, no vacuuming of the headspace may be performed, and instead the headspace may simply be flooded with non-oxygenated gas to displace oxygen from the headspace. In some embodiments, Nitrogen (N₂) is added to the top of the reactor, i.e. mixing vessel, to provide a low pressure sweep in the headspace of the mixing vessel to remove the air present and prevent oxygen entrapment in the bitumen wetted tire rubber mixture. Removal of oxygen prevents oxidation at temperatures approaching or even exceeding the lowest flash point of the mixture components, and prevents autoignition at processing temperatures up to 700° F.

When the determination is made to apply vacuum at block 312 and the determination is made to flood with N₂ at block 314, the two steps operate in conjunction to purge and sweep the reactor vessel. Generally, the reactor vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. In some embodiments, the vacuum is applied for cycles having a time period of 1 minute up to 1 hour depending upon the size of the headspace and vacuum capacity of the operating system. At block 315, a determination is made whether to apply one or more cycles of the purge sweep operations described by steps 312 and 314.

The method then proceeds to block 316 where the bitumen wetted tire rubber mixture is mixed and heated to devulcanize and depolymerize the tire rubber in the mixture, severing the sulfur-sulfur cross-links of any vulcanized rubber in the tire rubber particles, as well as reducing the molecular weight of the natural rubber polymers in the tire rubber. This is termed the second heating step 316 and generates a devulcanized depolymerized bitumen wetted tire rubber mixture. In some embodiments, the temperature is raised to between 500° F. and 590° F. In narrower embodiments, the temperature is raised to between 560° F. and 580° F.

In some embodiments, the bitumen wetted tire rubber mixture is heated and mixed for between 10 minutes and 120 minutes to generate the devulcanized depolymerized bitumen wetted tire rubber mixture. In narrower embodiments, the bitumen wetted tire rubber mixture is heated and mixed for between 30 minutes and 60 minutes to generate the devulcanized depolymerized bitumen wetted tire rubber mixture.

In some embodiments, the bitumen wetted tire rubber mixture is heated and mixed with moderate shear by a planetary mixer, an impeller mixer, or a rotor stator to generate the devulcanized depolymerized bitumen wetted tire rubber mixture. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator. In some embodiments, the bitumen wetted tire rubber mixture is heated and mixed with high shear by one of a planetary mixer, an impeller mixer, and a rotor stator mixer to generate the devulcanized depolymerized bitumen wetted tire rubber mixture. An illustrative planetary mixer provides high shear mixing at RPMs ranging from 300 RPM up to 3000 RPM depending on the size of the mixing vessel and planetary mixer. An illustrative impeller mixer provides high shear mixing at RPMs ranging from 350 RPM up to 4500 RPM depending on the size of the mixing vessel and impeller mixer. An illustrative rotor stator provides high shear mixing at RPMs ranging from 350 RPM up to 4500 RPM depending on the size of the mixing vessel and rotor stator.

In some embodiments, the bitumen wetted tire rubber mixture is heated and mixed with a combination of moderate shear and high shear to generate the devulcanized depolymerized bitumen wetted tire rubber mixture. In these embodiments, the fully wetted tire rubber bitumen mixture is mixed with moderate shear initially, which mixing intensity is increased to high shear mixing by increasing the RPMs of the agitator, either gradually, or after an initial period of mixing the comprises 10% of the mixing time, 25% of the mixing time, 50% of the mixing time, 75% of the mixing time, or 90% of the mixing time. In these embodiments, the fully wetted tire rubber bitumen mixture is mixed with moderate shear initially, which mixing intensity is increased gradually and consistently from the RPMs associated with moderate shear mixing to the RPMs associated with high shear mixing.

During this second heating step 316, the size of the tire rubber particles dispersed in the resulting devulcanized depolymerized bitumen wetted tire rubber mixture is reduced to 20 mesh or smaller. In some embodiments, the size of the tire rubber particles is reduced to 325 mesh or smaller. In some embodiments, the size of the tire rubber particles is reduced to 40 microns or smaller.

Inventors hypothesize that this second heating step 316 causes the tire rubber particles to become soft and pliable as at least one of the natural rubbers, the synthetic rubbers, and all rubber polymers contained in the tire rubber are devulcanized, and some or all of the natural rubbers are partially or fully depolymerized to reduce their molecular weight.

At the block 318, the method proceeds with the addition of bitumen feedstock to the devulcanized depolymerized bitumen wetted tire rubber mixture to reduce the percent tire rubber content of the devulcanized depolymerized bitumen wetted tire rubber mixture. In some embodiments, the devulcanized depolymerized bitumen wetted tire rubber mixture is transferred by pump from a wetting tank to a let down vessel before adding the bitumen feedstock. In some embodiments, the devulcanized depolymerized bitumen wetted tire rubber mixture is transferred from a multi-shaft mixing vessel to the let down vessel before adding the bitumen feedstock. In some embodiments, the devulcanized depolymerized bitumen wetted tire rubber mixture is transferred from a wetting tank vessel to the let down vessel before adding the bitumen feedstock. In some embodiments, the devulcanized depolymerized bitumen wetted tire rubber mixture is transferred from a reactor vessel to the let down vessel before adding the bitumen feedstock.

In some embodiments, the added bitumen may be the same as the bitumen feedstock received in block 302. In some embodiments, the added bitumen may be a different bitumen than the feedstock received in block 302. In some embodiments, the bitumen added is heated to the same temperature and/or temperature range as the devulcanized depolymerized bitumen wetted tire rubber mixture. In some embodiments, the bitumen added is not heated. In some embodiments, the addition of bitumen to the reactor vessel requires exposing the devulcanized depolymerized bitumen wetted tire rubber mixture to atmosphere.

After adding bitumen feedstock to the devulcanized depolymerized bitumen wetted tire rubber mixture in block 318, the mixture may be vacuumed at block 320. The vacuum may be applied continuously or cyclically. The determination of whether to apply vacuum may be made regardless of whether vacuum and/or $N_2$ was applied earlier. In some embodiments, a determination is made not to apply vacuum after adding the bitumen feedstock to the devulcanized depolymerized bitumen wetted tire rubber mixture in block 318.

In some embodiments, the bitumen feedstock and the devulcanized depolymerized bitumen wetted tire rubber mixture is flooded with $N_2$, a non-oxygenated gas, or any combination thereof at block 322. When the determination is made to flood the mixture with $N_2$, gaseous $N_2$ is released into the vessel. In other embodiments, a determination is made at block 322 not to flood the mixture with $N_2$.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, i.e. mixing vessel, to provide a low pressure sweep in the headspace of the mixing vessel to remove the air present and prevent oxygen entrapment in the added bitumen feedstock, the devulcanized depolymerized bitumen wetted tire rubber mixture, and any combination thereof. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the vessel. In another illustrative embodiment, the mixing chamber has some air, but is surrounded by an inert atmosphere so there is minimal oxidation.

Regardless of whether or not vacuum was applied at block 320, gaseous $N_2$ may be flooded or pumped into the vessel at block 322, such as into the headspace over the added bitumen feedstock and the devulcanized depolymerized bitumen wetted tire rubber mixture. The application of $N_2$ may be made cyclically with vacuum as part of a purge and sweep protocol. In some embodiments, a determination is made to not flood or flush the vessel with $N_2$. In some embodiments, some oxidation is necessary and thus some air or oxygen enters or is allowed to enter the vessel.

When the determination is made to apply vacuum at block 320 and the determination is made to flood with $N_2$ at block 322, the two steps operate in conjunction to purge and sweep the mixing vessel. Generally, the mixing vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 323, a determination is made whether to apply one or more cycles of the purge sweep operations described by steps 320 and 322.

The method then proceeds to block 324 where the added bitumen and the devulcanized depolymerized bitumen wetted tire rubber mixture are mixed and heated to fully incorporate the added bitumen into the devulcanized depolymerized bitumen wetted tire rubber mixture and thereby reduce the tire rubber content percent of the resulting fully wetted devulcanized depolymerized tire rubber bitumen mixture. This is termed the third heating step 324. In some embodiments, the mixture of the added bitumen and devulcanized depolymerized bitumen wetted tire rubber mixture are heated to between 530° F. and 590° F. In some embodiments, the added bitumen is heated prior to its addition. In some embodiments, the added bitumen is heated to between 530° F. and 590° F. prior to its addition. In some embodiments, the added bitumen is heated to a temperature within 10° F. of the temperature of the devulcanized depolymerized bitumen wetted tire rubber mixture to which it is added. In some embodiments, the added bitumen is heated to the same temperature as the devulcanized depolymerized bitumen wetted tire rubber mixture.

In some embodiments, the resulting fully wetted devulcanized depolymerized tire rubber bitumen mixture has a tire rubber content of 1% or less by weight up to 65% by weight. In some embodiments, the resulting fully wetted devulcanized depolymerized tire rubber bitumen mixture has a tire rubber content of 5% by weight up to 60% by weight. In some embodiments, the resulting fully wetted devulcanized depolymerized tire rubber bitumen mixture has a tire rubber content of 10% by weight up to 50% by weight. In some embodiments, the resulting fully wetted devulcanized depolymerized tire rubber bitumen mixture has a tire rubber content of 10% by weight up to 40% by weight.

In some embodiments, the added bitumen, the devulcanized depolymerized bitumen wetted tire rubber mixture, the fully wetted devulcanized depolymerized tire rubber bitumen mixture, and any combination thereof are mixed and/or stirred at low shear by one of a planetary mixer and an anchor agitator to decrease the viscosity of the mixture, decrease the percent content of tire rubber in the mixture, and reduce the size of the tire rubber particles in the mixture. An illustrative planetary mixer provides low shear mixing at RPMs ranging from <1 RPM up to 200 RPM depending on the size of the mixing vessel and planetary mixer. An illustrative anchor agitator provides low shear mixing at RPMs ranging from <1 RPM up to 200 RPM depending on the size of the mixing vessel and anchor agitator. Low shear mixing is especially appropriate when any of the added bitumen, the devulcanized depolymerized bitumen wetted tire rubber mixture, the fully wetted devulcanized depolymerized tire rubber bitumen mixture, and any combination thereof has a high viscosity not suitable for high shear mixing. In embodiments utilizing less viscous bitumen feedstock, moderate shear mixing may be applied during this third heating step 324 by one of a planetary mixer, an impeller mixer, or a rotor stator. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

In some embodiments, the third heating step 324 reduces the range of sizes of the tire rubber particles, so that the remaining tire rubber particles are more homogenously sized.

In some embodiments, the tire rubber content of the fully wetted devulcanized depolymerized tire rubber bitumen mixture is reduced by 10%, such as from 70% tire rubber content in the devulcanized depolymerized bitumen wetted tire rubber mixture down to 60% in the fully wetted devulcanized depolymerized tire rubber bitumen mixture; from 60% tire rubber content in the bitumen wetted devulcanized depolymerized tire rubber mixture down to 50% in the fully wetted devulcanized depolymerized tire rubber bitumen mixture; and from 50% tire rubber content in the bitumen wetted devulcanized depolymerized tire rubber mixture down to 40% in the fully wetted devulcanized depolymerized tire rubber bitumen mixture. In some embodiments, the tire rubber content of the fully wetted devulcanized depolymerized tire rubber bitumen mixture is reduced by 20%, such as from 60% tire rubber content in the bitumen wetted devulcanized depolymerized tire rubber mixture down to 40% in the fully wetted devulcanized depolymerized tire rubber bitumen mixture; from 50% tire rubber content in the bitumen wetted devulcanized depolymerized tire rubber mixture down to 30% in the fully wetted devulcanized depolymerized tire rubber bitumen mixture; and from 40% tire rubber content in the bitumen wetted devulcanized depolymerized tire rubber mixture down to 20% in the fully wetted devulcanized depolymerized tire rubber bitumen mixture.

Inventors hypothesize that by increasing the temperature of the bitumen wetted devulcanized depolymerized tire rubber mixture and reducing its percent content of tire rubber by adding more bitumen, process oils are released from the tire rubber and the viscosity decreases (possibly creating a flow within the reactor).

After generating the fully wetted devulcanized depolymerized tire rubber bitumen mixture in block 324, the mixture may be vacuumed at block 326. The vacuum may be applied continuously or cyclically. The determination of whether to apply vacuum may be made regardless of whether vacuum and/or $N_2$ was applied earlier. In some embodiments, a determination is made not to apply vacuum after generating the fully wetted devulcanized depolymerized tire rubber bitumen mixture in block 324.

In some embodiments, the fully wetted devulcanized depolymerized tire rubber bitumen mixture is flooded with $N_2$, a non-oxygenated gas, or any combination thereof at block 328. When the determination is made to flood the mixture with $N_2$, gaseous $N_2$ is released into the vessel. In some embodiments, a determination is made to not flood or flush the vessel and mixture with $N_2$. In some embodiments, some oxidation is necessary and thus some air or oxygen enters or is allowed to enter the vessel.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor, or let down vessel, to provide a low pressure sweep in the headspace of the mixing vessel to remove the air present and prevent oxygen entrapment in the fully wetted devulcanized depolymerized tire rubber bitumen mixture. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 326, gaseous $N_2$ may be flooded or pumped into the reactor at block 328, such as into the headspace over the fully wetted devulcanized depolymerized tire rubber bitumen mixture. The application of $N_2$ may be made cyclically with vacuum as part of a purge and sweep protocol. In some embodiments, a determination is made to not flood or flush the vessel with $N_2$. In some embodiments, some oxidation is necessary and thus some air or oxygen enters or is allowed to enter the vessel.

When the determination is made to apply vacuum at block 326 and the determination is made to flood with $N_2$ at block 328, the two steps operate in conjunction to purge and sweep the mixing vessel. Generally, the mixing vessel is purged and then swept to remove oxygen from the headspace of the vessel. The purge may be performed by vacuuming the mixing vessel headspace prior to flushing the headspace with $N_2$ or other non-oxygenated gas. In some embodiments, the vacuum is applied continuously. At block 329, a determination is made whether to apply one or more cycles of the purge sweep operations described by steps 326 and 328.

In embodiments where the bitumen wetted devulcanized depolymerized tire rubber mixture was transferred to a let down vessel for addition of bitumen and reduction of the tire rubber content in step 324, the method proceeds to block 330 where the fully wetted devulcanized depolymerized tire rubber bitumen mixture is transferred from the let down vessel to a reactor vessel. In some embodiments, the fully wetted devulcanized depolymerized tire rubber bitumen mixture is transferred by pump from the let down vessel to a reactor vessel. In some embodiments, the fully wetted devulcanized depolymerized tire rubber bitumen mixture is transferred by gravity feed from the let down vessel to a reactor vessel.

In embodiments where fully wetted devulcanized depolymerized tire rubber bitumen mixture is transferred from the let down vessel to the reactor vessel, the fully wetted devulcanized depolymerized tire rubber bitumen mixture may be vacuumed at block 332. The vacuum may be applied continuously or cyclically. The determination of whether to apply vacuum may be made regardless of whether vacuum and/or $N_2$ was applied earlier. In some embodiments, a determination is made not to apply vacuum after transferring the fully wetted devulcanized depolymerized tire rubber bitumen mixture to the reactor vessel in block 332.

In some embodiments, the fully wetted devulcanized depolymerized tire rubber bitumen mixture is flooded with $N_2$, a non-oxygenated gas, or any combination thereof in the reactor vessel at block 334. When the determination is made to flood the mixture with $N_2$, gaseous $N_2$ is released into the reactor. In some embodiments, a determination is made to not flood or flush the reactor and mixture with $N_2$. In some embodiments, some oxidation is necessary and thus some air or oxygen enters or is allowed to enter the reactor.

In some embodiments, no vacuuming of the headspace may be performed, and instead the headspace may simply be flooded with non-oxygenated gas to displace oxygen from the headspace. In some embodiments, Nitrogen ($N_2$) is added to the top of the reactor to provide a low pressure sweep in the headspace of the mixing vessel to remove the air present and prevent oxygen entrapment in the fully wetted devulcanized depolymerized tire rubber bitumen mixture. Removal of oxygen prevents oxidation at temperatures approaching or even exceeding the lowest flash point of the mixture components, and prevents autoignition at processing temperatures up to 700° F.

However, there may be circumstances where some oxidation is necessary and thus some air or oxygen enters or is allowed to enter the reactor environment. In another illustrative embodiment, the mixing chamber has some air, but is surrounded by an inert atmosphere so there is minimal oxidation.

Regardless of whether or not vacuum was applied at block 332, gaseous $N_2$ may be flooded or pumped into the reactor at block 334, such as into the headspace over the fully wetted devulcanized depolymerized tire rubber bitumen mixture. The application of $N_2$ may be made cyclically with vacuum as part of a purge and sweep protocol. In some embodiments, a determination is made to not flood or flush the reactor vessel with $N_2$. In some embodiments, some oxidation is necessary and thus some air or oxygen enters or is allowed to enter the reactor vessel.

When the determination is made to apply vacuum at block 332 and the determination is made to flood with $N_2$ at block 334, the two steps operate in conjunction to purge and sweep the reactor vessel. Generally, the reactor vessel is purged and then swept to remove oxygen from the headspace of the vessel. The purge may be performed by vacuuming the reactor vessel headspace prior to flushing the headspace with $N_2$ or other non-oxygenated gas. In some embodiments, the vacuum is applied continuously. At block 335, a determination is made whether to apply one or more cycles of the purge sweep operations described by steps 332 and 334.

At block 336, the fully wetted devulcanized depolymerized tire rubber bitumen mixture undergoes a fourth heating step, in which the fully wetted devulcanized depolymerized tire rubber bitumen mixture is heated to between 500° F.-700° F. in the illustrative reactor vessel. In some narrower embodiments, the devulcanized fully wetted tire rubber bitumen mixture is heated to 525° F.-700° F. during the fourth heating step 336. In some narrower embodiments, the devulcanized fully wetted tire rubber bitumen mixture is heated to 650° F.-700° F. during the fourth heating step 336. In some narrower embodiments, the fully wetted devulcanized depolymerized tire rubber bitumen mixture is heated to 599° F.-630° F. during the fourth heating step 336. In some narrower embodiments, the fully wetted devulcanized depolymerized tire rubber bitumen mixture is heated to 630° F.-640° F. during the fourth heating step 336. In some narrower embodiments, the fully wetted devulcanized depolymerized tire rubber bitumen mixture is heated to 600° F.-605° F. during the fourth heating step 336.

The fully wetted devulcanized depolymerized tire rubber bitumen mixture is subjected to this further heating where it is mixed at the prescribed temperature range of 500° F.-700° F. for between 10 minutes to 120 minutes to generate a solubilized tire rubber bitumen product, also termed the rapid digestion process ("RDP") product.

In some narrower embodiments, the fully wetted devulcanized depolymerized tire rubber bitumen mixture is mixed and heated for between 15 minutes to 90 minutes. In some narrower embodiments, the fully wetted devulcanized depolymerized tire rubber bitumen mixture is mixed and heated for between 45 minutes to 75 minutes. In some narrower embodiments, the fully wetted devulcanized depolymerized tire rubber bitumen mixture is mixed and heated for between 55 minutes to 65 minutes.

In some embodiments, the fully wetted devulcanized depolymerized tire rubber bitumen mixture is heated during the fourth heating step 336 with high shear mixing by one of a planetary mixer, an impeller mixer, and a rotor stator mixer to generate the solubilized tire rubber bitumen product. An illustrative planetary mixer provides high shear mixing at RPMs ranging from 300 RPM up to 3000 RPM depending on the size of the mixing vessel and planetary mixer. An illustrative impeller mixer provides high shear mixing at RPMs ranging from 350 RPM up to 4500 RPM depending on the size of the mixing vessel and impeller mixer. An illustrative rotor stator provides high shear mixing at RPMs ranging from 350 RPM up to 4500 RPM depending on the size of the mixing vessel and rotor stator. In some embodiments, the type of mixing applied to the fully wetted devulcanized depolymerized tire rubber bitumen mixture during step 336 transitions from moderate shear mixing to high shear mixing. In these embodiments, the fully wetted tire rubber bitumen mixture is mixed with moderate shear initially, which mixing intensity is increased to high shear mixing by increasing the RPMs of the agitator, either gradually, or after an initial period of mixing the comprises 10% of the mixing time, 25% of the mixing time, 50% of the mixing time, 75% of the mixing time, or 90% of the mixing time. In these embodiments, the fully wetted tire rubber bitumen mixture is mixed with moderate shear initially, which mixing intensity is increased gradually and consistently from the RPMs associated with moderate shear mixing to the RPMs associated with high shear mixing. An illustrative planetary mixer provides moderate shear mixing at RPMs ranging from 50 RPM up to 1000 RPM depending on the size of the mixing vessel and planetary mixer. An illustrative impeller mixer provides moderate shear mixing at RPMs ranging from 200 RPM up to 3500 RPM depending on the size of the mixing vessel and impeller mixer. An illustrative rotor stator provides moderate shear mixing at RPMs ranging from 200 RPM up to 3500 RPM depending on the size of the mixing vessel and rotor stator.

Inventors hypothesize that this fourth high temperature rapid digestion heating step 336 reduces the molecular weight of the natural and synthetic rubbers comprising the tire rubber dissolved in the fully wetted devulcanized depolymerized tire rubber bitumen mixture and the resulting RDP product by depolymerizing those natural and synthetic rubber components.

After generating the solubilized tire rubber bitumen product by fully dissolving the tire rubber into the bitumen at increasing temperatures, this RDP product may be cooled to 400° F. or lower for transfer and/or storage at block 338. Cooling may be performed by quenching the RDP product with an addition of more bitumen at a lower temperature, which cools the RDP compound to 500° F. or less. In some embodiments, the amount of bitumen used to quench the RDP compound does not significantly reduce the tire rubber content of the RDP product. In some embodiments, the amount of bitumen used to quench the RDP compound decreases the percent tire rubber content of the RDP compound. In some embodiments, the amount of bitumen used to quench the RDP compound decreases the percent tire rubber content of the RDP compound 10%, such as from 50% down to 40%. In some embodiments, the amount of bitumen used to quench the RDP compound decreases the percent tire rubber content of the RDP compound 20%, such as from 50% down to 30%.

In some embodiments, the RDP compound generated is cooled to 50° F. below the Cleveland Open Cup ("COC") flash point of the solubilized tire rubber bitumen compound. In some embodiments, water may be used to cool down the RDP compound and/or modified versions thereof to 500° F. or less. In some embodiments, the dissolved tire rubber bitumen mixture is cooled by a heat exchanger. In some embodiments, the cooled dissolved tire rubber bitumen compound is transferred to a storage vessel or processing vessel. The storage vessel may be open to atmosphere or enclosed, and while such enclosure need not be air tight, it may be a chamber sealed from external atmosphere.

Mass loss is an important challenge to overcome for dissolved tire rubber bitumen compounds, as the tire rubbers comprise a greater concentration of low boiling point compounds than bitumen generally. As such, the more tire rubber that is added to bitumen during the method 300 to produce the RDP product, the greater the mass loss of those resulting compounds. Importantly, a key indicator of binder aging is the loss of smaller molecules (such as, but not limited to, VOCs) that increase a bitumen compound's viscosity. As the amount of mass loss increases, asphalt binders age and become less viscous. Additionally, since mass loss is attributed to the loss of smaller molecules, the flashpoint of compounds with high mass loss is much lower than compounds with low mass loss. Most applicable regulatory agencies require asphalt paving compounds to have mass loss of 1% or less as determined by the RTFO test described in AASHTO T240 and ASTM D2872. Thus, solubilized tire rubber bitumen compounds having greater than 1% mass loss may not be commercially useful for any paving applications due to regulatory concerns.

The illustrative solubilized tire rubber bitumen mixture or RDP compound shows a substantial increase in penetration.

Further, the homogeneous RDP compound generated by method 300 can be poured through a 100 mesh sieve. Additionally, the RDP rubber and bitumen compound may be solubilized in D-Limonene with better than 99.0% passing through No. 54 Whatman filter paper.

The solubility of the solubilized tire rubber bitumen compound was tested by dissolving 3 grams of the compound in a 125 ml of a solution composed of at least 90% D-Limonene CAS 5989-27-5. The solution was warmed gently on a hot plate with stirring for between 5 to 7 minutes—at which point the solid solubilized tire rubber bitumen compound sample is visibly dissolved in the D-Limonene. The solution was allowed to return to ambient temperature (about 15 minutes) and vacuum filtered using a No. 54 Whatman filter paper and Buchner funnel.

To validate that the tire rubber has been solubilized into the bitumen, the D-Limonene Solubility test as described in ASTM D2042 is utilized. The solubility test indicates that after a cold solvent wash, less than 0.6% residue remains, thus showing that the tire rubber has been substantially solubilized.

There is no significant difference or change in softening point of the bitumen feedstock after the tire rubber is added and RDP product generated. However, a substantial increase in penetration depth is observed after the tire rubber is digested during the heating processes of method 300. This increase in penetration depth is likely due to the release of compounding oils from the tire rubber into the bitumen, with little or no significant oxidation of the bitumen because of a Nitrogen purge on the mixing vessel.

The RDP compound has a RTFO aging value is "1.3." The inventors' postulate that the oils from the tire rubber that are extracted during the heating processes of method 300 reduce the effects of aging. This unexpected result substantially improves the aging of the resulting RDP compound.

The RDP compounds produced from the method 300 show no appreciable mass loss. Inventors hypothesize that this attribute of the RDP compounds arises from the series of heating steps 310, 316, 324, and 336, which incorporate the low boiling point molecules into the matrix of the solubilized tire rubber bitumen compound. The inventors further hypothesize that the heated tire rubber releases process oils from the tire rubber into the maltene fraction of the bitumen or asphalt feedstock, which improves both the oxidation resistance and ductility properties. Additionally, the inventors hypothesize that the bitumen is actually rejuvenated by the increase of the maltene to asphaltene fraction as observed when processing bitumen with vulcanized rubber, i.e. the solubilized tire rubber bitumen compounds produced by this method 300. The resulting RDP compound experiences a significant increase of measured penetration depth at 77° F. over the original bitumen feedstock while minimizing the oxidation and aging reactions associated with exposure of bitumen to high temperatures.

The inventors also hypothesize that the Sulfur-Carbon ("S—C") bonds are easier to break than the Carbon-Carbon ("C—C") bonds. In other words, the heating processes described herein "devulcanize" the rubber by removing the cross-linking caused by the S—C bonds between the polymer chains having C—C bonds. The result is the more soluble polymers, i.e. oils with C—C bonds, are dissolved in the mixing vessel. In some embodiments, this dissolution of soluble polymers occurs prior to increasing the temperature in the reaction vessel to 500° F.-700° F. during the fourth heating step 336.

Similar to the recent use of saponification agents, such as stearamides and phosphates, in bitumen, saponification agents can be added to the resulting solubilized tire rubber bitumen compound to adjust the properties of softening point and penetration depth while allowing good viscosity control as needed. The solubilized tire rubber bitumen compound may also be combined with saturated fabrics such as fiberglass, polyester, rayon, nylon, or combinations thereof in various applications, such as paving, roofing, mining liners, and waterproofing. Further still the solubilized tire rubber bitumen compound may be used in drilling fluid applications to improve the viscosity curve of bitumen, thereby expanding the range of formulation options available to a drill fluid chemist.

Further still, the use of GTR and other vulcanized rubber containing carbon black enhances the black color of the RDP tire rubber bitumen compound. This enhancement, in addition to the improved weathering commonly associated with carbon black, allows the paving produced with RDP compounds to yield a long lasting high contrast surface for traffic marking that greatly improves both day and night time visibility. Additionally, in roofing applications, the carbon black stabilizes the roof coating, improving weathering resistance, and provides a deep black uniform surface for enhanced appearance of various blended and single color granule applications.

Integrated System for Dissolving Tire Rubber

Figure 4:
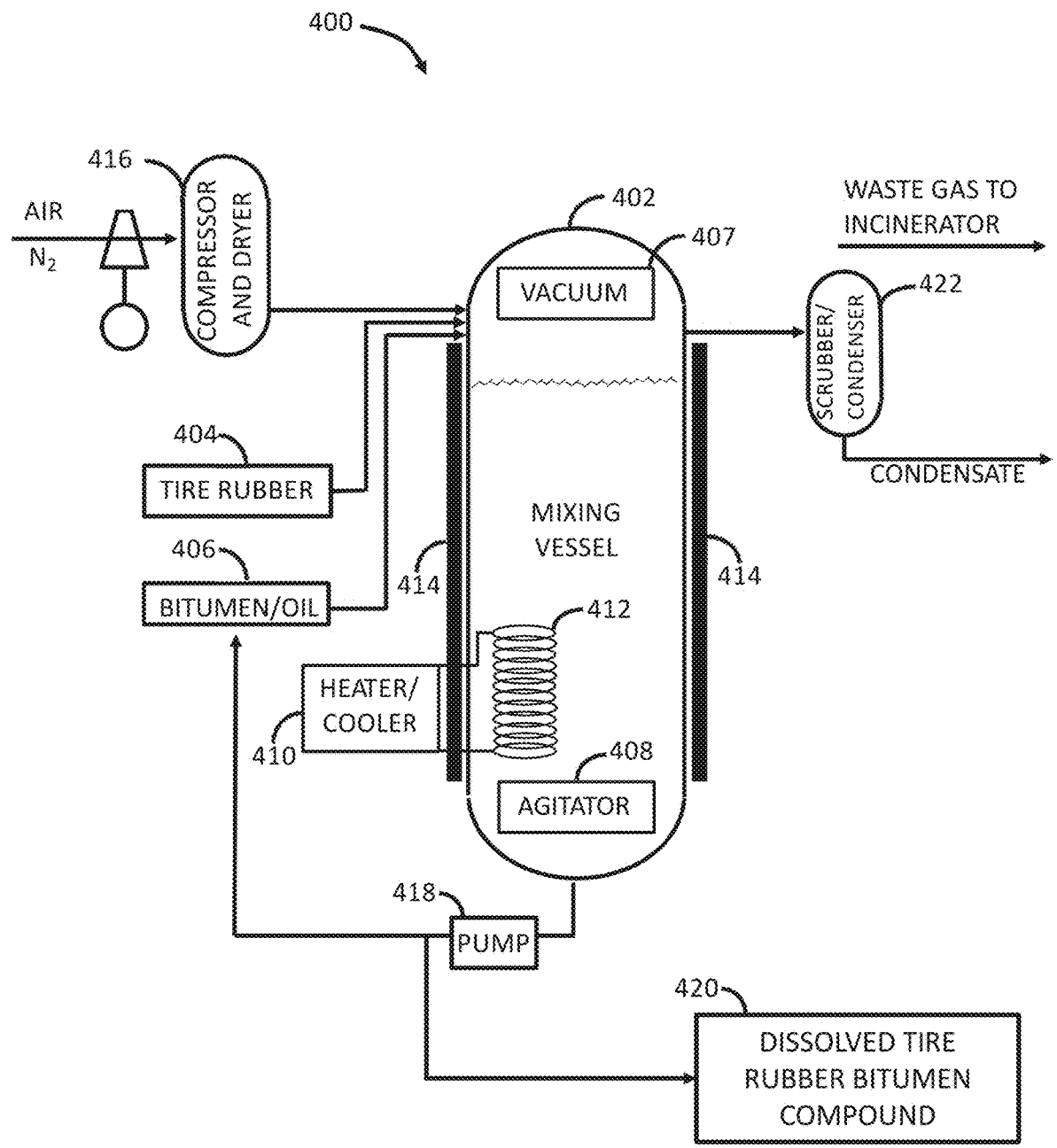
FIG. 4 shows an integrated reactor system that controls a process for dissolving tire rubber in bitumen or oil.

Referring now to FIG. 4 there is shown an integrated reactor system 400 that controls a process for dissolving tire rubber in bitumen or oil. The illustrative system 400 includes an integrated reactor 402 that receives tire rubber 404 and a bitumen feedstock or an oil compound 406. The integrated reactor 402 has an exterior surrounding an interior space that receives the rubber and bitumen. By integrating various components and control elements into the reactor 402, external attachment points and couplings are minimized and the integrity of the mixing vessel 402 is maximized. This maximized integrity allows the integrated mixing vessel 402 more reliably withstand greater temperatures and pressures, as well as achieve higher degrees of vacuum and lower levels of oxygen more efficiently. In some embodiments, the integrated reactor 402 is capable of withstanding temperatures ranging from −20° F. up to 700° F. and pressures ranging from vacuum up to 99 PSI. The higher degrees of vacuum and lower levels of oxygen are achieved because the reactor 402 is configured to be sealed from the exterior atmosphere and includes a vacuum unit 407. The vacuum unit may be mounted within the interior reactor space, mounted to the exterior surface of the reactor, or affixed to an external location and connected to the interior reactor space. The vacuum unit 407 is particularly configured to remove oxygen and other gases from the interior reactor space. In one non-limiting embodiment, the vacuum unit is a positive displacement pump.

In some non-limiting embodiments, the interior space of the integrated reactor 402 is a benchtop scale having a capacity of 500 quarts. In some non-limiting embodiments, the interior space of the integrated reactor 402 is an industrial scale having a capacity of 3000 gallons.

The integrated reactor 402 performs mixing with one or more internal agitators 408 and heating of the tire rubber 404 and the bitumen/oil 406 to between 275° F. and 700° F. with a temperature controller 410 (i.e., heater/cooler unit). The heater/cooler unit 410 includes heating/cooling coils 412 inside the integrated reactor 402 and a heating/cooling jacket 414 surrounding some or all of the exterior of the integrated reactor 402. The heating/cooling unit 410 cycles a fluid, such as an oil, through the heating/cooling coils 412 and/or heating/cooling jacket 414 at a desired temperature to both heat and cool the contents of the integrated reactor 402. In some embodiments, the fluid may be a Therminol® synthetic oil or comparable heat transfer fluid. In some embodiments, the fluid is water and may be pressurized in the heater/cooler unit 410 to maintain a liquid state or allowed to vaporize within the heater/cooler unit 410.

The agitator 408 may be any one or more of a variety of mixing implements located within the interior reactor space of the integrated reactor 402. In some embodiments, the agitator 408 is a planetary mixer. In some embodiments, the agitator 408 is an anchor mixer. In some embodiments, the agitator 408 is an impeller mixer. In some embodiments, the agitator 408 is rotor stator. In some embodiments, the agitator is a multi-shaft mixer combining two or more types of mixers. In the following illustrative embodiments, the operating parameters provided for various mixers apply to the mixers individually, as well as their respective operation in a multi-shaft mixer construction. The agitator 408 mixes and/or circulates the contents of the integrated reactor 402, i.e., the bitumen feedstock, the oil compound, the rubber, the RDP product, any of the intermediate mixtures produced during the rapid digestion processes, or any combination thereof.

In some non-limiting benchtop embodiments, the planetary mixer diameter ranges from 0.2-0.5 ft and operates between 100 RPM and 3000 RPM, yielding a linear velocity of the planetary mixer ranging from 70 ft/min up to 4500 ft/min. In these non-limiting benchtop embodiments, the planetary mixer provides low shear mixing to bituminous mixtures when operating between 100 RPM to 200 RPM and generating linear velocities of the planetary mixer ranging from 70 ft/min up to 300 ft/min; the planetary mixer provides moderate shear mixing to bituminous mixtures when operating between 500 RPM to 1000 RPM and generating linear velocities of the planetary mixer ranging from 300 ft/min up to 1500 ft/min; and the planetary mixer provides high shear mixing to bituminous mixtures when operating between 2000 RPM to 3000 RPM and generating linear velocities of the planetary mixer ranging from 1500 ft/min up to 4500 ft/min.

In some non-limiting benchtop embodiments, the anchor agitator diameter ranges from 0.3-1 ft and operates between 20 RPM and 200 RPM, yielding a linear velocity of the anchor agitator ranging from 50 ft/min up to 300 ft/min.

In some non-limiting benchtop embodiments, the impeller mixer diameter ranges from 0.2-0.5 ft and operates between 3000 RPM and 4500 RPM, yielding a linear velocity of the impeller mixer ranging from 2000 ft/min up to 4500 ft/min. In these non-limiting benchtop embodiments, the impeller mixer provides moderate shear mixing to bituminous mixtures when operating between 3000 RPM to 3500 RPM and generating linear velocities of the impeller mixer ranging from 2000 ft/min up to 3500 ft/min; and the impeller mixer provides high shear mixing to bituminous mixtures when operating between 3500 RPM to 4500 RPM and generating linear velocities of the impeller mixer ranging from 3000 ft/min up to 4500 ft/min.

In some non-limiting benchtop embodiments, the rotor stator diameter ranges from 0.2-0.5 ft and operates between 3000 RPM and 4500 RPM, yielding a linear velocity of the impeller mixer ranging from 2000 ft/min up to 4500 ft/min. In these non-limiting benchtop embodiments, the rotor stator provides moderate shear mixing to bituminous mixtures when operating between 3000 RPM to 3500 RPM and generating linear velocities of the rotor stator ranging from 2000 ft/min up to 3500 ft/min; and the rotor stator provides high shear mixing to bituminous mixtures when operating between 3500 RPM to 4500 RPM and generating linear velocities of the rotor stator ranging from 3000 ft/min up to 4500 ft/min.

In some non-limiting industrial embodiments, the planetary mixer diameter ranges from 1-4 ft and operates below 1500 RPM, yielding a linear velocity of the planetary mixer ranging from 70 ft/min up to 4500 ft/min. In these non-limiting industrial embodiments, the planetary mixer provides low shear mixing to bituminous mixtures when operating between below 80 RPM and generating linear velocities of the planetary mixer ranging from 70 ft/min up to 300 ft/min; the planetary mixer provides moderate shear mixing to bituminous mixtures when operating between 50 RPM to 400 RPM and generating linear velocities of the planetary mixer ranging from 300 ft/min up to 1500 ft/min; and the planetary mixer provides high shear mixing to bituminous mixtures when operating between 300 RPM to 1500 RPM and generating linear velocities of the planetary mixer ranging from 1500 ft/min up to 4500 ft/min.

In some non-limiting industrial embodiments, the anchor agitator diameter ranges from 2-10 ft and operates below 40 RPM, yielding a linear velocity of the anchor agitator ranging from 50 ft/min up to 300 ft/min.

In some non-limiting industrial embodiments, the impeller mixer diameter ranges from 1-4 ft and operates between 200 RPM and 1500 RPM, yielding a linear velocity of the impeller mixer ranging from 2000 ft/min up to 5000 ft/min. In these non-limiting industrial embodiments, the impeller mixer provides moderate shear mixing to bituminous mixtures when operating between 200 RPM to 1000 RPM and generating linear velocities of the impeller mixer ranging from 2000 ft/min up to 3500 ft/min; and the impeller mixer provides high shear mixing to bituminous mixtures when operating between 350 RPM to 1500 RPM and generating linear velocities of the impeller mixer ranging from 3000 ft/min up to 5000 ft/min.

In some non-limiting industrial embodiments, the rotor stator diameter ranges from 1-4 ft and operates between 200 RPM and 1500 RPM, yielding a linear velocity of the impeller mixer ranging from 2000 ft/min up to 5000 ft/min. In these non-limiting benchtop embodiments, the rotor stator provides moderate shear mixing to bituminous mixtures when operating between 200 RPM to 1000 RPM and generating linear velocities of the rotor stator ranging from 2000 ft/min up to 3500 ft/min; and the rotor stator provides high shear mixing to bituminous mixtures when operating between 350 RPM to 1500 RPM and generating linear velocities of the rotor stator ranging from 3000 ft/min up to 5000 ft/min.

The integrated reactor (mixing vessel) 402 receives the mixture of tire rubber and bitumen feedstock or oil compound up to a desired operating level, e.g. 65% to 75% of the column height of the reactor.

The illustrative reactor 402 is a vertical vessel equipped with a gas distribution component 416, which accesses the top and bottom of the vessel 402 through separate feeder ports. The gas distribution component 416 may include a compressor to transfer, supply, and/or pressurize the gases to be distributed to the interior reactor space. The gas distribution component 416 may also include a dryer that removes moisture and other contaminants from the gases to be distributed. The gas distribution component 416 may receive Nitrogen, a non-oxygenated gas, air, or any other such gas. In one illustrative embodiment, Nitrogen ($N_2$) is added to the top of the mixing vessel 402 to provide a low pressure sweep in the headspace of the mixing vessel 402 to remove the air and prevent oxygen entrapment in the intermediate bitumen mixtures and/or the RDP product during the heating processes of methods 100, 200, and 300. Nitrogen may also be introduced from the bottom of the reactor 402 or in the combination of the headspace and the bottom of the mixing vessel 402.

The reactor system 400 is capable of heating bitumen, bitumen tire rubber mixtures, the RDP product, and any combination thereof to between 275° F. and 700° F. in the mixing vessel 402.

In some embodiments, the temperature controller 410 heats a bitumen compound and a tire rubber compound to between 275° F. and 350° F. to mix and wet the tire rubber compound with the bitumen compound to generate a bitumen wetted tire rubber mixture. In some embodiments, the temperature controller 410 heats a bitumen compound and a tire rubber compound to between 290° F. and 315° F. to mix and wet the tire rubber compound with the bitumen compound to generate a bitumen wetted tire rubber mixture. In some embodiments, the temperature controller 410 heats a bitumen compound and a tire rubber compound to between 300° F. and 310° F. to mix and wet the tire rubber compound with the bitumen compound to generate a bitumen wetted tire rubber mixture. In some embodiments, the temperature controller 410 heats a bitumen compound and a tire rubber compound to 305° F. to mix and wet the tire rubber compound with the bitumen compound to generate a bitumen wetted tire rubber mixture. In some embodiments, the temperature controller 410 heats a devulcanized tire rubber bitumen mixture under mixing to between 275° F. and 325° F. to generate a bitumen wetted devulcanized tire rubber mixture. In some embodiments, the temperature controller 410 heats the devulcanized tire rubber bitumen mixture under mixing to between 290° F. and 315° F. to generate the bitumen wetted devulcanized tire rubber mixture. In some embodiments, the temperature controller 410 heats the devulcanized tire rubber bitumen mixture under mixing to between 300° F. and 310° F. to generate the bitumen wetted devulcanized tire rubber mixture.

In some embodiments, the temperature controller 410 heats any additional bitumen compound and the bitumen wetted tire rubber mixture to between 325° F. and 350° F. to mix and wet the tire rubber compound with the bitumen compound to generate a fully bitumen wetted tire rubber mixture. In some embodiments, the temperature controller 410 heats any additional bitumen compound and the bitumen wetted devulcanized tire rubber mixture with mixing to between 325° F. and 350° F. to generate a fully wetted devulcanized tire rubber bitumen mixture.

In some embodiments, the temperature controller 410 heats the fully wetted tire rubber mixture to between 350° F. and 500° F. to mix and devulcanize the tire rubber to generate a devulcanized fully wetted tire rubber bitumen mixture. In some embodiments, the temperature controller 410 heats the fully wetted tire rubber mixture to between 375° F. and 400° F. to mix and devulcanize the tire rubber to generate the devulcanized fully wetted tire rubber bitumen mixture. In some embodiments, the temperature controller 410 heats a bitumen compound and a tire rubber compound under mixing to between 350° F. and 500° F. to generate a devulcanized tire rubber bitumen mixture. In some embodiments, the temperature controller 410 heats the bitumen compound and the tire rubber compound with mixing to between 375° F. and 400° F. to generate the devulcanized tire rubber bitumen mixture.

In some embodiments, the temperature controller 410 heats a devulcanized fully wetted tire rubber mixture (or bitumen wetted devulcanized tire rubber mixture) to between 500° F. and 700° F. to mix and solubilize the tire rubber to generate a solubilized tire rubber bitumen compound or RDP compound. In some embodiments, the temperature controller 410 heats the devulcanized fully wetted tire rubber mixture to between 525° F. and 700° F. to mix and solubilize the tire rubber to generate the solubilized tire rubber bitumen compound or RDP compound. In some embodiments, the temperature controller 410 heats the devulcanized fully wetted tire rubber mixture to between 650° F. and 700° F. to mix and solubilize the tire rubber to generate the solubilized tire rubber bitumen compound or RDP compound. In some embodiments, the temperature controller 410 heats the devulcanized fully wetted tire rubber mixture to between 599° F. and 630° F. to mix and solubilize the tire rubber to generate the solubilized tire rubber bitumen compound or RDP compound. In some embodiments, the temperature controller 410 heats the devulcanized fully wetted tire rubber mixture to between 630° F. and 640° F. to mix and solubilize the tire rubber to generate the solubilized tire rubber bitumen compound or RDP compound. In some embodiments, the temperature controller 410 heats the devulcanized fully wetted tire rubber mixture to between 600° F. and 605° F. to mix and solubilize the tire rubber to generate the solubilized tire rubber bitumen compound or RDP compound. In some embodiments, the temperature controller 410 heats the devulcanized fully wetted tire rubber mixture to 605° F. to mix and solubilize the tire rubber to generate the solubilized tire rubber bitumen compound or RDP compound.

In the illustrative embodiment, the agitator 408 internal to the mixing vessel 402 uniformly mixes any bitumen, bitumen tire rubber mixtures, bitumen wetted tire rubber mixture, fully wetted tire rubber bitumen mixture, devulcanized fully wetted tire rubber bitumen mixture, solubilized tire rubber compound, RDP product, and any combination thereof during one or more of the heating steps of methods 100, 200, and 300. The uniform mixing process avoids hot spots within the reaction vessel 402, i.e. mixing chamber.

Any solubilized tire rubber bitumen mixtures in the mixing vessel may be quenched with the addition of bitumen or oil 406 through an external pump 418, which cools the solubilized tire rubber bitumen mixture from between 500° F. and 700° F. down to 500° F. or less. The pump 418 may transfer cool or unheated bitumen feedstock 406 directly into the reactor mixing vessel 402, as well as transfer the RDP product 420 out of the reactor mixing vessel 402 for post-production use and/or modification. In another illustrative embodiment, a water-based cooling system may be used to cool down the illustrative RDP product to 500° F. or less.

Fumes produced during any heating processes performed by the reactor system 100, such as during performance of methods 100, 200, and 300, may be disposed of with a scrubber/condenser 422 that neutralizes and/or collects VOCs and other hazardous gases in the fumes.

Figure 5A:
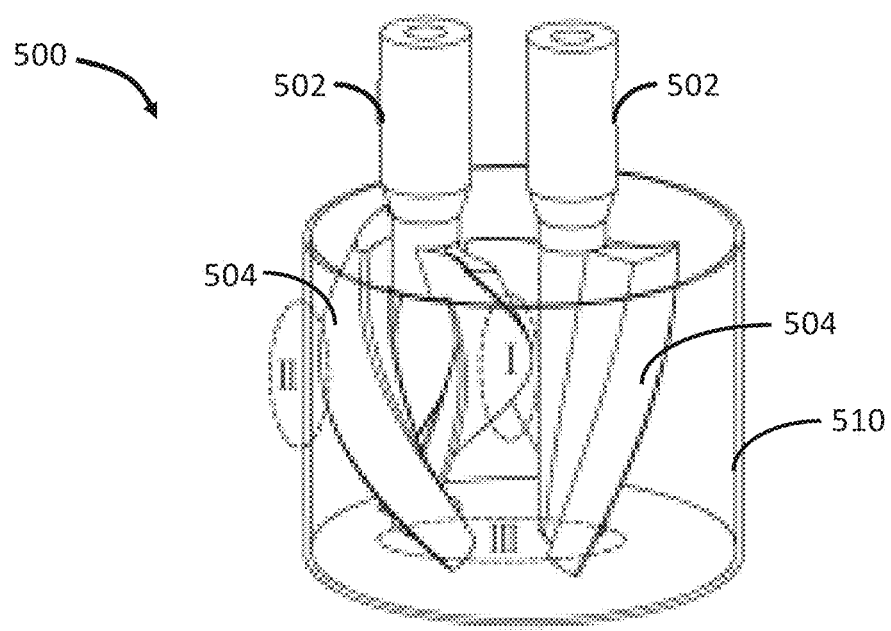
FIGS. 5A and 5B show an exemplary double rotor planetary agitator.
Figure 5B:
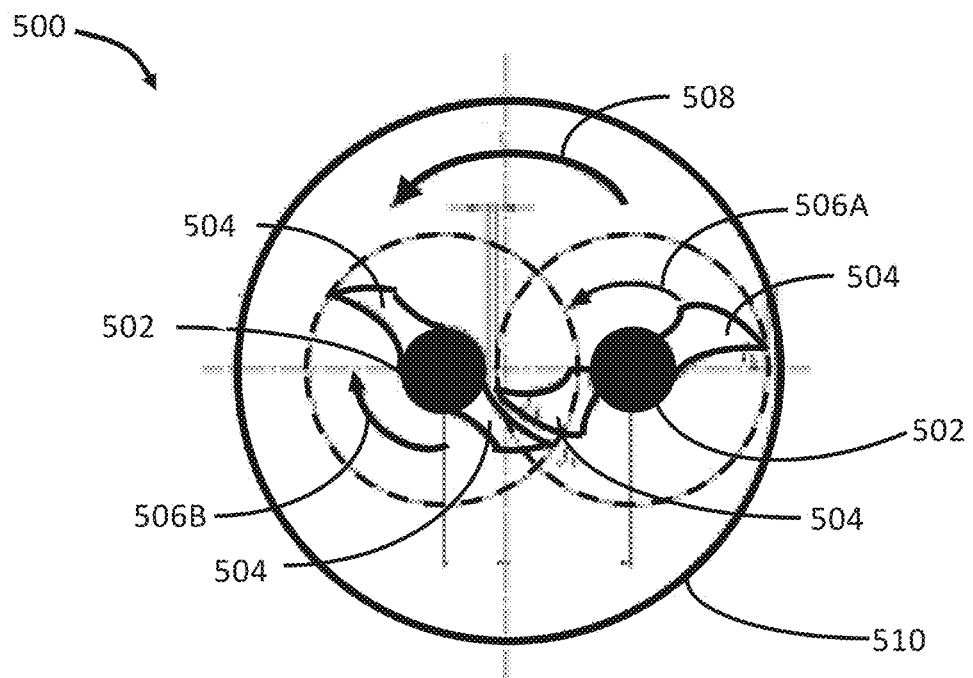

Referring now to FIGS. 5A and 5B, there is shown an exemplary double rotor planetary agitator 500. Planetary agitators may include a single rotor, a double rotor, or multiple rotors. The terms "planetary mixer" and "planetary agitator" refer to all types of planetary agitators, regardless of the number of rotors. The double rotor planetary agitator 500 includes two rotors 502. Each rotor 502 includes one or more blades 504. The illustrative double rotor planetary agitator 500 is a standing or vertical agitator that rotates about vertical axes.

FIG. 5A shows a side view of the illustrative double planetary agitator or mixer 500. The illustrative blades 504 curve along the vertical axis. In some embodiments, the blades do not curve and extend straight from top to bottom. The illustrative double planetary agitator produces low, moderate, and high shear mixing as the rate of rotation increases.

In some non-limiting benchtop embodiments, each rotor 502 of the planetary mixer has a diameter ranging from 0.2-0.5 ft and operate between 100 RPM and 3000 RPM, yielding a linear velocity of each rotor 502 ranging from 70 ft/min up to 4500 ft/min. In these non-limiting benchtop embodiments, the planetary mixer provides low shear mixing to bituminous mixtures when operating each rotor 502 between 100 RPM to 200 RPM and generating linear velocities of each rotor 502 ranging from 70 ft/min up to 300 ft/min; the planetary mixer provides moderate shear mixing to bituminous mixtures when operating each rotor 502 between 500 RPM to 1000 RPM and generating linear velocities of each rotor 502 ranging from 300 ft/min up to 1500 ft/min; and the planetary mixer provides high shear mixing to bituminous mixtures when operating each rotor 502 between 2000 RPM to 3000 RPM and generating linear velocities of each rotor 502 ranging from 1500 ft/min up to 4500 ft/min.

In some non-limiting industrial embodiments, each rotor 502 of the planetary mixer has a diameter ranging from 1-4 ft and operates below 1500 RPM, yielding a linear velocity of each rotor 502 ranging from 70 ft/min up to 4500 ft/min. In these non-limiting industrial embodiments, the planetary mixer provides low shear mixing to bituminous mixtures when operating each rotor 502 between below 80 RPM and generating linear velocities of each rotor 502 ranging from 70 ft/min up to 300 ft/min; the planetary mixer provides moderate shear mixing to bituminous mixtures when operating each rotor 502 between 50 RPM to 400 RPM and generating linear velocities of each rotor 502 ranging from 300 ft/min up to 1500 ft/min; and the planetary mixer provides high shear mixing to bituminous mixtures when operating each rotor 502 between 300 RPM to 1500 RPM and generating linear velocities of each rotor 502 ranging from 1500 ft/min up to 4500 ft/min.

FIG. 5B shows a top view of the illustrative double planetary agitator or mixer 500 and rotational paths 506A, 506B, and 508 of the blades 504 and rotors 502. Rotational paths 506A and 506B shows the counter rotation of the two rotors 502 and their respective blades 504, which allows the blades 504 of one rotor 502 to rotate past the blades 504 of the other rotor 502. Each rotor 502 rotates its respective blades 504 about a vertical axis running through the length of the respective rotor. Thus, the blades 504 rotate about their respective rotors 502 similar to how a planet orbits around the sun. Further, the rotors 502 rotate about the interior of a container (i.e., mixing vessel) 510 so that the blades 504 are capable of agitating all areas within the container 510. Thus, when the blades 504 revolve, material (i.e., bitumen, bitumen mixtures, RDP product) flow up and down, as well as around the container.

In some embodiments, the rotors 502 and/or blades 504 may be constructed from durable high temperature resistant materials, such as steel, titanium, ceramics, and other equivalent materials. In some embodiments, the blades 504 have a helical shape. In some embodiments, the planetary agitator is a single rotor planetary agitator.

Figure 6:
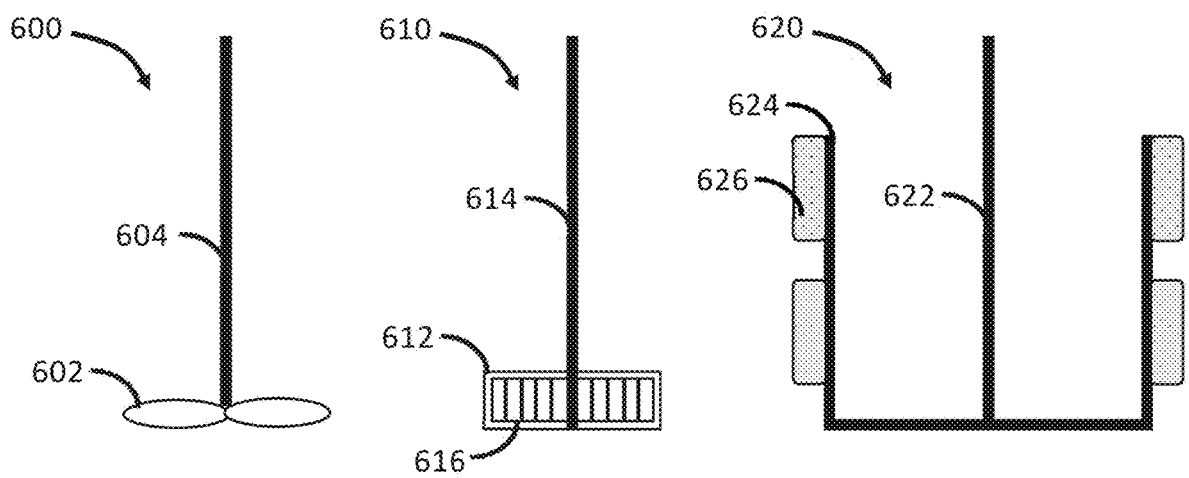
FIG. 6 shows a variety of agitators.

With reference now to FIG. 6, there are shown a variety of agitators 600, 610, 620. Agitator 600 is a horizontally radial impeller agitator, agitator 610 is a rotor stator, agitator 620 is an anchor agitator. The radial impeller agitator 600 comprises two or more blades 602 extending horizontally from a central rotor shaft 604. The radial impeller agitator 600 may operate by rotating about a vertical axis aligning with the central rotor shaft 604. The shear provided by the impeller agitator 600 increases as the operating rpm of the mixer 600 increases. In some embodiments, the blades 602 are helically curved. In some embodiments, the blades 602 are planar.

In some embodiments, the radial impeller agitator 600 may mix bitumen, bitumen tire rubber mixtures, the bitumen wetted tire rubber mixture, the fully wetted tire rubber bitumen mixture, the devulcanized fully wetted tire rubber bitumen mixture, the RDP products, and any combination thereof with moderate shear. In some non-limiting benchtop embodiments, the impeller mixer 600 diameter ranges from 0.2-0.5 ft and provides moderate shear mixing to bituminous mixtures when operating between 3000 RPM to 3500 RPM and generating linear velocities of the impeller blade tips 602 ranging from 2000 ft/min up to 3500 ft/min. In some non-limiting industrial embodiments, the impeller mixer 600 diameter ranges from 1-4 ft and provides moderate shear mixing to bituminous mixtures when operating between 200 RPM to 1000 RPM and generating linear velocities of the impeller blade tips 602 ranging from 2000 ft/min up to 3500 ft/min.

In some embodiments, the radial impeller agitator 600 may mix bitumen, bitumen tire rubber mixtures, the bitumen wetted tire rubber mixture, the fully wetted tire rubber bitumen mixture, the devulcanized fully wetted tire rubber bitumen mixture, the RDP products, and any combination thereof with high shear. In some non-limiting benchtop embodiments, the impeller mixer 600 diameter ranges from 0.2-0.5 ft and provides high shear mixing to bituminous mixtures when operating between 3500 RPM to 4500 RPM and generating linear velocities of the impeller blade tips 602 ranging from 3000 ft/min up to 4500 ft/min. In some non-limiting industrial embodiments, the impeller mixer 600 diameter ranges from 1-4 ft and provides high shear mixing to bituminous mixtures when operating between 350 RPM to 1500 RPM and generating linear velocities of the impeller blade tips 602 ranging from 3000 ft/min up to 5000 ft/min.

The rotor stator agitator 610 comprises a stator 612 and internal impeller (not shown) attached to the terminal end of a shaft 614. The stator 612 surrounds a rotor impeller (not shown), and the combination of these components together may be termed a mixing head. The rotor impeller may comprise two or more blades extending horizontally from a central hub or driving rotation shaft (not shown). In operation, the stator 612 remains fixed or motionless, while the impeller rotates within the stator 612. In some embodiments, the shaft 614 rotates. In some embodiments, the shaft 614 comprises an exterior stationary housing and an internal rotating drive shaft. The stator 612 includes a plurality of teeth, serrations, or slits 616 through which mixed material is expelled or extruded by the internal impeller. The plurality of slits 616 may vary in number, angle, and width, which in turn may increase or decrease the amount of shear the rotor stator agitator 610 produces, though generally the rotor stator agitator 610 produces high shear. In some non-limiting benchtop embodiments, the rotor stator 610 diameter ranges from 0.2-0.5 ft and provides high shear mixing to bituminous mixtures when operating between 3500 RPM to 4500 RPM and generating linear velocities of the rotor stator 610 ranging from 3000 ft/min up to 4500 ft/min. In some non-limiting industrial embodiments, the rotor stator 610 diameter ranges from 1-4 ft and provides high shear mixing to bituminous mixtures when operating between 350 RPM to 1500 RPM and generating linear velocities of the rotor stator 610 ranging from 3000 ft/min up to 5000 ft/min.

In some embodiments, the rotor stator agitator 610 may produce moderate shear. In some non-limiting benchtop embodiments, the rotor stator 610 diameter ranges from 0.2-0.5 ft and provides moderate shear mixing to bituminous mixtures when operating between 3000 RPM to 3500 RPM and generating linear velocities of the rotor stator 610 ranging from 2000 ft/min up to 3500 ft/min. In some non-limiting industrial embodiments, the rotor stator 610 diameter ranges from 1-4 ft and provides moderate shear mixing to bituminous mixtures when operating between 200 RPM to 1000 RPM and generating linear velocities of the rotor stator 610 ranging from 2000 ft/min up to 3500 ft/min.

The anchor agitator 620 comprises a central rotating drive shaft 622 and one or more mixing arms 624 forming a U-shape. In the illustrative embodiment, each mixing arm 624 includes one or more paddles 626 that extend the mixing surface of the anchor agitator 620. In some embodiments, the mixing arm(s) 624 lack any blades to extend the mixing surface. In some embodiments, the mixing arm(s) 624 form a helical ribbon. In some embodiments, the mixing arm(s) 624 form a loop. In all embodiments, the anchor agitator 620 produces low shear mixing. In some non-limiting benchtop embodiments, the anchor agitator 620 diameter ranges from 0.3-1 ft and operates between 20 RPM and 200 RPM, yielding a linear velocity of the anchor agitator 620 ranging from 50 ft/min up to 300 ft/min. In some non-limiting industrial embodiments, the anchor agitator 620 diameter ranges from 2-10 ft and operates below 40 RPM, yielding a linear velocity of the anchor agitator 620 ranging from 50 ft/min up to 300 ft/min.

Figure 7:
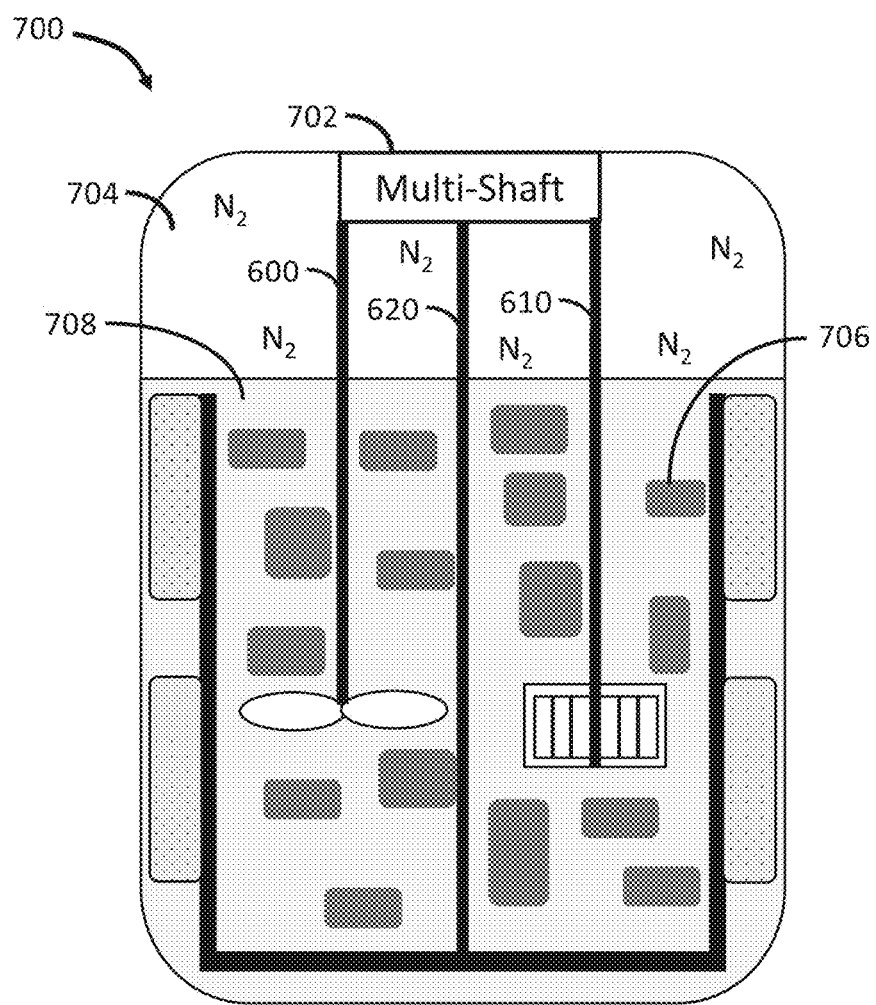
FIG. 7 shows a multi-shaft mixer mounted on a reactor vessel.

Referring now to FIG. 7, there is shown a multi-shaft mixer 702 mounted on a reactor vessel 700. The illustrative reactor vessel 700 contains a $N_2$ flooded headspace 704 and tire rubber chunks 706 dispersed in bitumen feedstock 708. In some embodiments, the illustrative reactor vessel is coupled to a vacuum unit and a gas distribution unit/compressor that operate together to provide a purge sweep operation that removes oxygenated gases from the headspace above any mixture contained in the reactor vessel 700. In some embodiments, the illustrative reactor vessel 700 includes a temperature controller unit that provides heating and cooling of the interior contents of the reactor vessel 700 between 275° F. and 700° F.

The illustrative multi-shaft mixing unit 702 includes an impeller mixer 600 on one shaft, a rotor stator mixer 610 on a second shaft, and an anchor mixer 620 on a third shaft. The three shafts of the illustrative multi-shaft mixing unit 702 may operate independently, alternately, and simultaneously. In some non-limiting benchtop embodiments, the anchor agitator 620 diameter ranges from 0.3-1 ft and provides low shear mixing when operating between 20 RPM and 200 RPM, yielding a linear velocity of the anchor agitator 620 ranging from 50 ft/min up to 300 ft/min. In some non-limiting benchtop embodiments, the impeller mixer 600 diameter ranges from 0.2-0.5 ft where it provides high shear mixing to bituminous mixtures when operating between 3500 RPM to 4500 RPM by generating linear velocities of the impeller blade tips 602 ranging from 3000 ft/min up to 4500 ft/min, and provides moderate shear mixing when operating between 3000 RPM to 3500 RPM by generating linear velocities of the impeller blade tips 602 ranging from 2000 ft/min up to 3500 ft/min. In some non-limiting benchtop embodiments, the rotor stator 610 diameter ranges from 0.2-0.5 ft where it provides high shear mixing to bituminous mixtures when operating between 3500 RPM to 4500 RPM by generating linear velocities of the rotor stator 610 ranging from 3000 ft/min up to 4500 ft/min, and provides moderate shear mixing when operating between 3000 RPM to 3500 RPM by generating linear velocities of the rotor stator 610 ranging from 2000 ft/min up to 3500 ft/min.

In some non-limiting industrial embodiments, the anchor agitator 620 diameter ranges from 2-10 ft and provides low shear mixing when operating below 40 RPM, yielding a linear velocity of the anchor agitator 620 ranging from 50 ft/min up to 300 ft/min. In some non-limiting industrial embodiments, the impeller mixer 600 diameter ranges from 1-4 ft where it provides moderate shear mixing to bituminous mixtures when operating between 200 RPM to 1000 RPM by generating linear velocities of the impeller blade tips 602 ranging from 2000 ft/min up to 3500 ft/min, and provides high shear mixing when operating between 350 RPM to 1500 RPM by generating linear velocities of the impeller mixer ranging from 3000 ft/min up to 5000 ft/min. In some non-limiting industrial embodiments, the rotor stator 610 diameter ranges from 1-4 ft where it provides high shear mixing to bituminous mixtures when operating between 350 RPM to 1500 RPM by generating linear velocities of the rotor stator 610 ranging from 3000 ft/min up to 5000 ft/min, and provides moderate shear mixing when operating between 200 RPM to 1000 RPM by generating linear velocities of the rotor stator 610 ranging from 2000 ft/min up to 3500 ft/min.

In various embodiments, the multi-shaft mixing unit 702 may include fewer than three mixing shafts or more than three mixing shafts.

Multi-Stage System for Dissolving Tire Rubber

Figure 8:
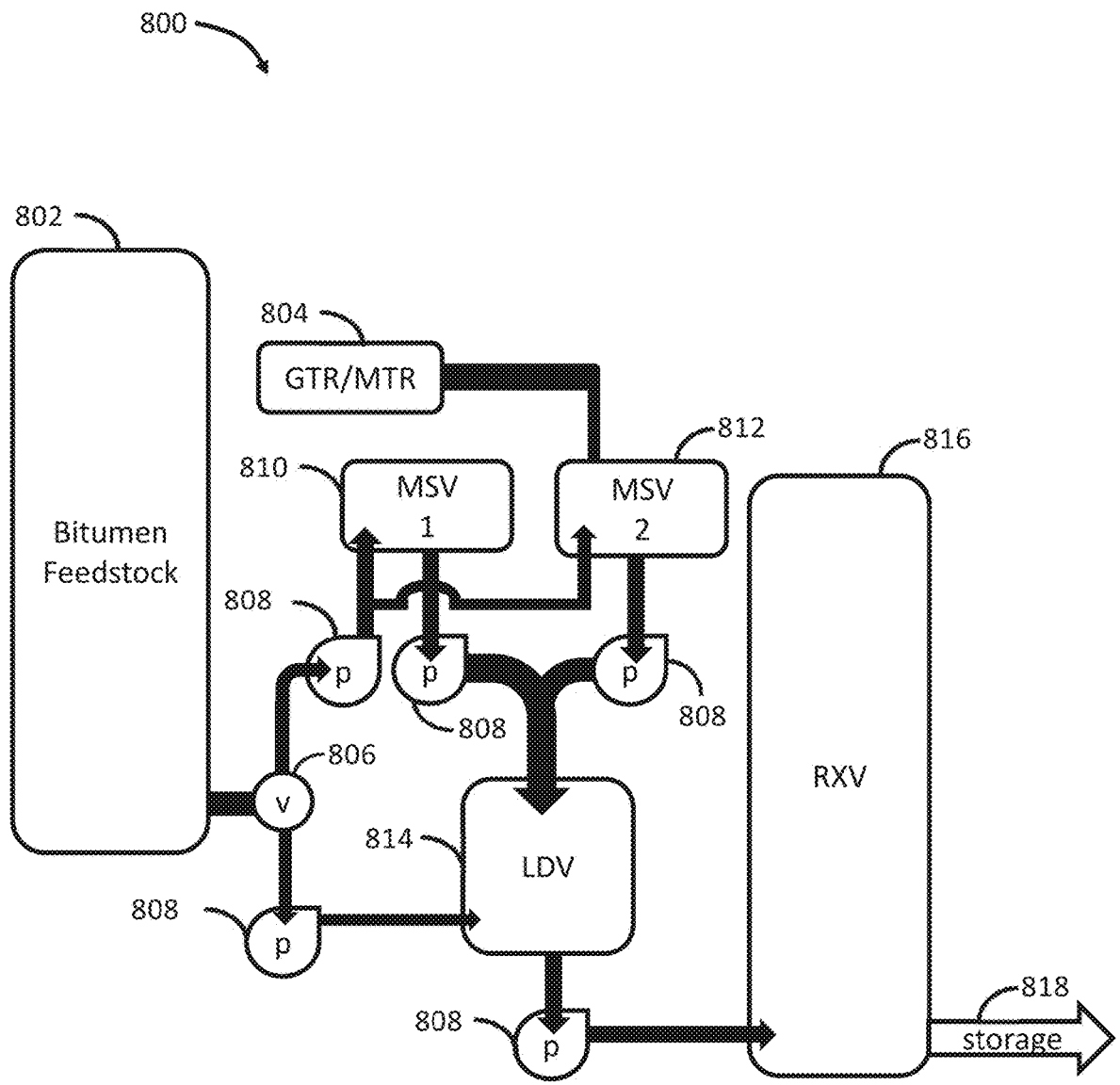
FIG. 8 shows a multi-stage reactor system that controls a process for dissolving tire rubber in bitumen or oil.

With reference now to FIG. 8, there is shown a multi-stage reactor system 800 that controls a process for dissolving tire rubber in bitumen or oil. The illustrative system 800 includes a bitumen feedstock tank 802 and a GTR/mixed tire rubber tank 804. The bitumen feedstock tank 802 feeds bitumen feedstock contained therein through a system of plumbing pipes, one or more valves 806 and pumps 808 to a first multi-shaft mixing vessel 810, a second multi-shaft mixing vessel 812, and a let down vessel 814. Thus, the bitumen feedstock tank 802 is coupled to the first multi-shaft mixing vessel 810, the second multi-shaft mixing vessel 812, and the let down vessel 814. The holding tank 804 for the GTR/mixed tire rubber transfers tire rubber stock from the holding tank 804 through a feed system to the second multi-shaft mixing vessel 812. Thus, the GTR/mixed tire rubber holding tank 804 is coupled to the second multi-shaft mixing vessel 812. The feed system may be a conveyor belt, gravity feed, manual transfer, or equivalent transfer system for rubber particles. One or more pumps 808 transfer the contents of the first multi-shaft mixing vessel 810 to the let down vessel 814. Similarly, one or more pumps 808 transfer the contents of the second multi-shaft mixing vessel 812 to the let down vessel 814. Thus, the let down vessel is coupled to both the first multi-shaft mixing vessel 810 and the second multi-shaft mixing vessel 812. One or more pumps 808 drive the contents of the let down vessel 814 through a system of plumbing pipes to a reactor vessel 816 for rapid digestion heating. Thus, the let down vessel 814 is further coupled to the reactor vessel 816. Upon completion of rapid digestion heating in the reactor vessel 816, any RDP compound produced is transferred through a system of plumbing pipes to storage 818.

The illustrative valve 806 may be a two-way valve, a splitter valve, or an equivalent valve type. The illustrative valve 806 controls the flow of bitumen feedstock to the multi-shaft mixing vessels 810, 812 and the let down vessel 814. In some embodiments, the valve 806 may include a closed position where bitumen feedstock is not capable of flowing through the valve 806. In some embodiments, the valve 806 may include one or more open positions, such as an open position that allows bitumen feedstock to flow through the valve only to the first multi-shaft mixing vessel 810, only to the second multi-shaft mixing vessel 812, only to the let down vessel 814, to both the first and second mixing vessels 810 and 812, or to all of the first multi-shaft mixing vessel 810, the second multi-shaft mixing vessel 812, and the let down vessel 814.

Each pump 808 may be unidirectional (pumping fluid in only one direction) or bidirectional (pumping fluid forward and backward along a flow path). Bidirectional pumps or reversible pumps may be used to purge fluids from common plumbing lines.

In some embodiments, the let down vessel 814 is a multi-shaft mixing vessel. In some embodiments, the reactor vessel 816 is a multi-shaft mixing vessel, an integrated reactor, or a combination thereof. In some embodiments, each of the first multi-shaft mixing vessel 810, the second multi-shaft mixing vessel 812, the let down vessel 814, and the reactor vessel 816 may further include a vacuum unit, a gas distribution unit, and a heater/cooler as described above with reference to the integrated reactor system 400 of FIG. 4. In some embodiments, the vacuum unit is particularly configured to remove oxygen and other gases from the interior space of the vessels 810, 812, 814. In some embodiments, each of the first multi-shaft mixing vessel 810, the second multi-shaft mixing vessel 812, the let down vessel 814, and the reactor vessel 816 are capable of withstanding temperatures ranging from −20° F. up to 700° F. and pressures ranging from vacuum up to 99 PSI. In some embodiments, each of the first multi-shaft mixing vessel 810, the second multi-shaft mixing vessel 812, the let down vessel 814, and the reactor vessel 816 are configured to be sealed from the exterior atmosphere. In some embodiments, the second multi-shaft mixing vessel 812 is termed a wetting tank.

Solubilized Rubber Bitumen Compound Applications

The solubilized rubber compound described above may be used to make solvent based cut backs, primers, hot and emulsion based highway tack coats and membranes, non-ionic emulsions, mastics, roof coatings solvent and emulsion based, waterproofing primers, and concrete and asphalt drive way sealers, joint calking or filling compounds, rubber compounding oil, roofing with chopped fiber or partially saturated reinforcements or sub layers.

Additionally, the solubilized rubber compound may also be used with adhesives and sealants for roofing shingles and self-applied roofing and waterproofing membranes.

Furthermore, the solubilized rubber compound may be used in applications utilizing bitumen in automotive undercoating, pipe wrap, in addition to wire and cable wrap benefit from the carbon black released from the tire rubber along with the oils that improve both weathering and adhesion of these materials to a wide variety of substrates.

Further still, chemical treatment of the solubilized rubber compound can also be performed using various acids and catalyst common to the roofing and paving industries. In paving, it is common to add super polyphosphoric acid to improve flow properties of the bitumen and likewise enhances the solubilized rubber compound.

Oxidized bitumen is routinely prepared using a range of acids and additives to catalyze the oxidation process by reducing the air blowing time and improve the desired properties of penetration, softening point, and viscosity. This solubilized rubber compound can be used to air blow with or without catalyst to make a roof coating that yields improved weathering from the carbon black and oils released from the tire rubber.

Likewise, post blending of the solubilized rubber compound into oxidized roofing coating to improve penetration and viscosity yields improved coating weathering performance.

The solubilized rubber compounds presented above may be employed for asphalt pavement preservation, including rejuvenator emulsions, asphalt emulsion fog seals, a variety of surface treatments (including slurry and micro surfacing technologies), and emerging asphalt thin overlay technologies.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for generating a solubilized tire rubber bitumen compound, the method comprising:
   receiving a first bitumen compound;
   receiving a tire rubber compound;
   heating the first bitumen compound and the tire rubber compound to between 275° F. and 325° F. to generate a bitumen wetted tire rubber mixture;
   adding a second bitumen compound to the bitumen wetted tire rubber mixture;
   heating the second bitumen compound and the bitumen wetted tire rubber mixture to between 325° F. and 350° F. to generate a fully wetted tire rubber bitumen mixture;
   heating the fully wetted tire rubber bitumen mixture to between 350° F. and 500° F. to generate a devulcanized fully wetted tire rubber bitumen mixture; and
   heating the devulcanized fully wetted tire rubber bitumen mixture to between 500° F. and 700° F. to generate the solubilized tire rubber bitumen compound.

2. The method of claim 1 wherein the devulcanized fully wetted tire rubber bitumen mixture is heated to between 525° F. and 700° F. to generate the solubilized tire rubber bitumen compound.

3. The method of claim 1 wherein the devulcanized fully wetted tire rubber bitumen mixture is heated to between 600° F. and 605° F. to generate the solubilized tire rubber bitumen compound.

4. The method of claim 1 wherein the tire rubber compound and the first bitumen compound are heated to between 300° F. and 310° F. to generate the bitumen wetted tire rubber mixture.

5. The method of claim 1 wherein the fully wetted tire rubber bitumen mixture is heated to between 375° F. and 400° F. to generate the devulcanized fully wetted tire rubber bitumen mixture.

6. The method of claim 1 wherein the fully wetted tire rubber bitumen mixture is heated for between 30 minutes and 60 minutes to generate the devulcanized fully wetted tire rubber bitumen mixture.

7. The method of claim 1 wherein the devulcanized fully wetted tire rubber bitumen mixture is heated for between 55 minutes and 65 minutes to generate the solubilized tire rubber bitumen compound.

8. The method of claim 1 wherein the bitumen wetted tire rubber mixture includes less than 60% by weight of the tire rubber compound;
- wherein the fully wetted tire rubber bitumen mixture includes between 10% and 50% by weight of the tire rubber compound; and
- wherein the solubilized tire rubber bitumen compound includes between 10% and 50% by weight of the tire rubber compound.

9. The method of claim 1 wherein the fully wetted tire rubber bitumen mixture is heated and mixed under one of vacuum and non-oxygenated gas to generate the devulcanized fully wetted tire rubber bitumen mixture; and
- wherein the devulcanized fully wetted tire rubber bitumen mixture is heated and mixed under one of vacuum and non-oxygenated gas to generate the solubilized tire rubber bitumen compound.

10. The method of claim 1 further comprising cooling the solubilized tire rubber bitumen compound below 400° F.

11. A method for generating a solubilized tire rubber bitumen compound, the method comprising:
- receiving a first bitumen compound;
- receiving a tire rubber compound;
- heating the first bitumen compound and the tire rubber compound to between 350° F. and 500° F. to generate a devulcanized tire rubber bitumen mixture;
- heating the devulcanized tire rubber bitumen mixture to between 275° F. and 325° F. to generate a bitumen wetted devulcanized tire rubber mixture;
- adding a second bitumen compound to the bitumen wetted devulcanized tire rubber mixture;
- heating the second bitumen compound and the bitumen wetted devulcanized tire rubber mixture to between 325° F. and 350° F. to generate a fully wetted devulcanized tire rubber bitumen mixture; and
- heating the bitumen wetted devulcanized tire rubber mixture to between 500° F. and 700° F. to generate the solubilized tire rubber bitumen compound.

12. The method of claim 11 wherein the bitumen wetted devulcanized tire rubber mixture is heated to between 525° F. and 700° F. to generate the solubilized tire rubber bitumen compound.

13. The method of claim 11 wherein the bitumen wetted devulcanized tire rubber mixture is heated to between 600° F. and 605° F. to generate the solubilized tire rubber bitumen compound.

14. The method of claim 11 wherein the tire rubber compound and the first bitumen compound are heated to between 375° F. and 400° F. to generate the devulcanized tire rubber bitumen mixture.

15. The method of claim 11 wherein the devulcanized tire rubber bitumen mixture is heated to between 300° F. and 310° F. to generate the bitumen wetted devulcanized tire rubber mixture.

16. The method of claim 11 wherein the bitumen wetted tire rubber mixture includes less than 60% by weight of the tire rubber compound;
- wherein the fully wetted tire rubber bitumen mixture includes between 10% and 50% by weight of the tire rubber compound; and
- wherein the solubilized tire rubber bitumen compound includes between 10% and 50% by weight of the tire rubber compound.

17. The method of claim 11 wherein the first bitumen compound and the tire rubber compound are heated for between 30 minutes and 60 minutes to generate the devulcanized tire rubber bitumen mixture.

18. The method of claim 11 wherein the devulcanized tire rubber bitumen mixture is heated for between 10 minutes and 20 minutes to generate the bitumen wetted devulcanized tire rubber mixture.

19. The method of claim 11 wherein the second bitumen compound and the bitumen wetted devulcanized tire rubber mixture are heated for between 55 minutes and 65 minutes to generate the solubilized tire rubber bitumen compound.

20. The method of claim 11 wherein the first bitumen compound and the tire rubber compound are heated and mixed under one of vacuum and non-oxygenated gas to generate the devulcanized tire rubber bitumen mixture; and
- wherein the bitumen wetted devulcanized tire rubber mixture is heated and mixed under one of vacuum and non-oxygenated gas to generate the solubilized tire rubber bitumen compound.

\* \* \* \* \*